United States Patent
Zhang et al.

(10) Patent No.: US 11,089,310 B2
(45) Date of Patent: Aug. 10, 2021

(54) INTERPOLATION FOR INTER PREDICTION WITH REFINEMENT

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/005,483

(22) Filed: Aug. 28, 2020

(65) Prior Publication Data
US 2020/0396453 A1 Dec. 17, 2020

Related U.S. Application Data

(63) Continuation of application No. PCT/CN2019/115697, filed on Nov. 5, 2019.

(30) Foreign Application Priority Data

Nov. 5, 2018 (WO) ................ PCT/CN2018/113928

(51) Int. Cl.
H04N 19/00 (2014.01)
H04N 19/159 (2014.01)
(Continued)

(52) U.S. Cl.
CPC ......... *H04N 19/159* (2014.11); *H04N 19/117* (2014.11); *H04N 19/132* (2014.11);
(Continued)

(58) Field of Classification Search
CPC .... H04N 19/159; H04N 19/96; H04N 19/172; H04N 19/132; H04N 19/186;
(Continued)

(56) References Cited

U.S. PATENT DOCUMENTS 9,369,711 B2 6/2016 Wang
9,374,581 B2 6/2016 Wang
(Continued)

FOREIGN PATENT DOCUMENTS

CN 104396243 A 3/2015
CN 107925775 A 4/2018
(Continued)

OTHER PUBLICATIONS

Alshin et al. "Non TEB3: Bi-directional Optical Flow for Inter-Layer Texture Prediction," Joint Collaborative Team on Video Coding (JCT-VC) of ITU-T SG 16 WP 3 and ISO/IEC JTC 1/SC 29/WG 11, 12th Meeting, Geneva, CH, Jan. 14-23, 2013, document JCTVC-L0084, 2013.

(Continued)

*Primary Examiner* — Zhihan Zhou
(74) *Attorney, Agent, or Firm* — Perkins Coie LLP

(57) ABSTRACT

Devices, systems and methods for digital video coding, which includes inter prediction with refinement, are described. An exemplary method of video processing includes determining to use, for a conversion between a current block of a video and a bitstream representation of the video, a first linear optimization model for the conversion using a first coding mode, the first linear optimization model being derived from a second linear optimization model that is used for the conversion using a second coding mode, and performing, based on the determining, the conversion. Another exemplary method of video processing includes determining to use, for a conversion between a current block (Continued)

of a video and a bitstream representation of the video, a gradient value computation algorithm for a bi-directional optical flow tool, and performing, based on the determining, the conversion.

21 Claims, 38 Drawing Sheets

(51) Int. Cl.
    *H04N 19/172*     (2014.01)
    *H04N 19/176*     (2014.01)
    *H04N 19/96*     (2014.01)
    *H04N 19/117*     (2014.01)
    *H04N 19/132*     (2014.01)
    *H04N 19/186*     (2014.01)

(52) U.S. Cl.
    CPC ......... *H04N 19/172* (2014.11); *H04N 19/176* (2014.11); *H04N 19/186* (2014.11); *H04N 19/96* (2014.11)

(58) Field of Classification Search
    CPC .. H04N 19/577; H04N 19/176; H04N 19/513; H04N 19/50; H04N 19/117
    See application file for complete search history.

(56) References Cited

U.S. PATENT DOCUMENTS

| | | | |
|---|---|---|---|
| 9,380,305 B2 | 6/2016 | Li et al. | |
| 9,538,180 B2 | 1/2017 | Zhang et al. | |
| 9,918,105 B2 | 3/2018 | Pang et al. | |
| 10,200,709 B2 | 2/2019 | Chen et al. | |
| 10,368,083 B2 | 7/2019 | Chien et al. | |
| 10,462,462 B2 | 10/2019 | Chien et al. | |
| 2012/0230407 A1 | 9/2012 | Minoo et al. | |
| 2013/0177084 A1 | 7/2013 | Wang et al. | |
| 2015/0271525 A1 | 9/2015 | Hendry et al. | |
| 2016/0275377 A1 | 9/2016 | Manu et al. | |
| 2017/0374369 A1 | 12/2017 | Chuang et al. | |
| 2018/0063531 A1 | 3/2018 | Hu et al. | |
| 2018/0098066 A1* | 4/2018 | Lee | H04N 19/176 |
| 2018/0192072 A1* | 7/2018 | Chen | H04N 5/145 |
| 2018/0241998 A1* | 8/2018 | Chen | H04N 19/51 |
| 2018/0278949 A1 | 9/2018 | Karczewicz et al. | |
| 2019/0141320 A1 | 5/2019 | Wang et al. | |
| 2019/0268594 A1* | 8/2019 | Lim | H04N 19/80 |
| 2019/0320199 A1 | 10/2019 | Chen et al. | |
| 2020/0029091 A1 | 1/2020 | Chien et al. | |
| 2020/0221122 A1 | 7/2020 | Ye et al. | |
| 2020/0382795 A1 | 12/2020 | Zhang et al. | |
| 2021/0084325 A1 | 3/2021 | Lim et al. | |

FOREIGN PATENT DOCUMENTS

| | | |
|---|---|---|
| WO | 2017197146 A1 | 11/2017 |
| WO | 2018067848 A1 | 4/2018 |
| WO | 2018097700 A1 | 5/2018 |
| WO | 2018129172 A1 | 7/2018 |
| WO | 2018156628 A1 | 8/2018 |
| WO | 2018175756 A1 | 9/2018 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0:—https://jvet.hhi.fraunhofer.de/svn/svn_HMJEMSoftware/tags/ HM-16.6-38JEM-7.0 (Accessed on Apr. 21, 2020).
Information Technology—High efficiency coding and media delivery in heterogeneous environments—Part 2: "High Efficiency Video Coding" ISO/IEC JTC 1/SC 29/WG 11 N 17661, ISO/IEC DIS 23008-2_201x(4th Ed.) (Apr. 2018).
Laroche et al, "CE3-5.1: On Cross-Component Linear Model Simplification," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0191, 2018.
Rosewarne C et al. "High Efficiency Video Coding (HEVC) Test Model 16 (HM16) Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.
Su et al. "CE4.4.1: Generalized Bi-Prediction for Inter Coding," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0248, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0256, 2018.
Yoo et al. "CE3-2.3.3 and CE3-2.3.4: Interpolation Filter Selection Regarding Intra Mode and Block Size," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0097, 2018.
International Search Report and Written Opinion from PCT/CN2019/115695 dated Feb. 6, 2020 (9 pages).
International Search Report and Written Opinion from PCT/CN2019/115697 dated Jan. 20, 2020 (9 pages).
International Search Report and Written Opinion from PCT/CN2019/115722 dated Jan. 22, 2020 (14 pages).
Liu et al. "Two-Pass Bi-Directional Optical Flow Via Motion Vector Refinement," 2019 IEEE International Conference on Image Processing (ICIP), Taipei, Taiwan, 2019, pp. 1208-1211.
Xiu et al. "CE9.5.3: Bi-Directional Optical Flow (BIO) Simplification," Joint Video Experts Team (JVET) of ITU-T SG 16 WP 3 and ISO/IEC JTC 1/SC 29/WG 11, 11th, Meeting, Ljubljana, SI, Jul. 10-18, 2018, document JVET-K0344, 2018.
Non-Final Office Action from U.S. Appl. No. 17/167,169 dated Apr. 7, 2021.
Non-Final Office Action from U.S. Appl. No. 16/998,406 dated Dec. 16, 2020.

* cited by examiner

INTERPOLATION FOR INTER PREDICTION WITH REFINEMENT

CROSS REFERENCE TO RELATED APPLICATIONS

This application is a continuation of International Application No. PCT/CN2019/115697, filed on Nov. 5, 2019, which claims the priority to and benefits of International Patent Application No. PCT/CN2018/113928, filed on Nov. 5, 2018. All the aforementioned patent application is hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to harmonization of linear mode prediction for video coding. The described methods may be applied to both the existing video coding standards (e.g., High Efficiency Video Coding (HEVC)) and future video coding standards or video codecs.

In one representative aspect, the disclosed technology may be used to provide a method of video processing. This method includes determining to use, for a conversion between a current block of a video and a bitstream representation of the video, a first linear optimization model for the conversion using a first coding mode, the first linear optimization model being derived from a second linear optimization model that is used for the conversion using a second coding mode; and performing, based on the determining, the conversion.

In another representative aspect, the disclosed technology may be used to provide a method of video processing. This method includes enabling, based on one or more picture order count (POC) parameters associated with a picture of a current block of video, either a first prediction mode or a second prediction mode different from the first prediction mode, the first prediction mode being a coding mode using optical flow; and performing, based on the first mode or the second mode, a conversion between the current block and a bitstream representation of the video.

In yet another representative aspect, the disclosed technology may be used to provide a method of video processing. This method includes consecutively deriving, based on coded information associated with a current block of video, one or more velocity vectors ($v_x$, $v_y$) associated with a reference picture of the current block; and performing, based on the one or more velocity vectors, a conversion between the current block and a bitstream representation of the video, the coded information comprising a value of a horizontal component of a motion vector of the current block, a value of a vertical component of the motion vector of the current block, or a size of the current block.

In yet another representative aspect, the disclosed technology may be used to provide a method of video processing. This method includes performing, upon a determination that a coding mode using optical flow has been enabled for a current block of video, a filtering operation using a single type of interpolation filter for each color component of the current block; and performing, based on the filtering operation, a conversion between the current block and a bitstream representation of the video.

In yet another representative aspect, the disclosed technology may be used to provide a method of video processing. This method includes performing, upon a determination that a coding mode using optical flow has been enabled for a current block of video, a filtering operation using a single type of interpolation filter for each color component of the current block; performing, upon a determination that at least one sample of the current block is located outside a predetermined range, a padding operation; and performing, based on the filtering operation and the padding operation, a conversion between the current block and a bitstream representation of the video.

In yet another representative aspect, the disclosed technology may be used to provide a method of video processing. This method includes determining to use, for a conversion between a current block of a video and a bitstream representation of the video, a gradient value computation algorithm for an optical flow tool; and performing, based on the determining, the conversion.

In yet another representative aspect, the disclosed technology may be used to provide a method of video processing. This method includes making a decision, based on one or more sum of absolute difference (SAD) calculations for a sub-block of a current block of video, regarding a selective enablement of a coding mode using optical flow for the current block; and performing, based on the decision, a conversion between the current block and a bitstream representation of the current block.

In yet another representative aspect, the disclosed technology may be used to provide a method of video processing. This method includes deriving, based on a selective enablement of a generalized bi-prediction improvement (GBi) process for a current block of video, one or more parameters of a coding mode using optical flow for the current block; and performing, based on the one or more parameters of the coding mode using optical flow, a conversion between the current block and a bitstream representation of the video.

In yet another representative aspect, the disclosed technology may be used to provide a method of video processing. This method includes performing, for a current block of video coded with a coding mode using optical flow, a clipping operation on a final prediction output of the coding mode using optical flow; and performing, based on the final prediction output, a conversion between the current block and a bitstream representation of the video.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
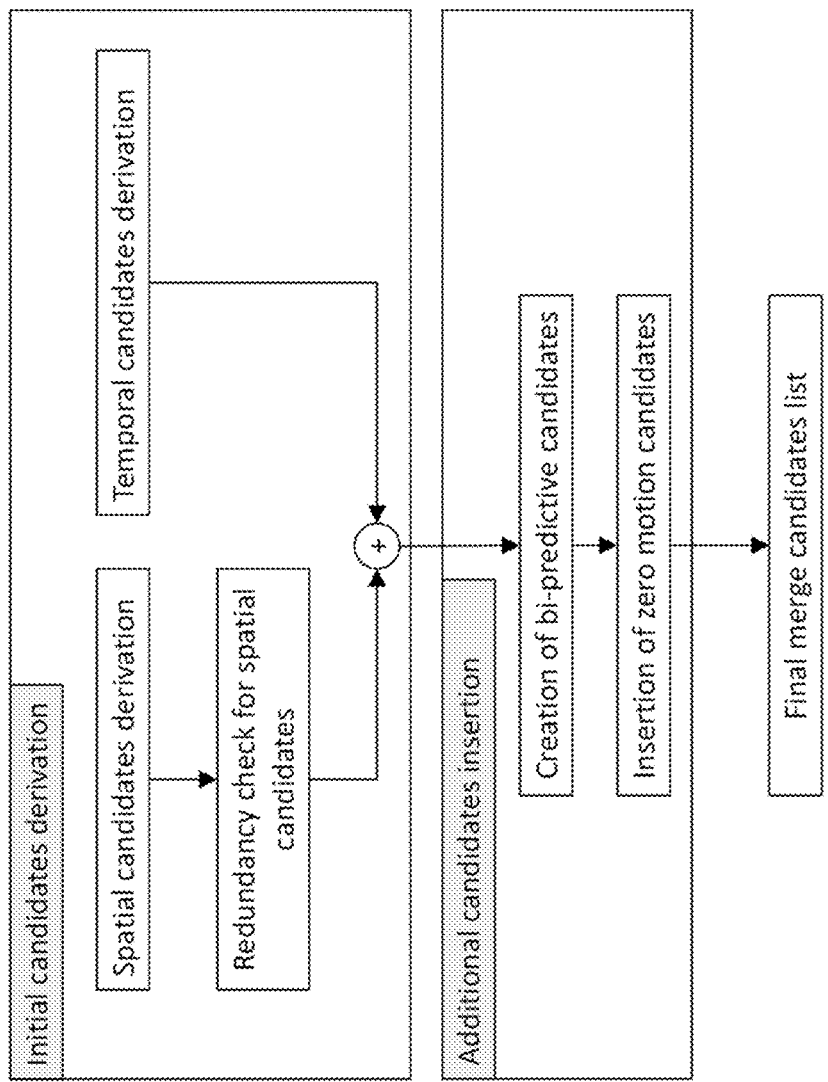
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:
Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
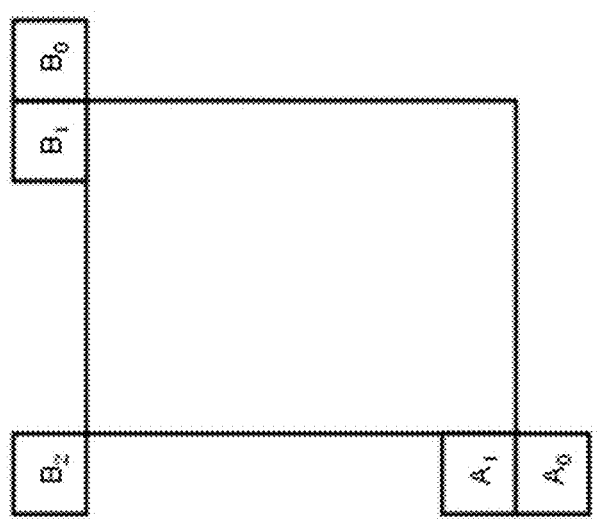
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
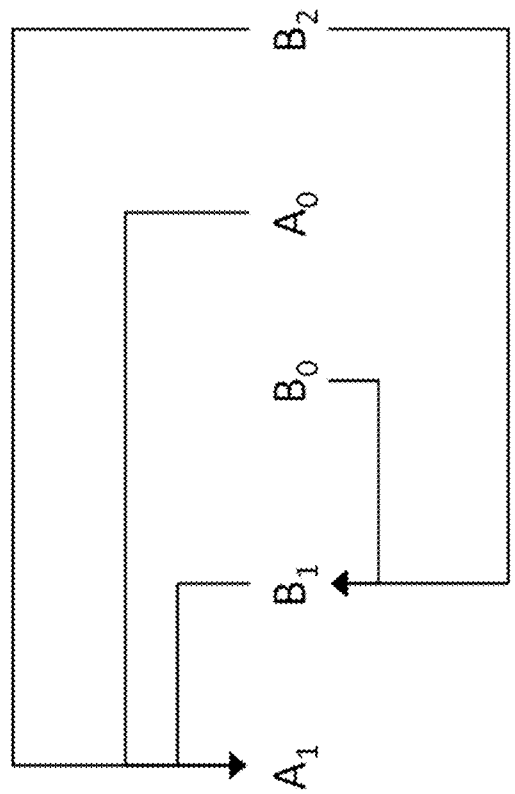
FIG. 3 shows an example of candidate pairs subject to a redundancy check of spatial merge candidates.
Figure 4B:
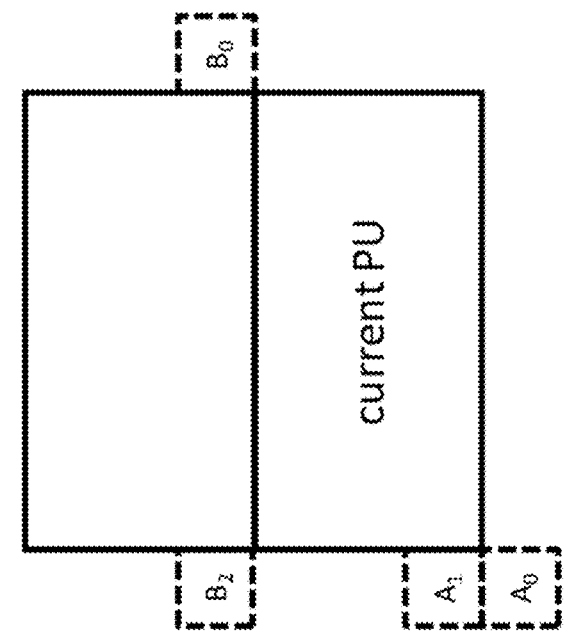
FIGS. 4A and 4B show examples of the position of a second prediction unit (PU) based on the size and shape of the current block.
Figure 4A:
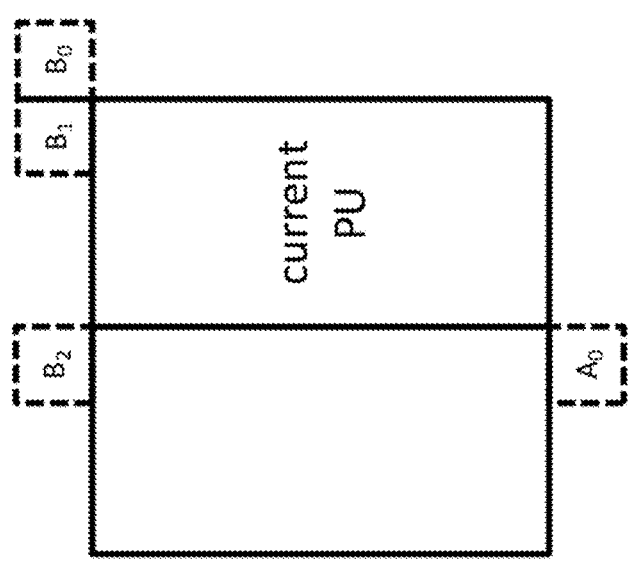

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
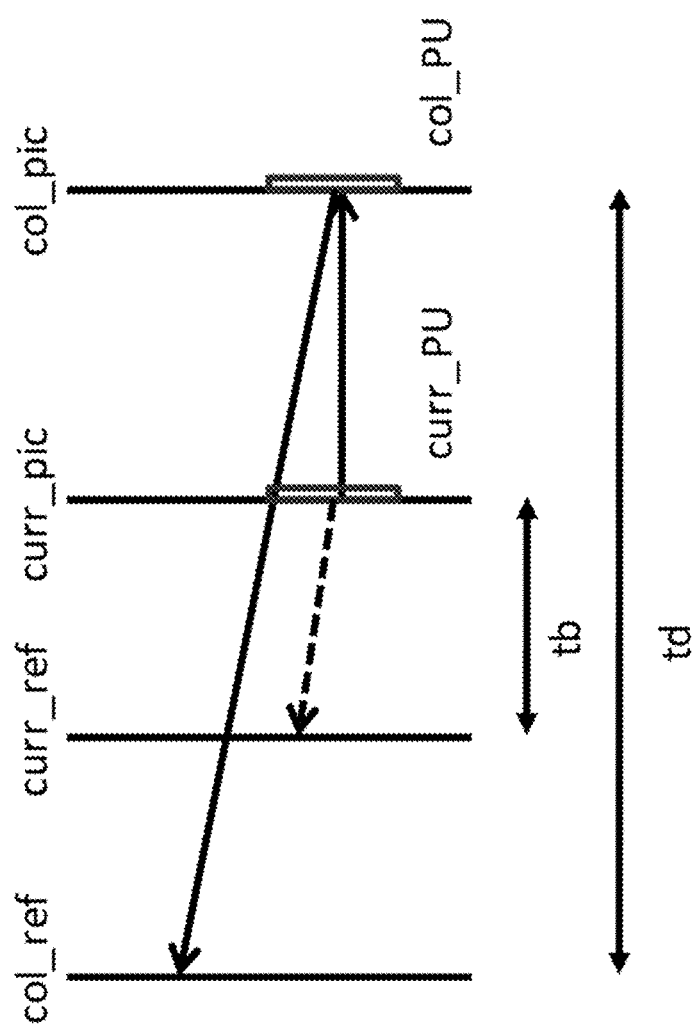
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
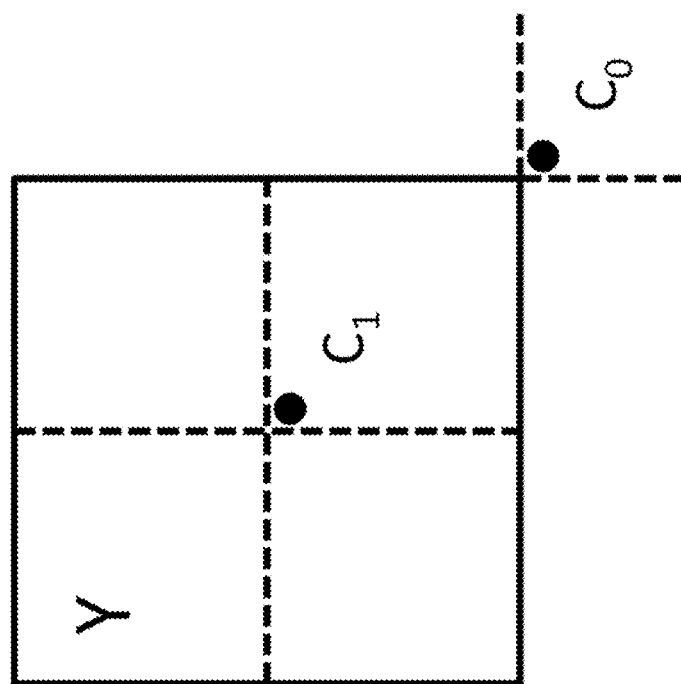
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
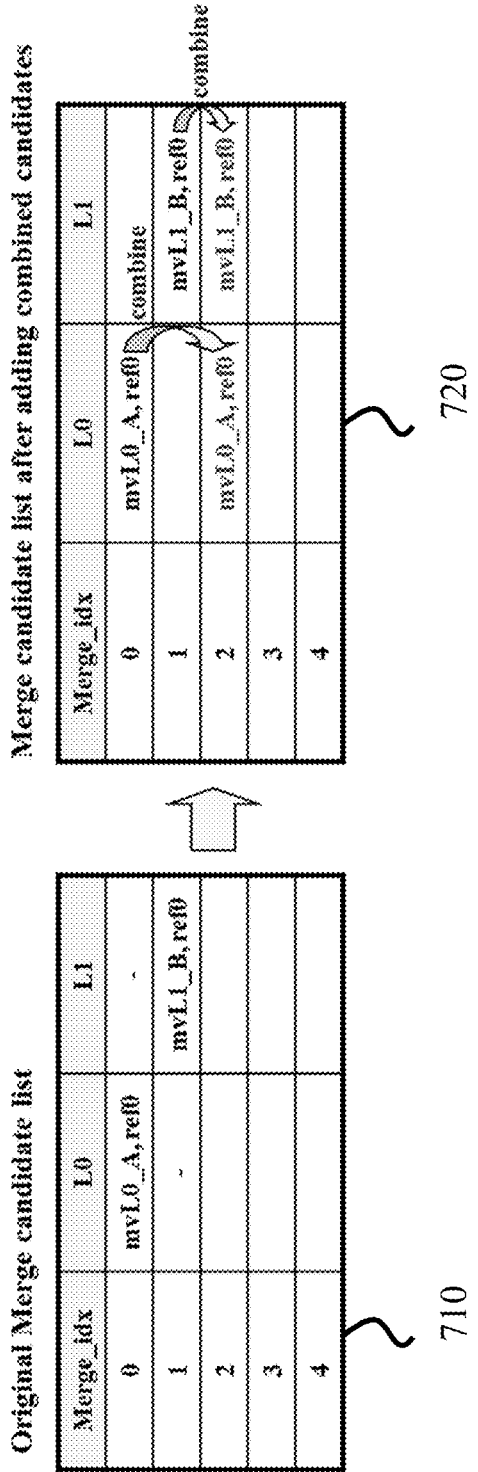
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log_2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
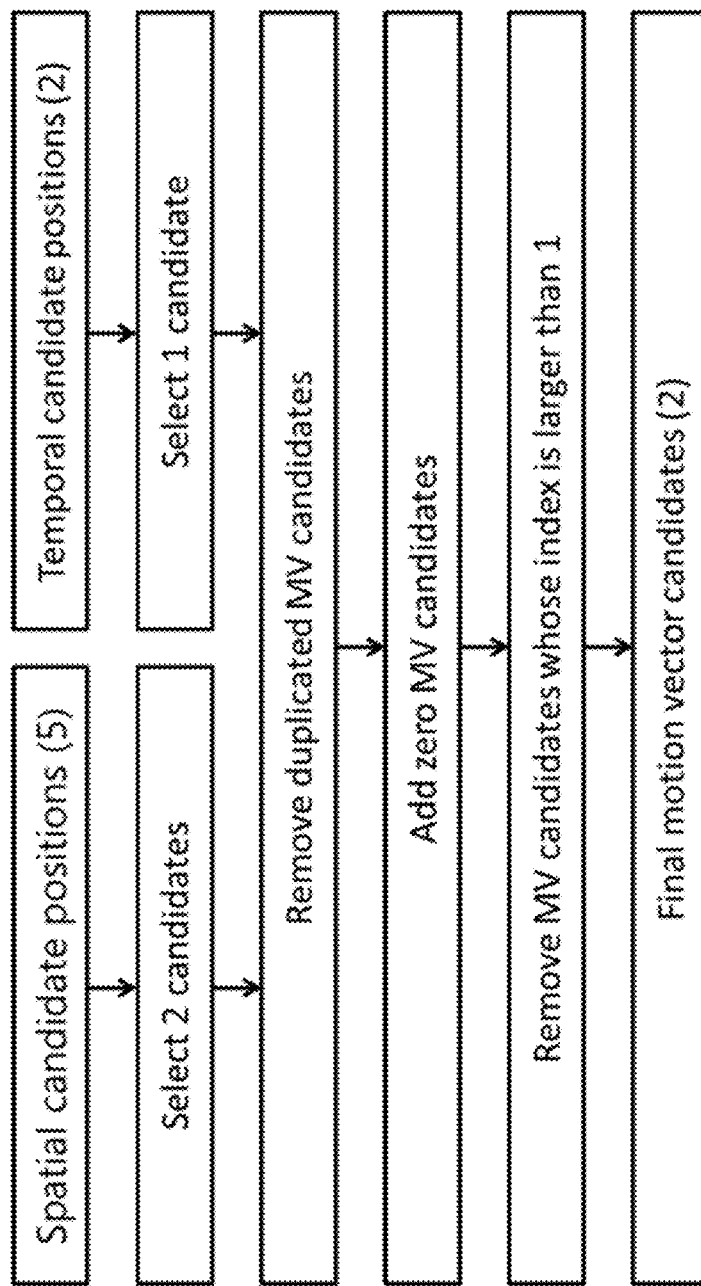
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
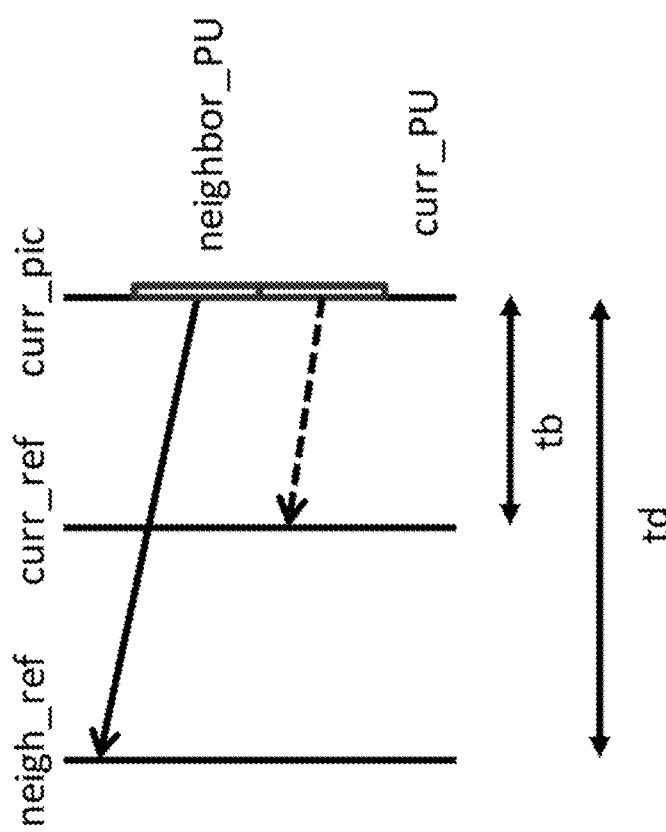
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BDOF or BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
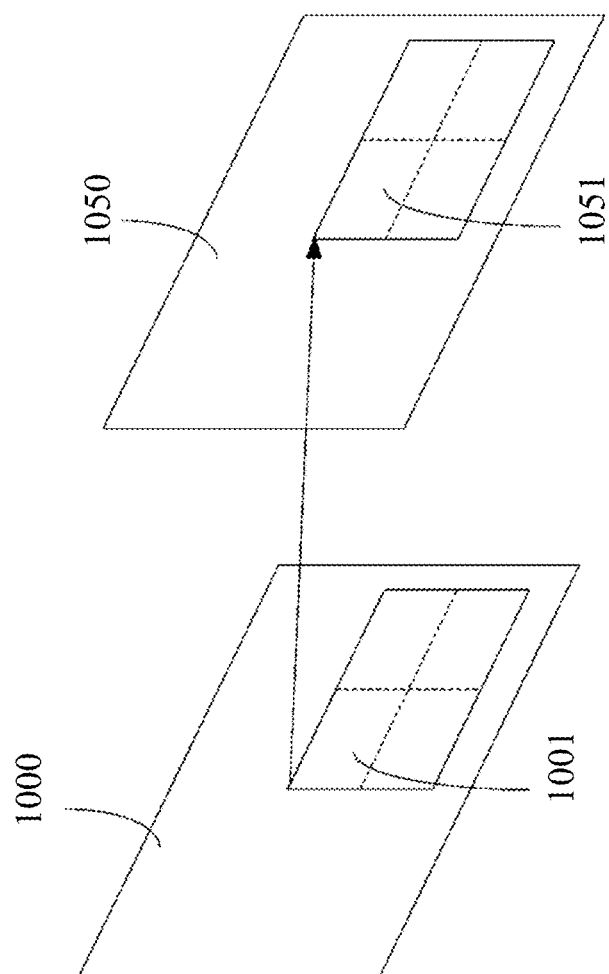
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
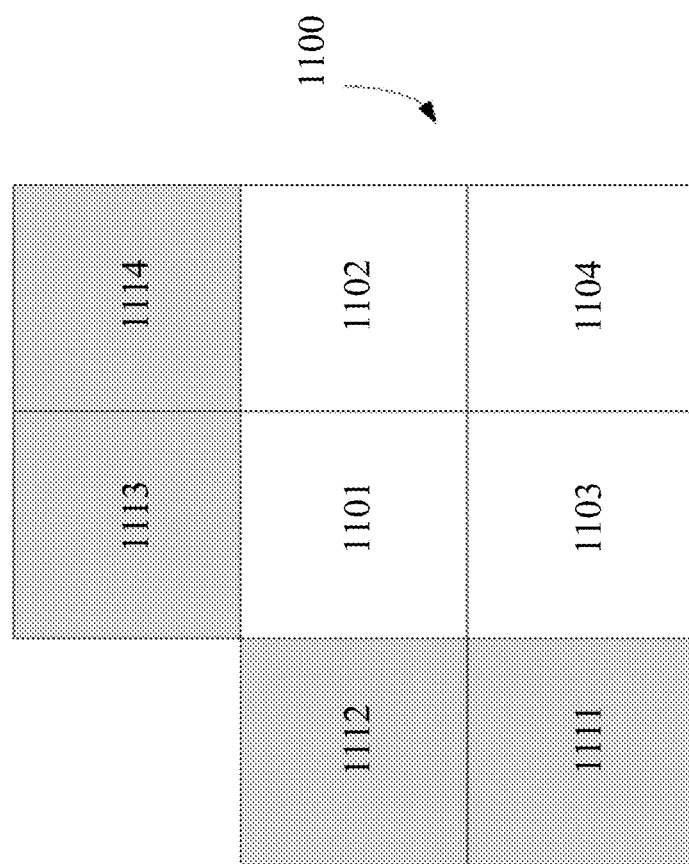
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
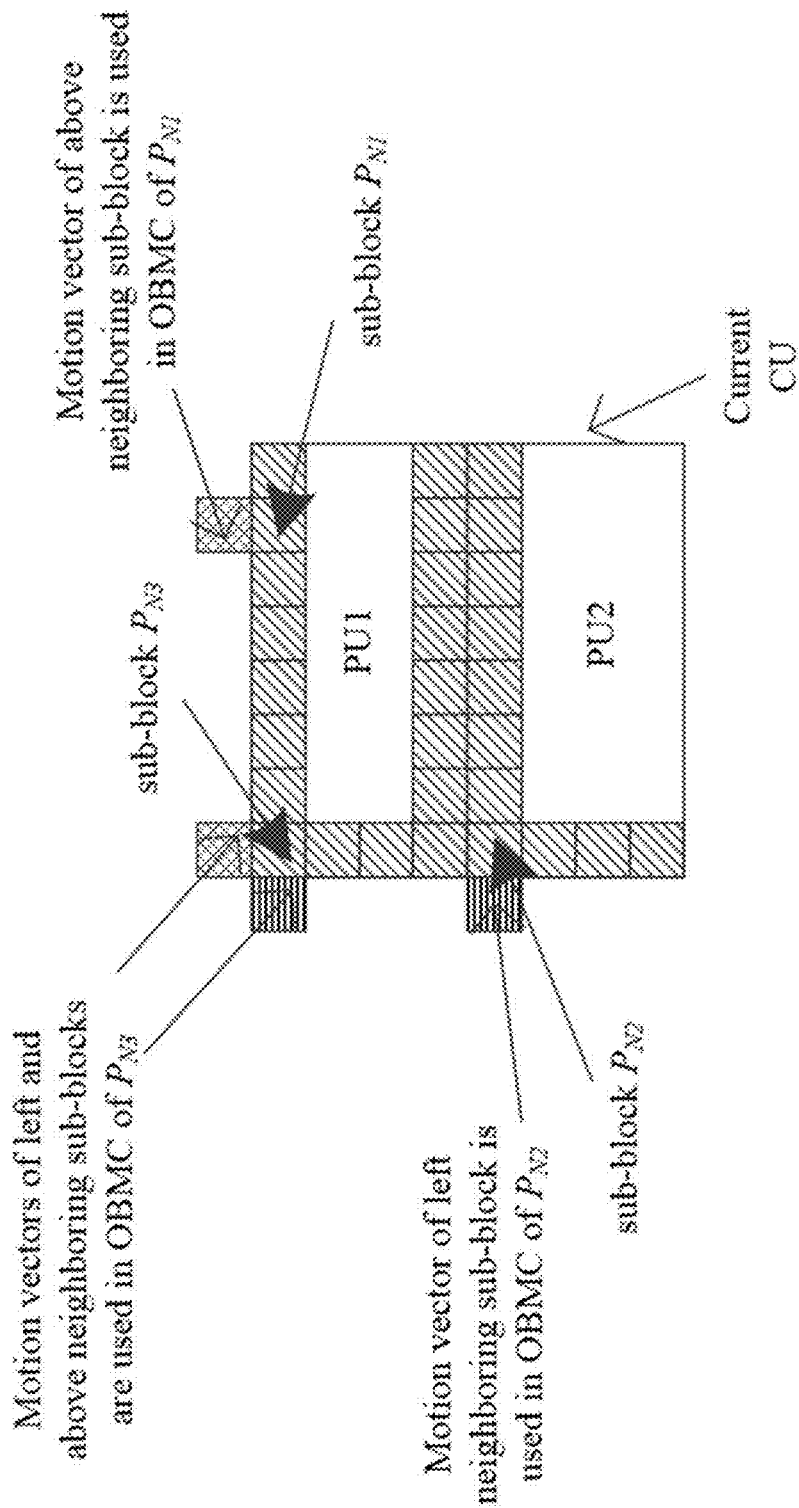
FIGS. 12A and 12B show example snapshots of sub-block when using the overlapped block motion compensation (OBMC) algorithm.
Figure 12B:
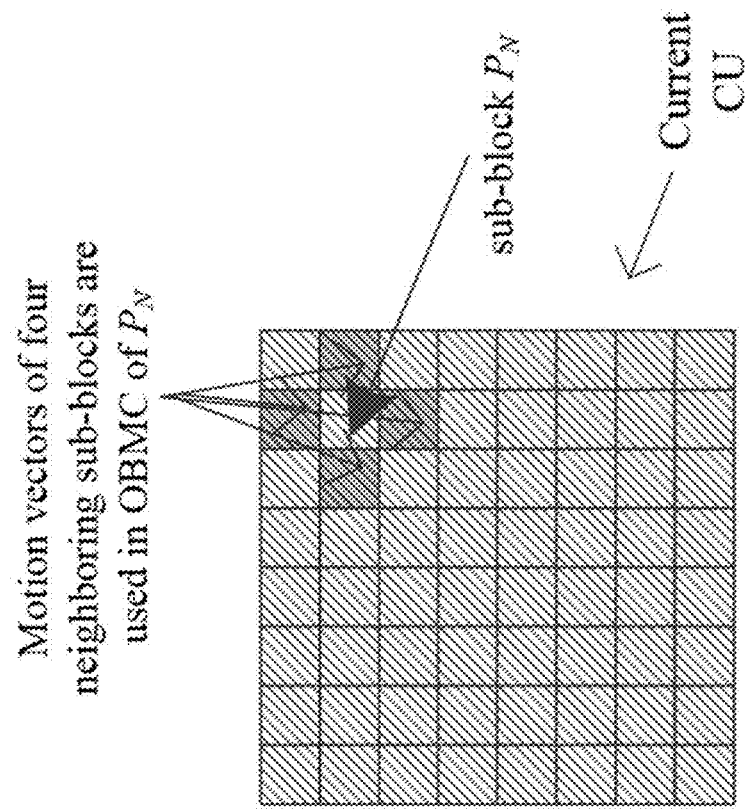

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 13:
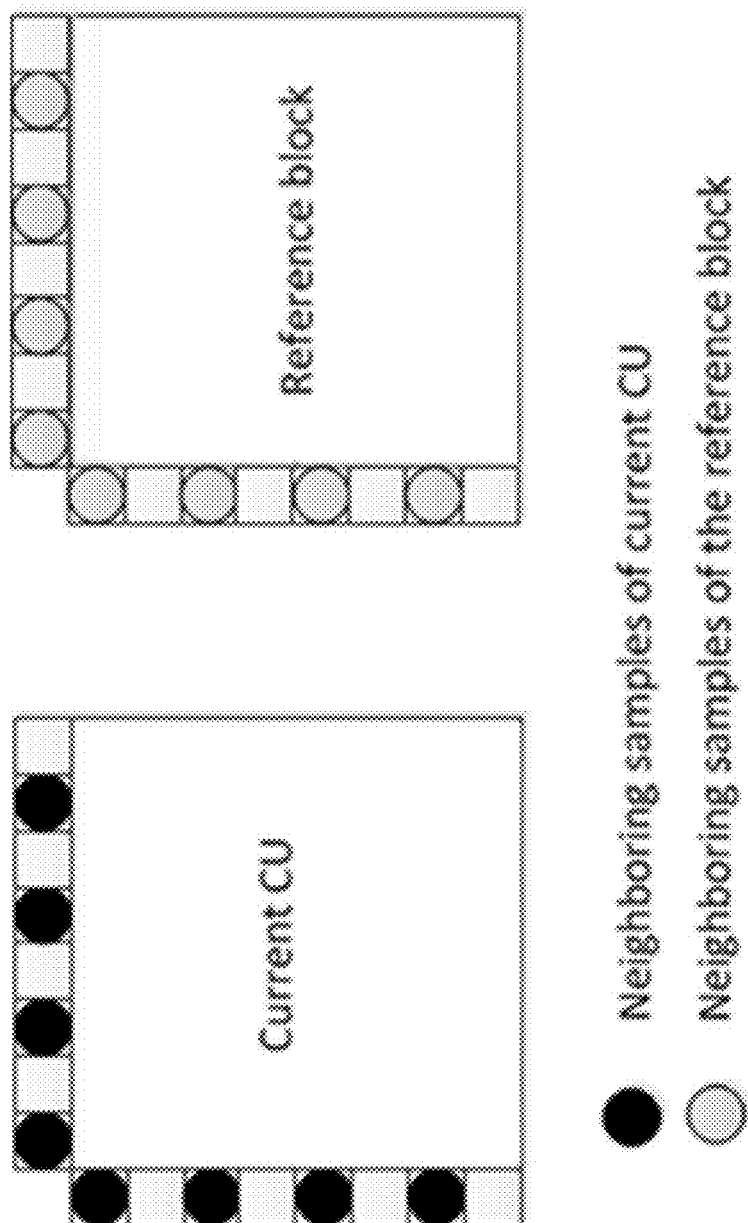
FIG. 13 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 13 shows an example of neighboring samples used to derive parameters of the IC algorithm. Specifically, and as shown in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 14:
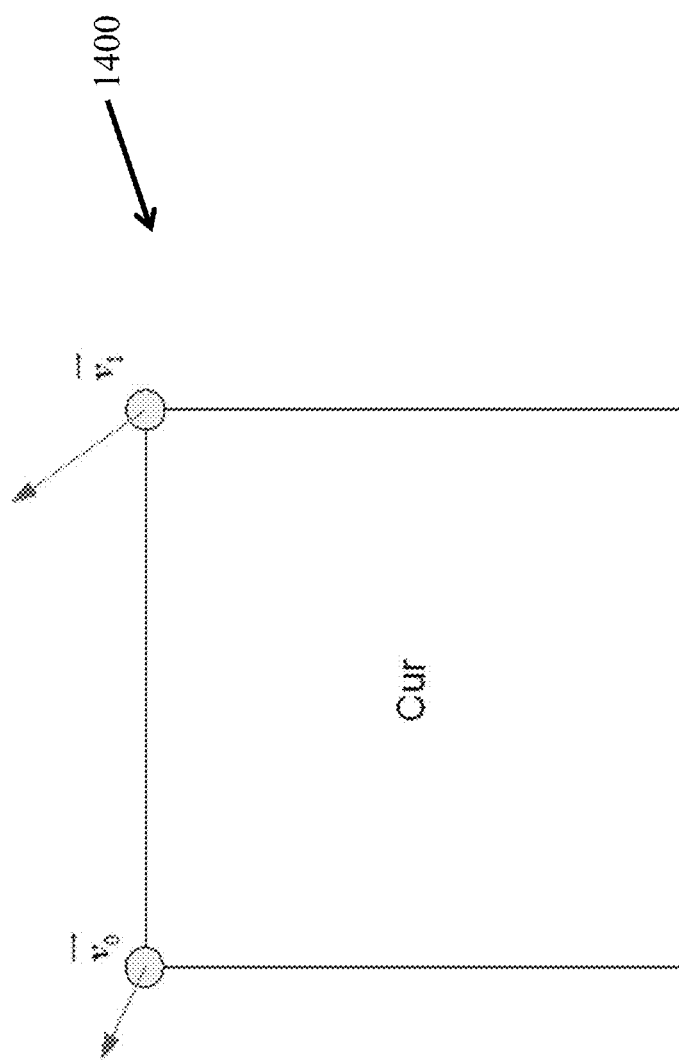
FIG. 14 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 14 shows an example of an affine motion field of a block 1400 described by two control point motion vectors $V_0$ and $V_1$. The motion vector field (MVF) of the block 1400 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 14, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 15:
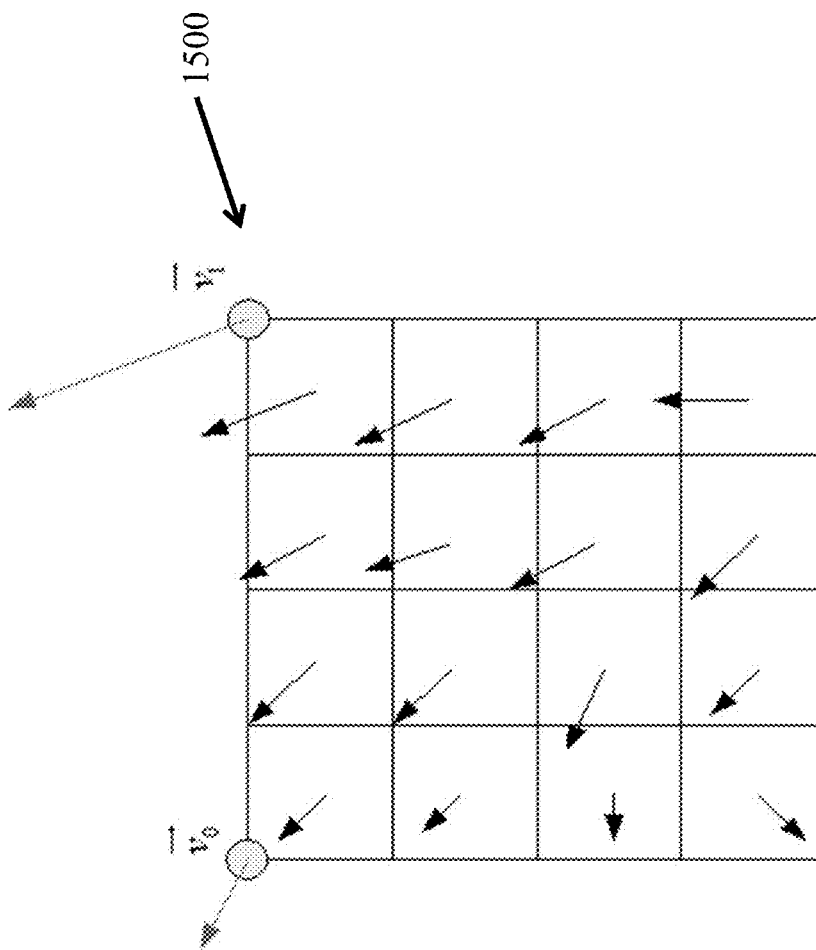
FIG. 15 shows an example of an affine motion vector field (MVF) per sub-block.

FIG. 15 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.6.1 Embodiments of the AF_INTER mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{V_A, V_B, V_C\}, v_1=\{v_D, v_E\}\}$ is constructed using the neighboring blocks.

Figure 16:
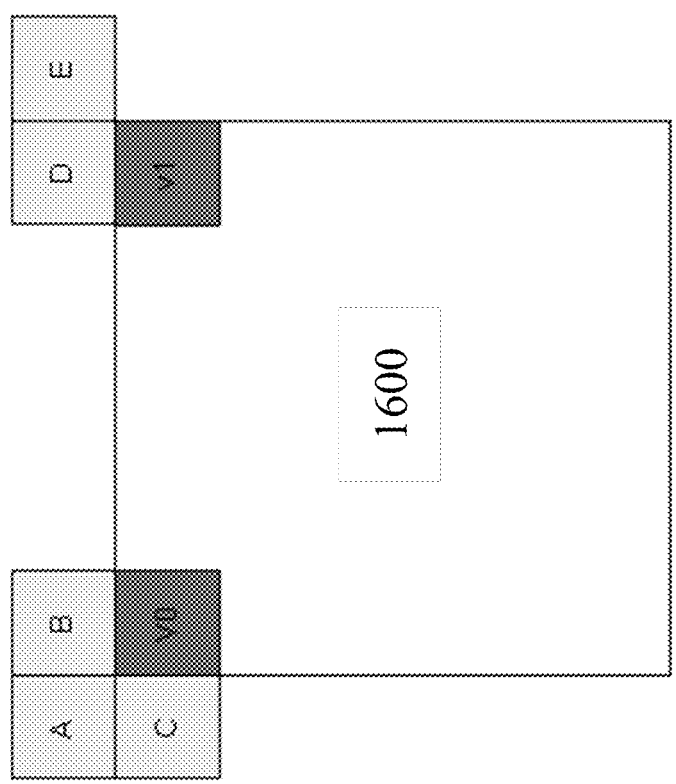
FIG. 16 shows an example of motion vector prediction (MVP) for the AF_INTER affine motion mode.

FIG. 16 shows an example of motion vector prediction (MVP) for a block 1600 in the AF_INTER mode. As shown in FIG. 16, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

2.6.3 Embodiments of the AF_MERGE Mode

Figure 17B:
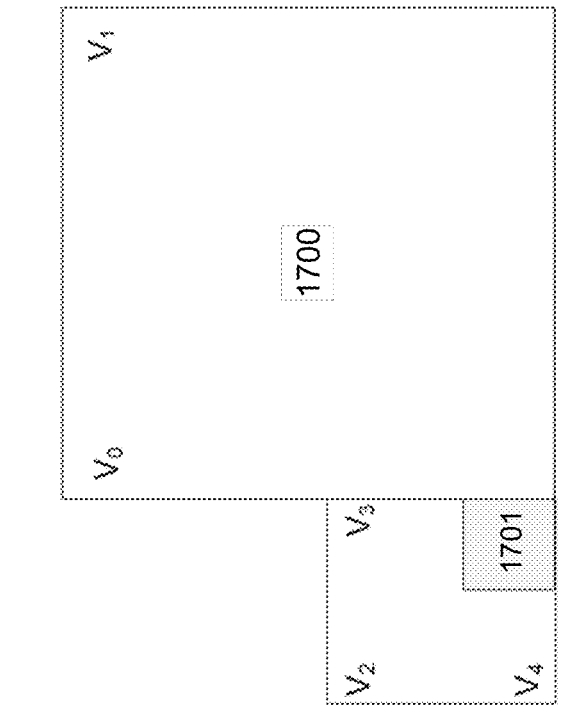
FIGS. 17A and 17B show example candidates for the AF_MERGE affine motion mode.
Figure 17A:
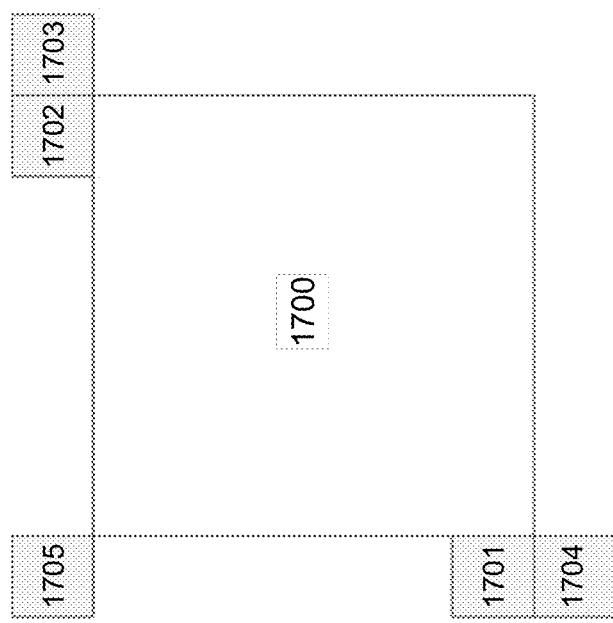

When a CU is applied in AF_MERGE mode, it gets the first block coded with an affine mode from the valid neighboring reconstructed blocks. FIG. 17A shows an example of the selection order of candidate blocks for a current CU 1700. As shown in FIG. 17A, the selection order can be from left (1701), above (1702), above right (1703), left bottom (1704) to above left (1705) of the current CU 1700. FIG. 17B shows another example of candidate blocks for a current CU 1700 in the AF_MERGE mode. If the neighboring left bottom block 1801 is coded in affine mode, as shown in FIG. 17B, the motion vectors $v_2$, $v_3$ and $v_4$ of the top left corner, above right corner, and left bottom corner of the CU containing the sub-block 1701 are derived. The motion vector $v_0$ of the top left corner on the current CU 1700 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (3)}$$

Figure 18:
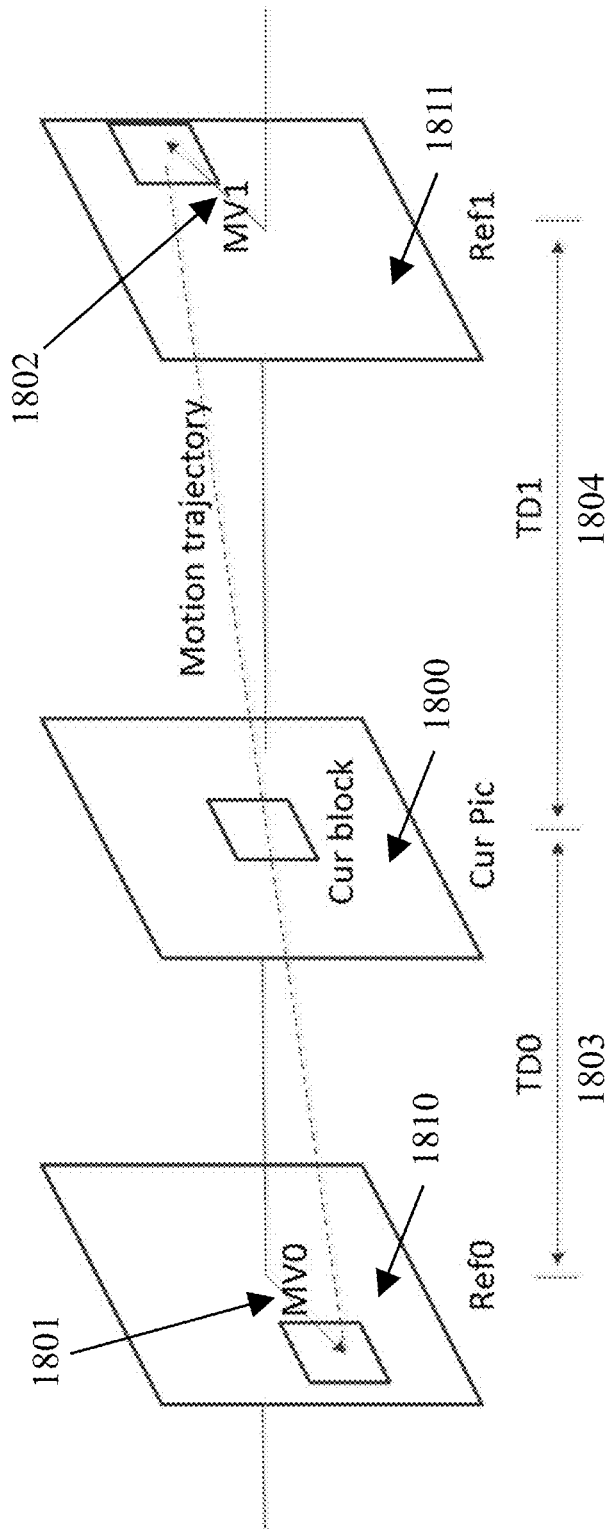
FIG. 18 shows an example of bilateral matching in pattern matched motion vector derivation (PMMVD) mode, which is a special merge mode based on the frame-rate up conversion (FRUC) algorithm.

FIG. 18 shows an example of bilateral matching used in the Frame-Rate Up Conversion (FRUC) method. The bilateral matching is used to derive motion information of the current CU by finding the closest match between two blocks along the motion trajectory of the current CU (1800) in two different reference pictures (1810, 1811). Under the assumption of continuous motion trajectory, the motion vectors MV0 (1801) and MV1 (1802) pointing to the two reference blocks are proportional to the temporal distances, e.g., TD0 (1803) and TD1 (1804), between the current picture and the two reference pictures. In some embodiments, when the current picture 1800 is temporally between the two reference pictures (1810, 1811) and the temporal distance from the current picture to the two reference pictures is the same, the bilateral matching becomes mirror based bi-directional MV.

Figure 19:
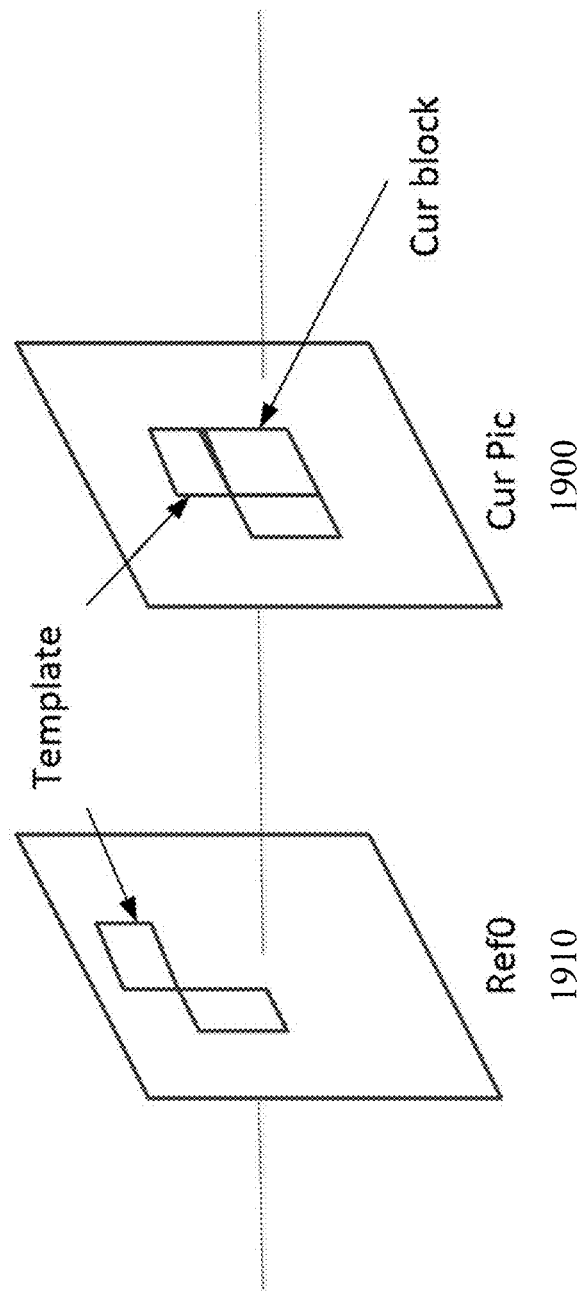
FIG. 19 shows an example of template matching in the FRUC algorithm.

FIG. 19 shows an example of template matching used in the Frame-Rate Up Conversion (FRUC) method. Template matching can be used to derive motion information of the current CU 1900 by finding the closest match between a template (e.g., top and/or left neighboring blocks of the current CU) in the current picture and a block (e.g., same size to the template) in a reference picture 1910. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb; is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 20:
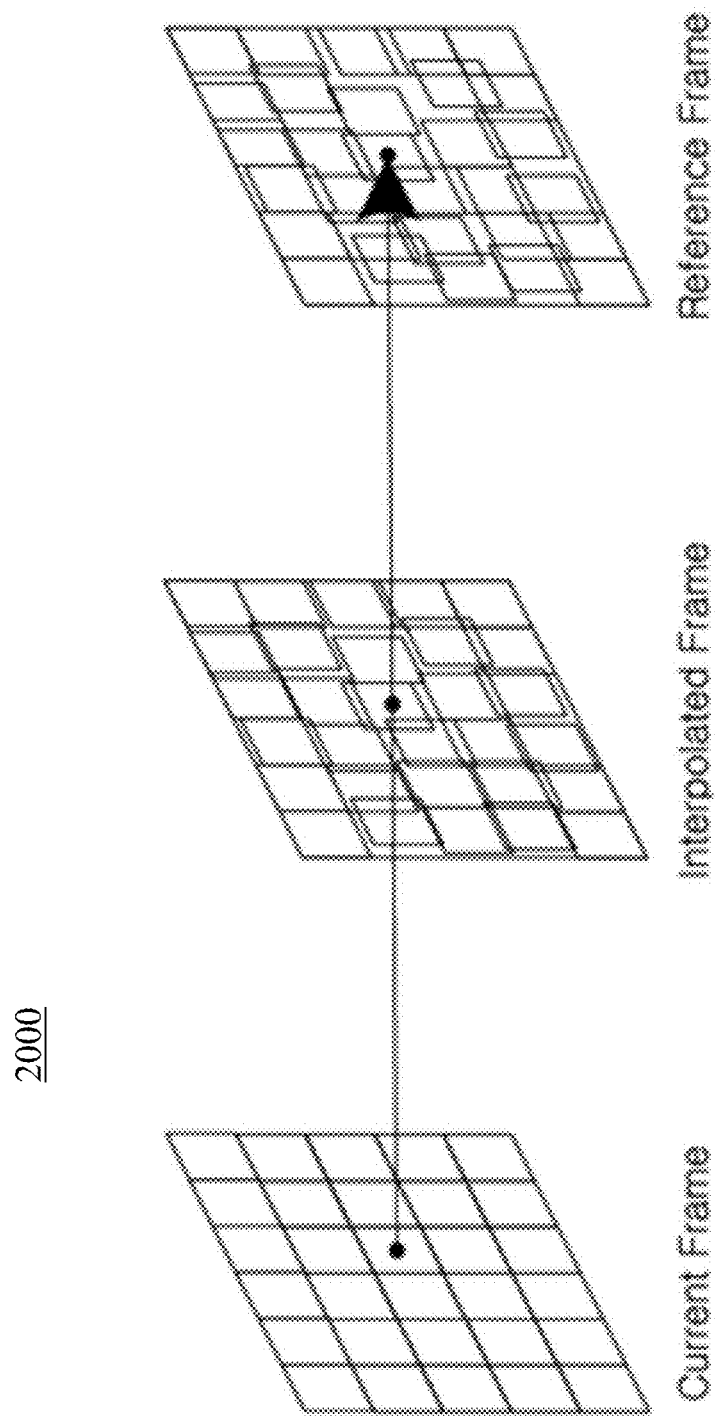
FIG. 20 shows an example of unilateral motion estimation in the FRUC algorithm.
Figure 21:
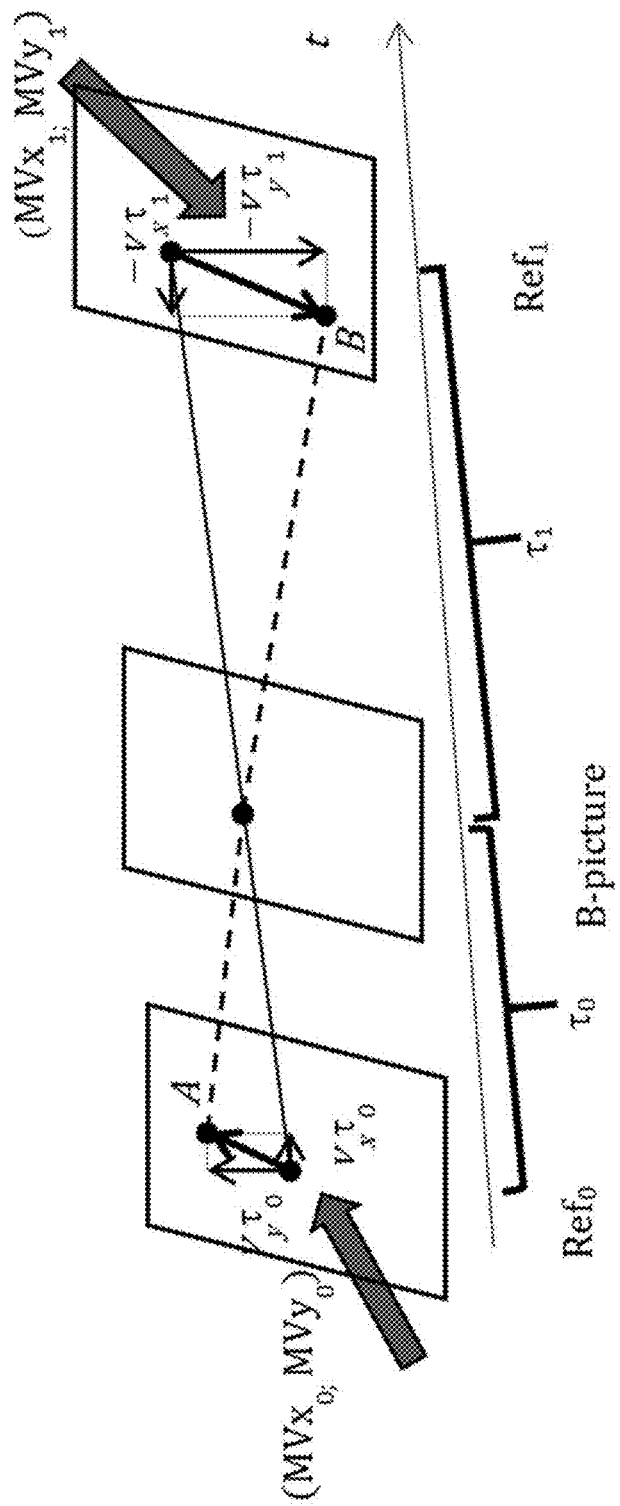
FIG. 21 shows an example of an optical flow trajectory used by the bi-directional optical flow (BDOF) algorithm.

In some embodiments, the motion field of each reference pictures in both reference lists is traversed at 4×4 block level. FIG. 20 shows an example of unilateral Motion Estimation (ME) 2000 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.8 Examples of Generalized Bi-Prediction Improvement (GBi)

Generalized Bi-prediction improvement (GBi) is adopted into VTM-3.0. GBi applies unequal weights to predictors from L0 and L1 in bi-prediction mode. In inter prediction mode, multiple weight pairs including the equal weight pair (1/2, 1/2) are evaluated based on rate-distortion optimization (RDO), and the GBi index of the selected weight pair is signaled to the decoder. In merge mode, the GBi index is inherited from a neighboring CU. The predictor generation formula is shown as in Equation (5).

$$P_{GBi} = (W0 \times P_{L0} + w1 \times P_{L1} + \text{RoundingOffset}) >> \text{shiftNum}_{GBi}, \quad \text{Eq. (5)}$$

Herein, $P_{GBi}$ is the final predictor of GBi, $w_0$ and $w_1$ are the selected GBi weights applied to predictors ($P_{L0}$ and $P_{L1}$) of list 0 (L0) and list 1 (L1), respectively. RoundingOffset$_{GBi}$, and shiftNum$_{GBi}$ are used to normalize the final predictor in GBi. The supported $w_1$ weight set is {−1/4, 3/8, 1/2, 5/8, 5/4}, in which the five weights correspond to one equal weight pair and four unequal weight pairs. The blending gain, i.e., sum of $W_1$ and $w_0$, is fixed to 1.0. Therefore, the corresponding $w_0$ weight set is {5/4, 5/8, 1/2, 3/8, −1/4}. The weight pair selection is at CU-level.

For non-low delay pictures, the weight set size is reduced from five to three, where the $w_1$ weight set is {3/8, 1/2, 5/8} and the $w_0$ weight set is {5/8, 1/2, 3/8}. The weight set size reduction for non-low delay pictures is applied to the BMS2.1 GBi and all the GBi tests in this contribution.

2.8.1 GBi Encoder Bug Fix

To reduce the GBi encoding time, in current encoder design, the encoder will store uni-prediction motion vectors estimated from GBi weight equal to 4/8, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to 4/8. Consequently, 4-parameter affine MVs may be overwritten by 6-parameter affine MVs after the encoding with GBi weight 4/8. The stored 6-parmater affine MVs may be used for 4-parameter affine ME for other GBi weights, or the stored 4-parameter affine MVs may be used for 6-parameter affine ME. The proposed GBi encoder bug fix is to separate the 4-paramerter and 6-parameter affine MVs storage. The encoder stores those affine MVs based on affine model type when GBi weight is equal to 4/8, and reuse the corresponding affine MVs based on the affine model type for other GBi weights.

2.8.2 GBi Encoder Speed Up

In this existing implementation, five encoder speed-up methods are proposed to reduce the encoding time when GBi is enabled.

(1) Skipping Affine Motion Estimation for Some GBi Weights Conditionally

In BMS2.1, affine ME including 4-parameter and 6-parameter affine ME is performed for all GBi weights. We propose to skip affine ME for those unequal GBi weights (weights unequal to 4/8) conditionally. Specifically, affine ME will be performed for other GBi weights if and only if the affine mode is selected as the current best mode and it is not affine merge mode after evaluating the GBi weight of 4/8. If current picture is non-low-delay picture, the bi-prediction ME for translation model will be skipped for unequal GBi weights when affine ME is performed. If affine mode is not selected as the current best mode or if affine merge is selected as the current best mode, affine ME will be skipped for all other GBi weights.

(2) Reducing the Number of Weights for RD Cost Checking for Low-Delay Pictures in the Encoding for 1-Pel and 4-Pel MVD Precision For low-delay pictures, there are five weights for RD cost checking for all MVD precisions including 1/4-pel, 1-pel and 4-pel. The encoder will check RD cost for 1/4-pel MVD precision first. We propose to skip a portion of GBi weights for RD cost checking for 1-pel and 4-pel MVD precisions. We order those unequal weights according to their RD cost in 1/4-pel MVD precision. Only the first two weights with the smallest RD costs, together with GBi weight 4/8, will be evaluated during the encoding in 1-pel and 4-pel MVD precisions. Therefore, three weights at most will be evaluated for 1-pel and 4-pel MVD precisions for low delay pictures.

(3) Conditionally Skipping Bi-Prediction Search when the L0 and L1 Reference pictures are the same For some pictures in RA, the same picture may occur in both reference picture lists (list-0 and list-1). For example, for random access coding configuration in CTC, the reference picture structure for the first group of pictures (GOP) is listed as follows.

POC: 16, TL:0, [L0: $\overline{0}$] [L1: $\overline{0}$]
POC: 8, TL:1, [L0: $\underline{0}$ 16] [L1: $\underline{16}$ 0]
POC: 4, TL:2, [L0: 0 $\underline{8}$] [L1: $\underline{8}$ 16]
POC: 2, TL:3, [L0: 0 $\underline{4}$] [L1: $\underline{4}$ 8]
POC: 1, TL:4, [L0: 0 $\underline{2}$] [L1: $\underline{2}$ 4]
POC: 3, TL:4, [L0: 2 0] [L1: 4 8]
POC: 6, TL:3, [L0: 4 0] [L1: 8 16]
POC: 5, TL:4, [L0: 4 0] [L1: 6 8]
POC: 7, TL:4, [L0: 6 4] [L1: 8 16]
POC: 12, TL:2, [L0: $\underline{8}$ 0] [L1: 16 $\underline{8}$]
POC: 10, TL:3, [L0: 8 0] [L1: 12 16]
POC: 9, TL:4, [L0: 8 0] [L1: 10 12]
POC: 11, TL:4, [L0: 10 8] [L1: 12 16]
POC: 14, TL:3, [L0: $\underline{12}$ 8] [L1: $\underline{12}$ 16]
POC: 13, TL:4, [L0: 12 8] [L1: 14 16]
POC: 15, TL:4, [L0: $\underline{14}$ 12] [L1: 16 $\underline{14}$]

Note that pictures 16, 8, 4, 2, 1, 12, 14 and 15 have the same reference picture(s) in both lists. For bi-prediction for these pictures, it is possible that the L0 and L1 reference pictures are the same. We propose that the encoder skips bi-prediction ME for unequal GBi weights when 1) two reference pictures in bi-prediction are the same and 2) temporal layer is greater than 1 and 3) the MVD precision is 1/4-pel. For affine bi-prediction ME, this fast skipping method is only applied to 4-parameter affine ME.

(4) Skipping RD Cost Checking for Unequal GBi Weight Based on Temporal Layer and the POC Distance Between Reference Picture and Current Picture We propose to skip those RD cost evaluations for those unequal GBi weights when the temporal layer is equal to 4 (highest temporal layer in RA) or the POC distance between reference picture (either list-0 or list-1) and current picture is equal to 1 and coding QP is greater than 32.

(5) Changing Floating-Point Calculation to Fixed-Point Calculation for Unequal GBi weight during ME For existing bi-prediction search, the encoder will fix the MV of one list and refine MV in another list. The target is modified before ME to reduce the computation complexity. For example, if the MV of list-1 is fixed and encoder is to refine MV of list-0, the target for list-0 MV refinement is modified with Equation (6). O is original signal and $P_1$ is the prediction signal of list-1. w is GBi weight for list-1.

$$T=((O<<3)-w*P_1)*(1/(8-w)) \qquad (6)$$

Herein, the term $(1/(8-w))$ is stored in floating point precision, which increases computation complexity. We propose to change Equation (6) to fixed-point as in Equation (7).

$$T=(O*a_1-P_1*a_2+\text{round})>>N \qquad (7)$$

where $a_1$ and $a_2$ are scaling factors and they are calculated as:

$$\gamma=(1<<N)/(8-w); a_1=\gamma<<3; a_2=\gamma*w; \text{round}=1<<(N-1)$$

2.8.3 CU Size Constraint for GBi

In this method, GBi is disabled for small CUs. In inter prediction mode, if bi-prediction is used and the CU area is smaller than 128 luma samples, GBi is disabled without any signaling.

2.9 Examples of Bi-Directional Optical Flow (BDOF)

In bi-directional optical flow (BDOF or BIO), motion compensation is first performed to generate the first predictions (in each prediction direction) of the current block. The first predictions are used to derive the spatial gradient, the temporal gradient and the optical flow of each sub-block or pixel within the block, which are then used to generate the second prediction, e.g., the final prediction of the sub-block or pixel. The details are described as follows.

BDOF is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \qquad \text{Eq. (5)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BDOF prediction:

$$\text{pred}_{BIO}=1/2 \cdot (I^{(0)}+I^{(1)}+v_x/2 \cdot (\tau_1 \partial I^{(1)}/\partial x - \tau_0 \partial I^{(0)}/\partial x)+v_y/ 2 \cdot (\tau_1 \partial I^{(1)}/\partial y - \tau_0 \partial I^{(0)}/\partial y)). \qquad \text{Eq. (6)}$$

Figure 24:
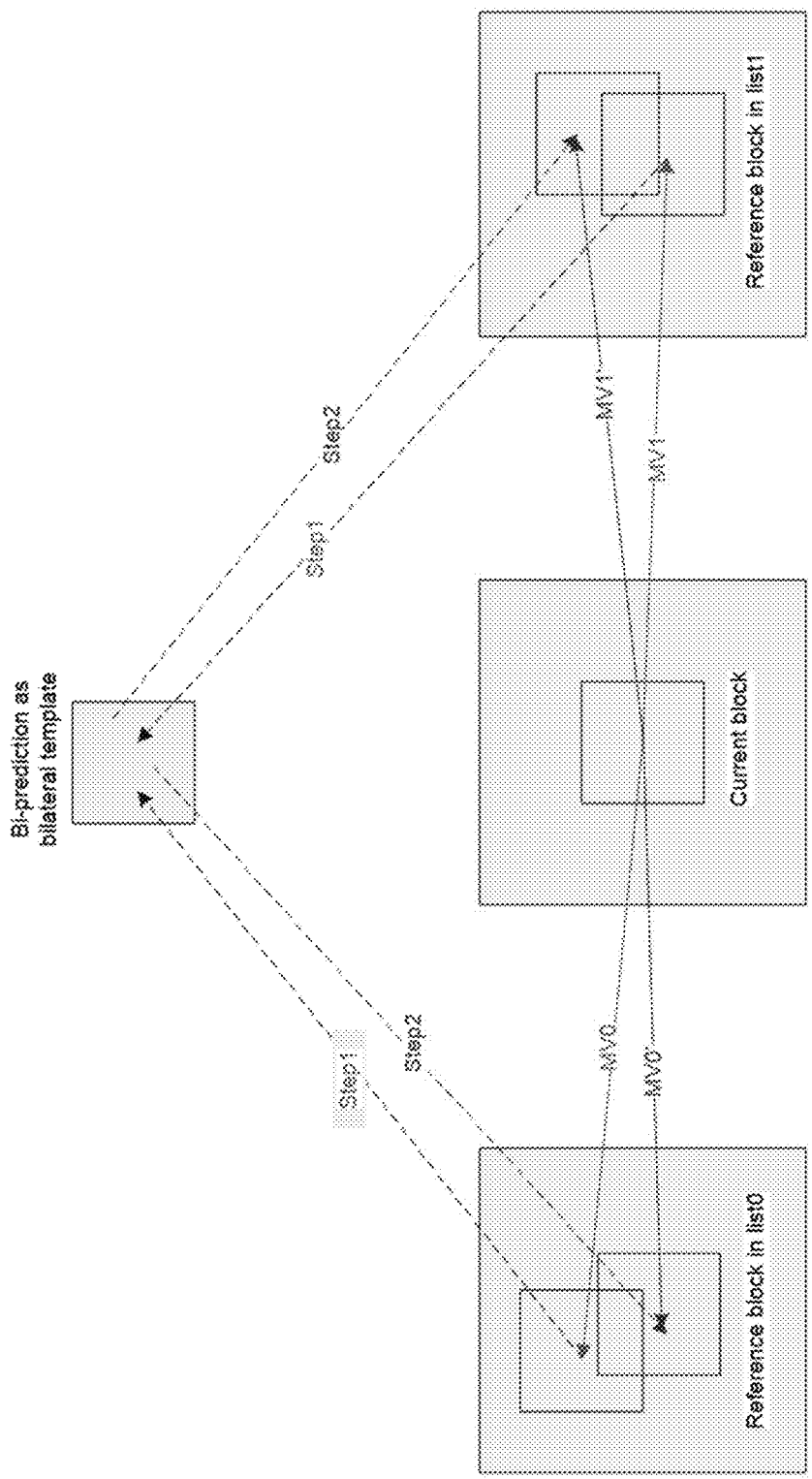
FIG. 24 shows an example of the decoder-side motion vector refinement (DMVR) algorithm based on bilateral template matching.

FIG. 24 shows an example optical flow trajectory in the Bi-directional Optical flow (BDOF) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0=\text{POC(current)}-\text{POC}(\text{Ref}_0)$, $\tau_1=\text{POC}(\text{Ref}_1)-\text{POC(current)}$. If both predictions come from the same time direction (either both from the past or both from the future) then the signs are different (e.g., $\tau_0 \cdot \tau_1 < 0$). In this case, BDOF is applied if the prediction is not from the same time moment (e.g., $\tau_0 \neq \tau_1$). Both referenced regions have non-zero motion (e.g. $MVx_0$, $MVy_0$, $MVx_1$, $MVy_1 \neq 0$), and the block motion vectors are proportional to the time distance (e.g. $MVx_0/MVx_1 = MVy_0/MVy_1 = -\tau_0/\tau_1$).

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta = (I^{(0)} - I^{(1)})_0 + v_x(\tau_1 \partial I^{(1)}/\partial x + \tau_0 \partial I^{(0)}/\partial x) + v_y \tau_1 \partial I^{(1)}/\partial y + \tau_0 \partial I^{(0)}/\partial y)) \quad \text{Eq. (7)}$$

All values in the above equation depend on the sample location, denoted as (i', j'). Assuming the motion is consistent in the local surrounding area, $\Delta$ can be minimized inside the $(2M+1) \times (2M+1)$ square window $\Omega$ centered on the currently predicted point (i,j), where M is equal to 2:

$$(v_x, v_y) = \underset{v_x, v_y}{\mathrm{argmin}} \sum_{[i', j'] \in \Omega} \Delta^2[i', j'] \quad \text{Eq. (8)}$$

For this optimization problem, the JEM uses a simplified approach making first a minimization in the vertical direction and then in the horizontal direction. This results in the following:

$$v_x = (s_1 + r) > m ? \mathrm{clip3}\left(-thBIO, thBIO, -\frac{s_3}{(s_1 + r)}\right) : 0 \quad \text{Eq. (9)}$$

$$v_y = (s_5 + r) > m ? \mathrm{clip3}\left(-thBIO, thBIO, -\frac{s_6 - v_x s_2/2}{(s_5 + r)}\right) : 0 \quad \text{Eq. (10)}$$

where, $$s_1 = \sum_{[i', j'] \in \Omega} (\tau_1 \partial I^{(1)}/\partial x + \tau_0 \partial I^{(0)}/\partial x)^2; \quad \text{Eq. (11)}$$

$$s_3 = \sum_{[i', j'] \in \Omega} (I^{(1)} - I^{(0)})(\tau_1 \partial I^{(1)}/\partial x + \tau_0 \partial I^{(0)}/\partial x);$$

$$s_2 = \sum_{[i', j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i', j'] \in \Omega} (\tau_1 \partial I^{(1)}/\partial y + \tau_0 \partial I^{(0)}/\partial y)^2;$$

$$s_6 = \sum_{[i', j'] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (9) and Eq. (10), where:

$$r = 500 \cdot 4^{d-8} \quad \text{Eq. (12)}$$

$$m = 700 \cdot 4^{d-8} \quad \text{Eq. (13)}$$

Here, d is bit depth of the video samples.

Figure 22:
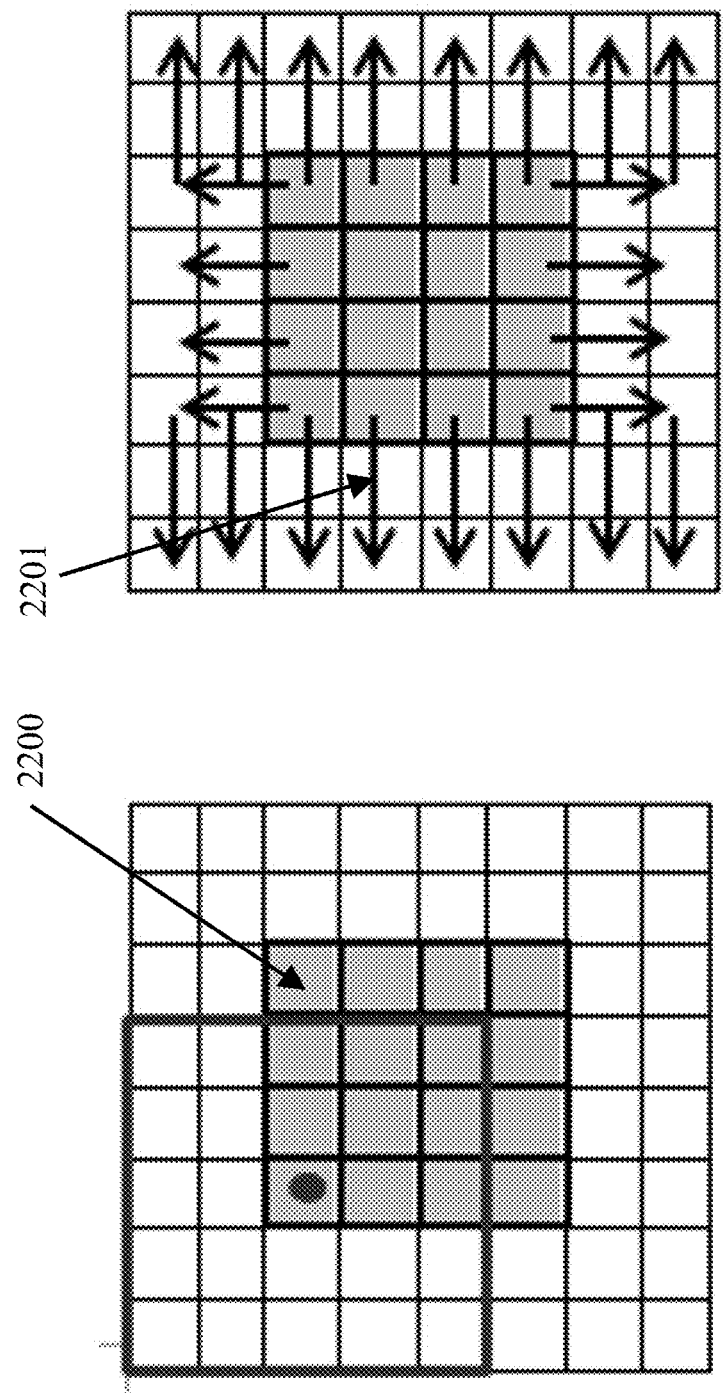
FIGS. 22A and 22B show example snapshots of using of the bi-directional optical flow (BDOF) algorithm without block extensions.

In order to keep the memory access for BDOF the same as for regular bi-predictive motion compensation, all prediction and gradients values, $I^{(k)}, \partial I^{(k)}/\partial x, \partial I^{(k)}/\partial y$, are calculated for positions inside the current block. FIG. 22A shows an example of access positions outside of a block 2200. As shown in FIG. 22A, in Eq. (9), $(2M+1) \times (2M+1)$ square window $\Omega$ centered in currently predicted point on a boundary of predicted block needs to accesses positions outside of the block. In the JEM, values of $I^{(k)}, \partial I^{(k)}/\partial x, \partial I^{(k)}/\partial y$ outside of the block are set to be equal to the nearest available value inside the block. For example, this can be implemented as a padding area 2201, as shown in FIG. 22B.

With BDOF, it is possible that the motion field can be refined for each sample. To reduce the computational complexity, a block-based design of BDOF is used in the JEM. The motion refinement can be calculated based on a 4×4 block. In the block-based BDOF, the values of $s_n$ in Eq. (9) of all samples in a 4×4 block can be aggregated, and then the aggregated values of $s_n$ in are used to derived BDOF motion vectors offset for the 4×4 block. More specifically, the following formula can used for block-based BDOF derivation:

$$s_{1,b_k} = \sum_{(x,y) \in b_k} \sum_{[i',j'] \in \Omega(x,y)} (\tau_1 \partial I^{(1)}/\partial x + \tau_0 \partial I^{(0)}/\partial x)^2; \quad \text{Eq. (14)}$$

$$s_{3,b_k} = \sum_{(x,y) \in b_k} \sum_{[i',j'] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y) \in b_k} \sum_{[i',j'] \in \Omega(x,y)} (\tau_1 \partial I^{(1)}/\partial y + \tau_0 \partial I^{(0)}/\partial y)^2;$$

$$s_{6,b_k} = \sum_{(x,y) \in b_k} \sum_{[i',j'] \in \Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (9) and Eq (10) are replaced by $((s_{n,bk}) \gg 4)$ to derive the associated motion vector offsets.

In some scenarios, MV regiment of BIO may be unreliable due to noise or irregular motion. Therefore, in BDOF, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BDOF can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient $\partial I/\partial y$, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BDOF. Table 2 shows example interpolation filters that can be used for prediction signal generation in BIO.

TABLE 1

Exemplary filters for gradient calculations in BDOF (or BIO)

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Exemplary interpolation filters for prediction signal generation in BDOF (or BIO)

| Fractional pel position | Interpolation filter for prediction signal (BIOfilterS) |
|---|---|
| 0 | { 0, 0, 64, 0, 0, 0} |
| 1/16 | { 1, −3, 64, 4, −2, 0} |
| 1/8 | { 1, −6, 62, 9, −3, 1} |
| 3/16 | { 2, −8, 60, 14, −5, 1} |
| 1/4 | { 2, −9, 57, 19, −7, 2} |
| 5/16 | { 3, −10, 53, 24, −8, 2} |
| 3/8 | { 3, −11, 50, 29, −9, 2} |
| 7/16 | { 3, −11, 44, 35, −10, 3} |
| 1/2 | { 3, −10, 35, 44, −11, 3} |

In the JEM, BDOF can be applied to all bi-predicted blocks when the two predictions are from different reference pictures. When Local Illumination Compensation (LIC) is enabled for a CU, BDOF can be disabled.

In some embodiments, OBMC is applied for a block after normal MC process. To reduce the computational complexity, BDOF may not be applied during the OBMC process. This means that BDOF is applied in the MC process for a block when using its own MV and is not applied in the MC process when the MV of a neighboring block is used during the OBMC process.

2.9.1 Examples of BDOF in VTM-3.0

Step 1: Judge Whether BIO is Applicable (W/H are Width/Height of Current Block)

BIO is not applicable if
Current video block is affine coded or ATMVP coded $$(iPOC-iPOC_0)*(iPOC-iPOC_1) \geq 0$$

H==4 or (W==4 and H==8)
with Weighted Prediction
GBi weights are not (1,1)

BDOF is not used if total SAD between the two reference blocks (denoted as $R_0$ and $R_1$) is smaller than a threshold, wherein $$SAD = \sum_{(x,y)} |R_0(x, y) - R_1(x, y)|$$

Step 2: Data Preparation

For a W×H block, (W+2)×(H+2) samples are interpolated.

The inner W×H samples are interpolated with the 8-tap interpolation filter as in normal motion compensation.

Figure 23:
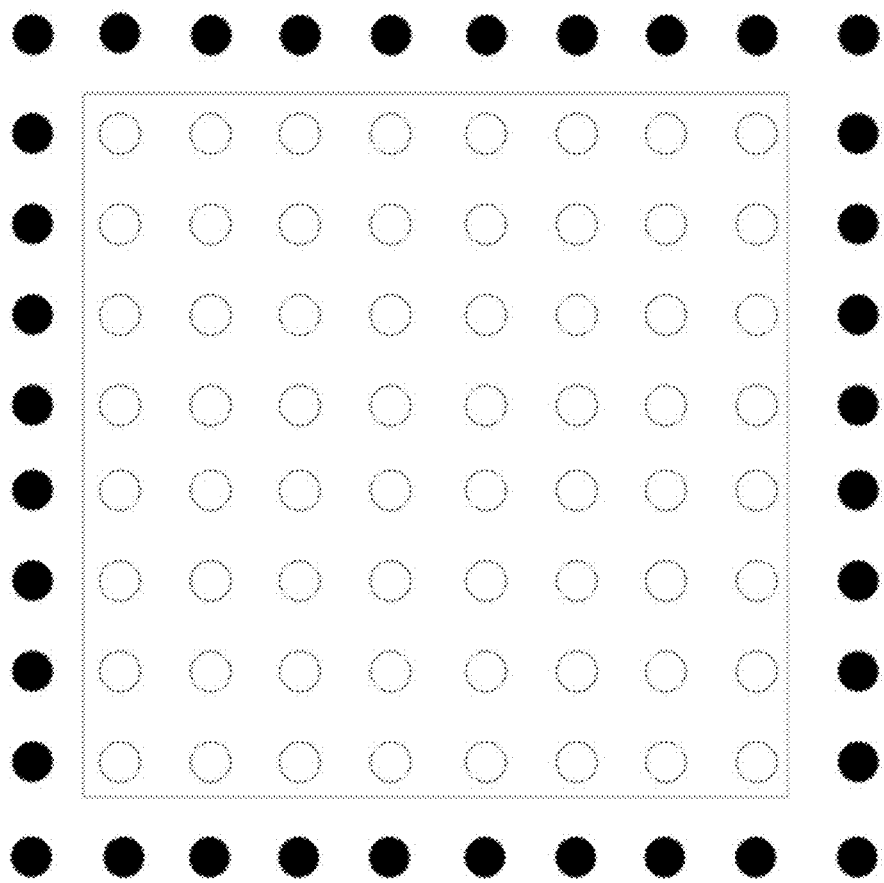
FIG. 23 shows an example of the interpolated samples used in BDOF.

The four side outer lines of samples (black circles in FIG. 23) are interpolated with the bi-linear filter.

For each position, gradients are calculated on the two reference blocks ($R_0$ and $R_1$).

$$Gx0(x,y)=(R0(x+1,y)-R0(x-1,y))>>4$$

$$Gy0(x,y)=(R0(x,y+1)-R0(x,y-1))>>4$$

$$Gx1(x,y)=(R1(x+1,y)-R1(x-1,y))>>4$$

$$Gy1(x,y)=(R1(x,y+1)-R1(x,y-1))>>4$$

For each position, internal values are calculated as:

$$T1=(R0(x,y)>>6)-(R1(x,y)>>6), T2=(Gx0(x,y)+Gx1(x,y))>>3, T3=(Gy0(x,y)+Gy1(x,y))>>3;\text{ and}$$

$$B1(x,y)=T2*T2, B2(x,y)=T2*T3, B3(x,y)=-T1*T2, B5(x,y)=T3*T3, B6(x,y)=-T1*T3$$

Step 3: Calculate Prediction for Each Block

BDOF is skipped for a 4×4 block if SAD between the two 4×4 reference blocks is smaller than a threshold.
Calculate Vx and Vy.
Calculate the final prediction for each position in the 4×4 block:

$$b(x,y)=(Vx(Gx^0(x,y)-Gx^1(x,y))+Vy(Gy^0(x,y)-Gy^1(x,y))+1)>>1$$

$$P(x,y)=(R^0(x,y)+R^1(x,y)+b(x,y)+\text{offset})>>\text{shift}$$

Herein, b(x,y) is known as a correction item.

2.9.2 Alternative Examples of BDOF (or BIO) in VTM-3.0

8.3.4 Decoding Process for Inter Blocks

If predFlagL0 and predFlagL1 are equal to 1, DiffPicOrderCnt(currPic, refPicList0[refIdx0])*DiffPicOrderCnt(currPic, refPicList1[refIdx1])<0, MotionModelIdc[xCb][yCb] is equal to 0 and MergeModeList[merge_idx[xCb][yCb]] is not equal to SbCol, set the value of bioAvailableFlag to TRUE.
Otherwise, set the value of bioAvailableFlag to FALSE.
If bioAvailableFlag is equal to TRUE, the following is applied:
The variable shift is set equal to Max(2, 14−bitDepth).
The variables cuLevelAbsDiffThres and subCuLevelAbsDiffThres are set equal to (1<<(bitDepth−8+shift))*cbWidth*cbHeight and 1<<(bitDepth−3+shift). The variable cuLevelSumAbsoluteDiff is set to 0.
For xSbIdx=0‥(cbWidth>>2)−1 and ySbIdx=0‥(cbHeight>>2)−1, the variable subCuLevelSumAbsoluteDiff[xSbIdx][ySbIdx] and the bidirectional optical flow utilization flag bioUtilizationFlag[xSbIdx][ySbIdx] of the current subblock are derived as:

subCuLevelSumAbsoluteDiff[xSbIdx][ySbIdx]=$\Sigma_i\Sigma_j$
Abs(predSamplesL0$L$[(xSbIdx<<2)+1+$i$][(ySbIdx<<2)+1+$j$]−predSamplesL1$L$[(xSbIdx<<2)+1+$i$][(ySbIdx<<2)+1+$j$]) with $i,j$=0.3 bioUtilizationFlag[xSbIdx][ySbIdx]=subCuLevelSumAbsoluteDiff[xSbIdx][ySbIdx]>=subCuLevelAbsDiffThres cuLevelSumAbsoluteDiff+=subCuLevelSumAbsoluteDiff[xSbIdx][ySbIdx]

If cuLevelSumAbsoluteDiff is smaller than cuLevelAbsDiffThres, set bioAvailableFlag to FALSE.

If bioAvailableFlag is equal to TRUE, the prediction samples inside the current luma coding subblock, predSamplesL[xL+xSb][yL+ySb] with xL=0·sbWidth−1 and yL=0·sbHeight−1, are derived by invoking the bi-directional optical flow sample prediction process specified in clause 8.3.4.5 with the luma coding subblock width sbWidth, the luma coding subblock height sbHeight and the sample arrays predSamplesL0L and predSamplesL0L, and the variables predFlagL0, predFlagL1, refIdxL0, refIdxL1.

8.3.4.3 Fractional Sample Interpolation Process

8.3.4.3.1 General

Inputs to this process are:
a luma location (xSb, ySb) specifying the top-left sample of the current coding sub-block relative to the top left luma sample of the current picture,
a variable sbWidth specifying the width of the current coding sub-block in luma samples,
a variable sbHeight specifying the height of the current coding sub-block in luma samples,
a luma motion vector mvLX given in 1/16-luma-sample units,
a chroma motion vector mvCLX given in 1/32-chroma-sample units,
the selected reference picture sample array refPicLXL and the arrays refPicLXCb and refPicLXCr.
the bidirectional optical flow enabling flag bioAvailableFlag.
Outputs of this process are:
an (sbWidth)×(sbHeight) array predSamplesLXL of prediction luma sample values when bioAvailableFlag is FALSE, or an (sbWidth+2)×(sbHeight+2) array predSamplesLXL of prediction luma samaple values when bioAvailableFlag is TRUE.
two (sbWidth/2)×(sbHeight/2) arrays predSamplesLXCb and predSamplesLXCr of prediction chroma sample values.

Let (xIntL, yIntL) be a luma location given in full-sample units and (xFracL, yFracL) be an offset given in 1/16-sample units. These variables are used only in this clause for specifying fractional-sample locations inside the reference sample arrays refPicLXL, refPicLXCb and refPicLXCr.

When bioAvailableFlag is equal to TRUE, for each luma sample location (xL=−1·sbWidth, yL=−1·sbHeight) inside the prediction luma sample array predSamplesLXL, the corresponding prediction luma sample value predSamplesLXL[xL][yL] is derived as follows:
The variables xIntL, yIntL, xFracL and yFracL are derived as follows:

xIntL=$xSb$−1+(mvLX[0]>>4)+$xL$ yIntL=$ySb$−1+(mvLX[1]>>4)+$yL$ xFracL=mvLX[0]&15 yFracL=mvLX[1]&15

The value of bilinearFiltEnabledFlag is derived as follows:
If xL is equal to −1 or sbWidth, or yL is equal to −1 or sbHeight, set the value of bilinearFiltEnabledFlag to TRUE.
Else, set the value of bilinearFiltEnabledFlag to FALSE
The prediction luma sample value predSamplesLXL[xL][yL] is derived by invoking the process specified in clause 8.3.4.3.2 with (xIntL, yIntL), (xFracL, yFracL), refPicLXL and bilinearFiltEnabledFlag as inputs.

When bioAvailableFlag is equal to FALSE, for each luma sample location (xL=0·sbWidth−1, yL=0·sbHeight−1) inside the prediction luma sample array predSamplesLXL, the corresponding prediction luma sample value predSamplesLXL[xL][yL] is derived as follows:
The variables xIntL, yIntL, xFracL and yFracL are derived as follows:

xIntL=$xSb$+(mvLX[0]>>4)+$xL$ yIntL=$ySb$+(mvLX[1]>>4)+$yL$ xFracL=mvLX[0]&15 yFracL=mvLX[1]&15

The variable bilinearFiltEnabledFlag is set to FALSE.
The prediction luma sample value predSamplesLXL[xL][yL] is derived by invoking the process specified in clause 8.3.4.3.2 with (xIntL, yIntL), (xFracL, yFracL), and refPicLXL and bilinearFiltEnabledFlag as inputs.

8.3.4.5 Bi-Directional Optical Flow (BDOF or BIO) Prediction Process

Inputs to this process are:
two variables nCbW and nCbH specifying the width and the height of the current coding block,
two (nCbW+2)×(nCbH+2) luma prediction sample arrays predSamplesL0 and predSamplesL1,
the prediction list utilization flags, predFlagL0 and predFlagL1,
the reference indices refIdxL0 and refIdxL1,
the bidirectional optical flow utilization flags bioUtilizationFlag[xSbIdx][ySbIdx] with xSbIdx=0·(nCbW>>2)·1, ySbIdx=0·(nCbH>>2)−1
Output of this process is the (nCbW)×(nCbH) array pbSamples of luma prediction sample values.
The variable bitDepth is set equal to BitDepthY.
The variable shift2 is set equal to Max(3, 15−bitDepth) and the variable offset2 is set equal to 1<<(shift2−1).
The variable mvRefineThres is set equal to 1<<(13−bitDepth).
For xSbIdx=0·(nCbW>>2)−1 and ySbIdx=0·(nCbH>>2)−1,
If bioUtilizationFlag[xSbIdx][ySbIdx] is FALSE, for x=xSb·xSb+3,y=ySb·ySb+3, the prediction sample values of the current prediction unit are derived as follows:

pbSamples[$x$][$y$]=Clip3(0,(1<<bitDepth)−1, (predSamplesL0[$x$][$y$]+predSamplesL1[$x$][$y$]+offset2)
>>shift2)

Otherwise, the prediction sample values of the current prediction unit are derived as follows:

The location (xSb, ySb) specifying the top-left sample of the current subblock relative to the top left sample of prediction sample arrays predSamplesL0 and predSampleL1 is derived as follows:

$xSb=(xSbIdx<<2)+1$ $ySb=(ySbIdx<<2)+1$

For x=xSb−1·xSb+4,y=ySb−1·ySb+4, the followings are applied:

The locations (hx, vy) for each of the corresponding sample (x,y) inside the prediction sample arrays are derived as follows:

$hx=Clip3(1,nCbW,x)$ $vy=Clip3(1,nCbH,y)$

The variables gradientHL0[x][y], gradientVL0[x][y], gradientHL1[x][y] and gradientVL1[x][y] are derived as follows:

gradientHL0[x][y]=(predSamplesL0[hx+1][vy]predSampleL0[hx−1][vy])>>4 gradientVL0[x][y]=(predSampleL0[hx][vy+1]−predSampleL0[hx][vy−1])>>4 gradientHL1[x][y]=(predSamplesL1[hx+1][vy]−predSampleL1[hx−1][vy])>>4 gradientVL1[x][y]=(predSampleL1[hx][vy+1]−predSampleL1[hx][vy−1])>>4

The variables temp, tempX and tempY are derived as follows:

temp[x][y]=(predSamplesL0[hx][vy]>>6)−(predSamplesL1[hx][vy]>>6)

tempX[x][y]=(gradientHL0[x][y]+gradientHL1[x][y])>>3 tempY[x][y]=(gradientVL0[x][y]+gradientVL1[x][y])>>3

The variables sGx2, sGy2, sGxGy, sGxdI and sGydI are derived as follows:

$sGx2=\Sigma_x\Sigma_y(tempX[xSb+x][ySb+y]*tempX[xSb+x][ySb+y])$ with x,y=−1..4

$sGy2=\Sigma_x\Sigma_y(tempY[xSb+x][ySb+y]*tempY[xSb+x][ySb+y])$ with x,y=−1..4

$sGxGy=\Sigma_x\Sigma_y(tempX[xSb+x][ySb+y]*tempY[xSb+x][ySb+y])$ with x,y=−1..4

$sGxdI=\Sigma_x\Sigma_y(-tempX[xSb+x][ySb+y]*temp[xSb+x][ySb+y])$ with x,y=−1..4

$sGydI=\Sigma_x\Sigma_y(-tempY[xSb+x][ySb+y]*temp[xSb+x][ySb+y])$ with x,y=−1..4

The horizontal and vertical motion refinements of the current sub-block are derived as:

vx=sGx2>0?Clip3(−mvRefineThres,mvRefineThres,−(sGxdI<3)>>Floor(Log 2(sGx2))):0 vy=sGy2>0?Clip3(−mvRefineThres,mvRefineThres,((sGydI<3)−((vx*sGxGym)<<12+vx*sGxGys)>>1)>>Floor(Log 2(sGy2))):0 sGxGym=sGxGy>>12;

sGxGys=sGxGy &((1<<12)−1)

For x=xSb−1·xSb+2,y=ySb−1·ySb+2, the followings are applied:

sampleEnh=Round((vx*(gradientHL1[x+1][y+1]−gradientHL0[x+1][y+1]))>>1)+Round((vy*(gradientVL1[x+1][y+1]−gradientVL0[x+1][y+1]))>>1)

pbSamples[x][y]=Clip3(0,(1<<bitDepth)−1,(predSamplesL0[x+1][y+1]+predSamplesL1[x+1][y+1]+sampleEnh+offset2)>>shift2)

2.10 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Exemplary Embodiments Related to the Disclosed Technology

3.1 Examples of Cross-Component Linear Model (CCLM) Prediction

To reduce the cross-component redundancy, a CCLM prediction mode, a.k.a. LM, is used in the JEM, for which the chroma samples are predicted based on the reconstructed luma samples of the same CU by using a linear model as follows:

$pred_c(i,j)=\alpha \cdot rec_L'(i,j)+\beta$

Herein, $pred_c(i,j)$ represents the predicted chroma samples in a CU and $rec_L'(i,j)$ represents the downsampled reconstructed luma samples of the same CU for color formats 4:2:0 or 4:2:2 while $rec_L'(i,j)$ represents the reconstructed luma samples of the same CU for color format 4:4:4. CCLM Parameters α and β are derived by minimizing the regression error between the neighboring reconstructed luma and chroma samples around the current block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)}$$

$$\beta = \frac{\Sigma C(n) - \alpha \cdot \Sigma L(n)}{N}$$

Figure 25:
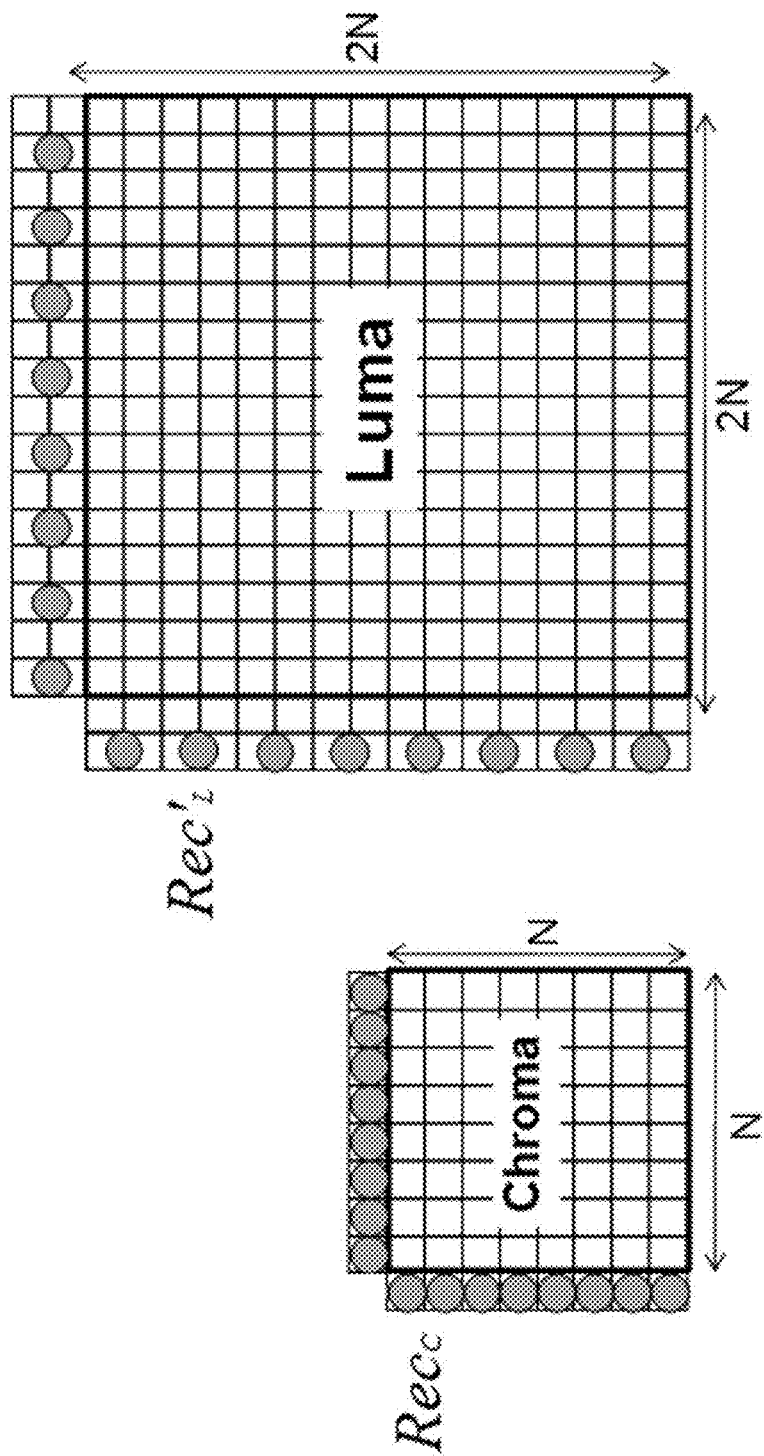
FIG. 25 shows an example of the locations of samples used for the derivation of parameters of the linear model ($\alpha$ and $\beta$) in a linear prediction mode.

Herein, L(n) represents the down-sampled (for color formats 4:2:0 or 4:2:2) or original (for color format 4:4:4) top and left neighbouring reconstructed luma samples, C(n) represents the top and left neighbouring reconstructed chroma samples, and value of N is equal to twice of the minimum of width and height of the current chroma coding block. For a coding block with a square shape, the above two equations are applied directly. For a non-square coding block, the neighbouring samples of the longer boundary are first subsampled to have the same number of samples as for the shorter boundary. FIG. 25 shows the location of the left and above reconstructed samples and the sample of the current block involved in the CCLM mode.

This regression error minimization computation is performed as part of the decoding process, not just as an encoder search operation, so no syntax is used to convey the α and β values. The CCLM prediction mode also includes prediction between the two chroma components, i.e., the Cr component is predicted from the Cb component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$pred_{Cr}^*(i,j) = pred_{Cr}(i,j) + \alpha \cdot resi_{Cb}'(i,j)$$

Herein, $resi_{Cb}'(i,j)$ presents the reconstructed Cb residue sample at position (i,j).

The scaling factor α is derived in a similar way as in the CCLM luma-to-chroma prediction. The only difference is an addition of a regression cost relative to a default α value in the error function so that the derived scaling factor is biased towards a default value of −0.5 as follows:

$$\alpha = \frac{n \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda}$$

Herein, Cb(n) represents the neighbouring reconstructed Cb samples, Cr(n) represents the neighbouring reconstructed Cr samples, and λ is equal to $\Sigma(Cb(n) \cdot Cb(n)) >> 9$.

The CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

3.2 Examples of Simplified CCLM

Figure 26:
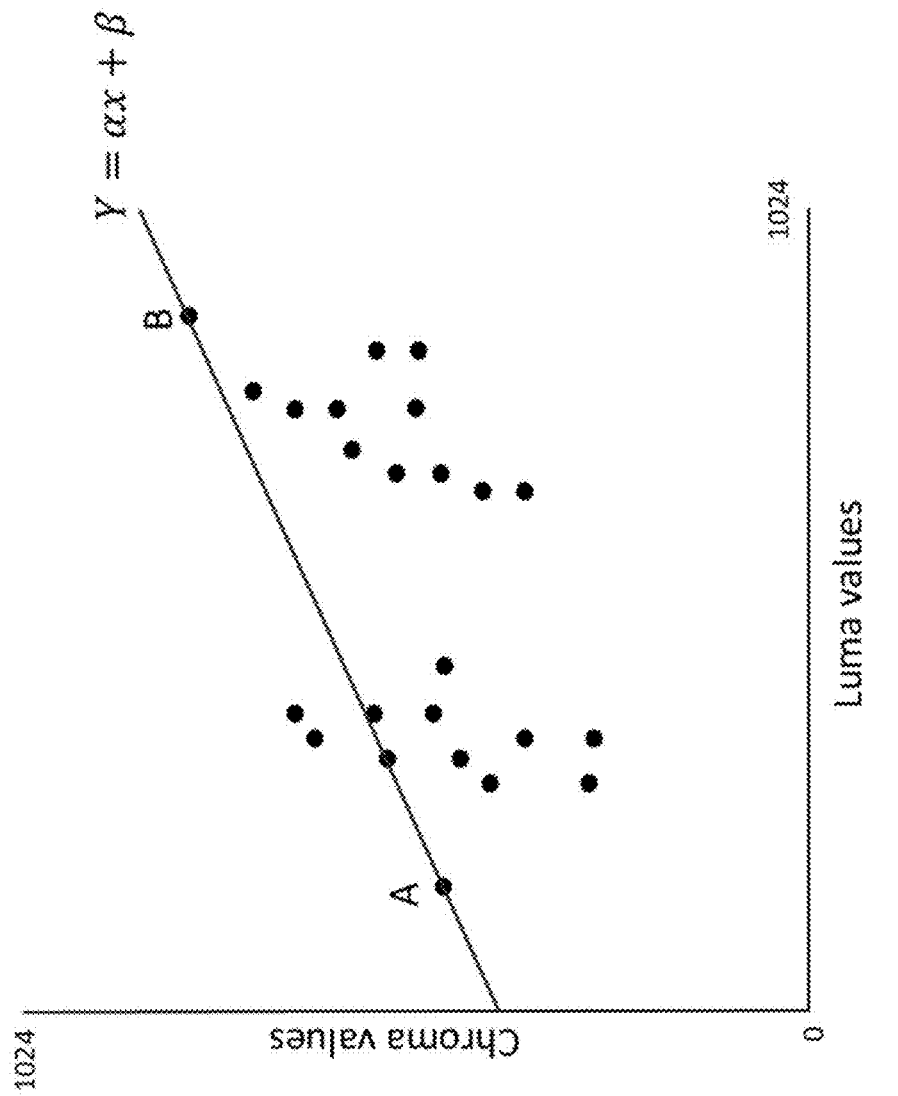
FIG. 26 shows an example of a straight line (representative of a linear model) between the maximum and the minimum luma values.

In some existing implementations, the LMS algorithm of the linear model parameters α and β is replaced by a straight line equation. The 2 points (couple of Luma and Chroma) (A, B) are the minimum and maximum values inside the set of neighboring Luma samples as depicted in FIG. 26. Herein, the linear model parameters α and β are obtained according to:

$$\alpha = \frac{y_B - y_A}{x_B - x_A}, \text{ and } \beta = y_A - \alpha x_A.$$

The division may be avoided and replaced by a multiplication and a shift.

To derive the Chroma predictor, as for the current VTM implementation, the multiplication is replaced by an integer operation as the following:

$$pred_C(i,j) = (A \cdot rec_L'(i,j)) >> S + \beta$$

Yet the implementation is also simpler than the current VTM implementation because shift S always has the same value. In term of complexity, the proposed algorithm reduces the number of operations as depicted in the following table:

| Operations | Number of operations (LMS) | Number of operations (disclosed technology) |
|---|---|---|
| Multiplications | 2N + 2 + 2 | 1 |
| Sums | 7N + 3 | 3 |
| "Divisions" | 2 | 1 |
| Comparisons |  | 2N |

The number of operations is reduced but the proposed method needs several comparisons to obtain the minimum and maximum luma values of the neighboring sample.

4. Drawbacks of Existing Implementations

Some existing implementations, suffer from the following drawbacks:

(1) BIO and CCLM both need linear regression but in different simplified ways.

(2) BIO implementation in VTM does not consider the POC distance.

(3) The velocities on Ref 0 are denoted as $v_x^{(0)}$ and $v_y^{(0)}$. The velocities on Ref 1 are denoted as $v_x^{(1)}$ and $v_y^{(1)}$. In the current BIO design, it is assumed that the velocities on the two reference pictures are mirrored such that $vx^{(1)} = -v_x^{(0)} = v_x$ and $v_y^{(1)} = -v_y^{(0)} = v_y$, (or $v_x^{(1)} = v_x^{(0)} = v_x$ and $v_y^{(1)} = v_y^{(0)} = v_y$). However, this assumption may not be true.

(4) The derivation of velocities $v_x$ and $v_y$ in BIO is over-simplified.

(5) The derivation of $v_x$ and $v_y$ in BIO can be combined with DMVR or decoder side motion derivation.

(6) Knowing $v_x$ and $v_y$, predictions/gradients on Ref0/Ref1 may be further refined.

(7) An additional interpolation filter (bi-linear filter) is introduced to interpolate pixels and boundaries.

(8) Some rounding and clipping operations are missing in BIO procedure.

(9) Precisions of internal operations can be further lowered.

(10) The SAD for BIO calculation can be simplified.

(11) When GBi is applied, the weighting values are not considered appropriately in the BIO derivation procedure.

5. Example Methods for Inter Prediction with Refinement

Embodiments of the presently disclosed technology overcome the drawbacks of existing implementations, harmonize the linear regression procedure in BIO and CCLM and propose BIO modifications, thereby providing video coding with higher coding efficiencies. The harmonization of linear mode prediction, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Denote reference picture of current picture from list 0 and list 1 by Ref0 and Ref1 respectively, denote $\tau_0$=POC(current)−POC(Ref0), $\tau_1$=POC(Ref1)−POC(current), and denote reference block of the current block from Ref0 and Ref1 by refblk0 and refblk1 respectively. For a subblock in current block, MV of its corresponding subblock in refblk0 pointing to refblk1 is denoted by (vx, vy). MVs of the subblock in Ref0 and Ref1 are denoted by (mvL0$_x$, mvL0$_y$) and (mvL1$_x$, mvL1$_y$) respectively.

Shift(x, s) is defined as Shift(x, s)=(x+off)>>s

SignShift(x, s) is defined as $$SignShift(x, s) = \begin{cases} (x+\text{off}) >> s & x \geq 0 \\ -((-x+\text{off}) >> s) & x < 0 \end{cases}$$

Herein, off represent an offset that is an integer, e.g., 0 or $2^{s-1}$.

Clip3(x, min, max) is defined as $$Clip3(mi, ma, x) = \begin{cases} mi & x < mi \\ x & mi \leq x \leq ma \\ ma & x > ma \end{cases}$$

Example 1. It is proposed that the linear optimization module used in BIO can be used by other coding tools in a video coding system.
 (a) The linear optimization module involves a group of samples (u$_k$, v$_k$, w$_k$) with k from 0 to N−1 as input, two parameters a and b as output, so that $\Sigma_{k=0}^{N-1}$+a×v$_k$+b×w$_k$)$^2$ can be minimized, or approximately minimized. From Eq. (9) and Eq. (10), it is known that in BIO:

$u_k = I^{(0)}(x,y) - I^{(1)}(x,y)$ $v_k = G_x^{(0)}(x,y) + G_x^{(1)}(x,y)$ $w_k = G_y^{(0)}(x,y) + G_y^{(1)}(x,y)$ $a = v_x$ $b = v_y$

Herein, G$_x$(x,y) and G$_y$(x,y) represent horizontal and vertical gradients respectively.

(b) In one example, the linear optimization module used in BIO is used to derive the parameters for CCLM. From Eq. (18), Eq.(19), the notations can be written as:

$u_k = -C(n)$ $v_k = L(n)$ $w_k = 1$ $a = \alpha$ $b = \beta$ (c) Alternatively, the linear optimization module used in another coding tool such as CCLM can be used to derive v$_x$ and v$_y$ in BIO.

Example 2. It is proposed that whether to and how to apply BIO procedure depends on POC distances.
 (a) BIO procedure is not applied if abs($\tau_0$)≥T0 or abs($\tau_1$)≥T1. T0 and T1 are integers, e.g. T0=T1=4. T0 and T1 can be fixed numbers or signaled from the encoder to the decoder in VPS/SPS/PPS/slice header/tile group header/tile/CTU/CU.
 (b) BIO procedure is not applied if abs($\tau_0$)≥T0 and abs($\tau_1$)≥T1. T0 and T1 are integers, e.g. T0=T1=4. T0 and T1 can be fixed numbers or signaled from the encoder to the decoder in VPS/SPS/PPS/slice header/tile group header/tile/CTU/CU.
 (c) BIO procedure is not applied if abs($\tau_0$)+abs($\tau_1$)≥T. T is an integer, e.g. T=8. T can be a fixed number or signaled from the encoder to the decoder in VPS/SPS/PPS/slice header/tile group header/tile/CTU/CU.
 (d) BIO procedure is not applied if abs(abs($\tau_0$)−abs($\tau_1$))≥T. T is an integer, e.g. T=8. T can be a fixed number or signaled from the encoder to the decoder in VPS/SPS/PPS/slice header/tile group header/tile/CTU/CU.
 (e) BIO procedure is not applied if abs($\tau_0$)≥T*abs($\tau_1$) or abs($\tau_1$)≥T*abs($\tau_0$). T is an integer, e.g. T=4. T can be a fixed number or signaled from the encoder to the decoder in VPS/SPS/PPS/slice header/tile group header/tile/CTU/CU.

Example 3. It is proposed that the velocity vectors used to refine the prediction value in the BIO process depend on POC distances. The prediction after BIO procedure is calculated as $$\text{pred}_{BIO} = \frac{1}{2} \cdot (I^{(0)} + I^{(1)} + v_x^{(1)}/2 \cdot G_y^{(1)} + v_x^{(1)}/2 \cdot G_x^{(0)} + v_y^{(0)}/2 \cdot G_y^{(0)}) \quad (22)$$

where $G_x^{(0)}$ and $G_y^{(0)}$ represent the horizontal and vertical gradients on Ref0 and $G_x^{(0)}$ and $G_y^{(0)}$ represent the horizontal and vertical gradients on Ref0.
 (i) In the BIO design in VTM-3.0, $v_x^{(1)} = -v_x^{(0)}$ and $v_y^{(1)} = -v_y^{(0)}$, where v$_x$ and v$_y$ are derived. Then Eq. (22) is identical to Eq. (9).
 (ii) In one example:

$$v_x^{(1)} = v_x \frac{2|\tau_0|}{|\tau_0|+|\tau_1|}, \quad v_x^{(0)} = -v_x \frac{2|\tau_1|}{|\tau_0|+|\tau_1|}$$

$$v_y^{(1)} = v_y \frac{2|\tau_0|}{|\tau_0|+|\tau_1|}, \quad v_y^{(0)} = -v_y \frac{2|\tau_1|}{|\tau_0|+|\tau_1|}$$

Herein, the divisions can be implemented as multiplication and shift as MV scaling operation in HEVC.

Example 4. Instead of always firstly assuming vy equal to 0 to derive v$_x$, it is proposed to firstly derive v$_y$ and based on vy to derive v$_x$. Alternatively, whether to derive v$_y$ or v$_x$ firstly may depend on coded information, e.g., values of the horizontal and vertical components of the motion vectors, block sizes, etc.

Example 5. It is proposed that $v_x$ and $v_y$ are derived in an iterative way.
  a. In one example, $v_x$ derived in the i th step is used to derive $v_y$ in the i th step, and the derived $v_y$ in the i th step is used to derive $v_x$ derived in the i+1 th step. The derivation is done iteratively.
  b. Alternatively, $v_y$ derived in the i th step is used to derive $v_x$ in the i th step, and the derived $v_x$ in the i th step is used to derive $v_y$ derived in the i+1 th step. The derivation is done iteratively.
  c. Whether to use $v_x$ to derive $v_y$ or $v_y$ to derive $v_x$ in the same step may depend on the coded information, such as values of the horizontal and vertical components of the motion vectors, block sizes, etc. al.

$$v_y = -\frac{s_6 - \varepsilon \times v_x s_2}{s_5},$$

d. In one example, where s2, s5, s6 are defined as in (13). ε is an integer or fractional number such as ½ or ¼.
    i. The division operation can be simplified, e.g. replacing by the MSB shift as in JEM-3.0.
    ii. Clipping operation may be after the division operation.
  e. In one example $$v_x = -\frac{s_3 - \varepsilon \times v_y s_2}{s_1},$$

where s1 s2 s3 are defined as in (13). ε is an integer or fractional number such as ½ or ¼.
    i. The division operation can be simplified, e.g. replacing by the MSB shift as in JEM-3.0.
    ii. Clipping operation may be after the division operation.
  f. The derivation is done iteratively until i reaches a prefixed number such as 2.
  g. Alternatively, the derivation is done iteratively until the absolute difference between $v_x$ and/or $v_y$ before and after one round of derivation is smaller than a threshold.

Example 6. The derivation of $v_x$ and $v_y$ in BIO can be combined with DMVR, bilateral matching or other decoder side motion derivation methods.
  a. $v_x$ and $v_y$ derived in BIO for a block or sub-block (such as a 4×4 block) can be used to derive the search start-point of DMVR, bilateral matching or other decoder side motion derivation methods. Suppose the original MVs for Ref0 and Ref1 is MV0 and MV1, the MVs noted as MV0' and MV1' as the start-point of DMVR, bilateral matching or other decoder side motion derivation methods can be calculated as:
    i. in one example, MV0'=MV0+($v_x$, $v_y$), MV1'=MV1−($v_x$, $v_y$);
    ii. in one example, MV0'=MV0−($v_x$, $v_y$), MV1'=MV1+($v_x$, $v_y$);
    iii. in one example, MV0'=MV0+Scale(vx, vy), MV1'=MV1−Scale ($v_x$, $v_y$);
    iv. in one example, MV0'=MV0−Scale ($v_x$, $v_y$), MV1'=MV1+Scale ($v_x$, $v_y$);
    v. in one example, MV0'=Clip(MV0+Scale($v_x$, $v_y$)), MV1'=Clip(MV1−Scale ($v_x$, $v_y$));
    vi. in one example, MV0'=Clip(MV0−Scale ($v_x$, $v_y$)), MV1'=Clip(MV1+Scale ($v_x$, $v_y$));
  b. Alternatively, the output MVs of DMVR, bilateral matching or other decoder side motion derivation methods for a block or sub-block (such as a 4×4 block) can be used to derive $v_x$ and $v_y$ used in BIO. Suppose the original MVs for Ref0 and Ref1 is MV0 and MV1, the output MVs are MV0' and MV1', then $v_x$ and $v_y$ can be calculated as
    i. in one example, ($v_x$, $v_y$)=Scale (MV0'−MV0);
    ii. in one example, ($v_x$, $v_y$)=Scale (MV0−MV0');
    iii. in one example, ($v_x$, $v_y$)=Scale (MV1'−MV1);
    iv. in one example, ($v_x$, $v_y$)=Scale (MV1−MV1');
    v. in one example, ($v_x$, $v_y$)=(Scale (MV0'−MV0)+Scale (MV1'−MV1))/2;
    vi. in one example, ($v_x$, $v_y$)=(Scale (MV0−MV0')+Scale (MV1−MV1'))/2;

Example 7. It is proposed that the derived vx and vy can be used to refine the predictions and gradients on Ref0 and Ref1. Then the refined predictions and gradients are used to derive new $v_x$ and $v_y$.
  a. The derivation and refinement procedure can be done iteratively until the absolute difference between vx or vy before and after one round of derivation is smaller than a threshold. Alternatively, the derivation and refinement procedure can be done iteratively until the iteration reaches a predefined number of times. For example, the number is 2.
  b. Suppose the original MVs for Ref0 and Ref1 is MV0 and MV1, the MVs noted as MV0' and MV1' to get the refined predictions and gradients can be calculated as i. in one example, MV0'=MV0+($v_x$, $v_y$), MV1'=MV1−($v_x$, $v_y$);
    ii. in one example, MV0'=MV0=($v_x$, $v_y$), MV1'=MV1+($v_x$, $v_y$);
    iii. in one example, MV0'=MV0+Scale($v_x$, $v_y$), MV1'=MV1−Scale ($v_x$, $v_y$);
    iv. in one example, MV0'=MV0−Scale ($v_x$, $v_y$), MV1'=MV1+Scale ($v_x$, $v_y$);
    v. in one example, MV0'=Clip(MV0+Scale($v_x$, $v_y$)), MV1'=Clip(MV1−Scale ($v_x$, $v_y$));
    vi. in one example, MV0'=Clip(MV0−Scale ($v_x$, $v_y$)), MV1'=Clip(MV1+Scale ($v_x$, $v_y$));

Example 8. It is proposed that BIO may be applied to partial samples within one block or one sub-block. In one example, for samples located at the first/last row/first/last column, BIO is not applied.

Figure 27:
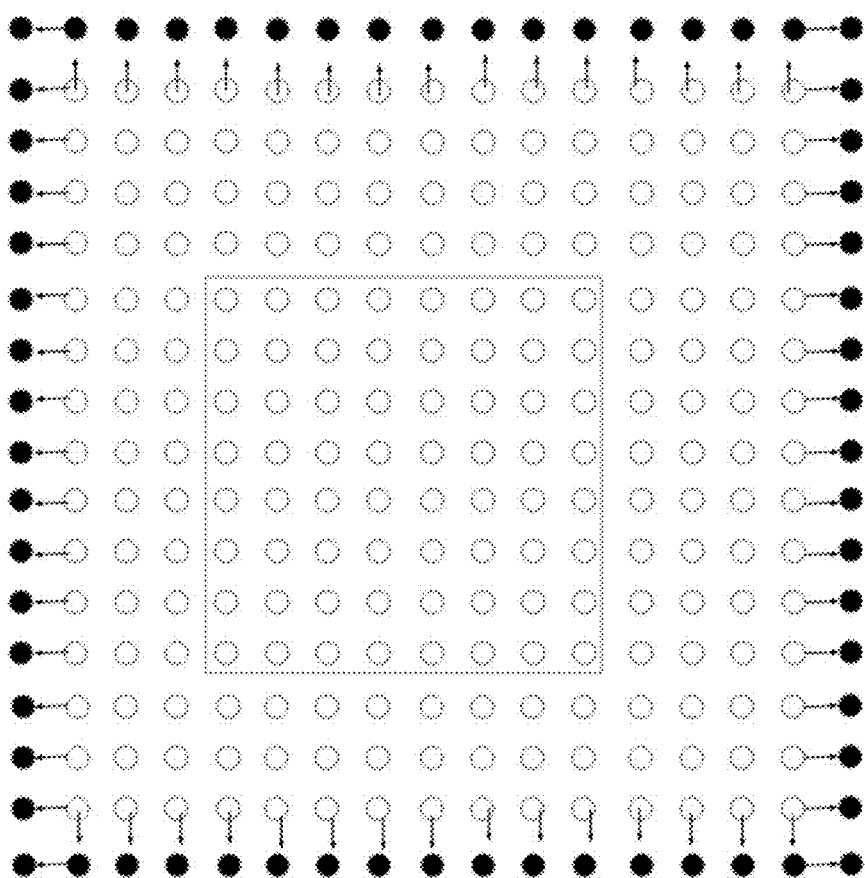
FIG. 27 shows another example of interpolated samples used in BDOF.

Example 9. It is proposed that only one kind of interpolation filter is used for one color component when BIO is applied.
  a. In one example, only the 8-tap interpolation filter is used on the luma component when BIO is applied.
  b. Alternatively, furthermore, to reduce the memory bandwidth, it is proposed to restrict the size/range of samples to be fetched less than that required by interpolation filters.
  c. Alternatively, furthermore, padding may be applied if some samples are located at positions outside a given size/range.
  d. Suppose the current block is M×N, the required size of sub-samples is (M+G)×(N+G), the required size by L-tap interpolation filter should be (M+G+L−1)×(N+G+L−1). It is proposed to the allowed size of integer luma samples to be fetched with the BIO procedure is (M+L−1+k)×(N+L−1+k). e.g., k is 0, or 1 and k is smaller than G. If an integer luma sample is required by the interpolation process but is not allowed to be fetched, then it will be padded by an adjacent luma sample.
  i. FIG. 27 shows an example of interpolation filtering in the BIO procedure. The current block size is M×N, M=N=8 in the example. The required size of subsamples is (M+2)×(N+2) due to gradient calculation. So the integer samples required by the interpolation filter is (M+2+7)×(N+2+7) which is equal to 17×17 in the example. However, only (M+7)×(N+7), which is equal to 15×15 in the example, integer samples are required to be fetched. Other samples (black circles in the filter) required by the interpolation filter are padded by the adjacent fetched samples.
 e. In one example, the gradients of positions (x,y) where x=−1 or y=−1 or x=W or y=H are not calculated and BIO is not applied on these positions. Suppose the top-left of the current block is (0,0) and the width/height of the current block is W/H.
 f. In one example, the gradients of positions (x,y) where x=−1 or y=−1 or x=W or y=H are calculated in a different way. For example,
gradientHL0[x][y]=(predSamplesL0[hx+1][vy]−predSampleL0[hx][vy])>>4 if hx==1, (predSamplesL0[hx][vy]−predSampleL0[hx−1][vy])>>4 if hx==nCbW, (predSamplesL0[hx+1][vy]−predSampleL0[hx−1][vy])>>4 Otherwise.
gradientVL0[x][y]=(predSampleL0[hx][vy+1]−predSampleL0[hx][vy])>>4 if vy==1, (predSampleL0[hx][vy]−predSampleL0[hx][vy−1])>>4 if vy==nCbH, (predSampleL0[hx][vy+1]−predSampleL0[hx][vy−1])>>4 otherwise.
gradientHL1 [x][y]=(predSamplesL1[hx+1][vy]−predSampleL1[hx][vy])>>4 if hx==1, (predSamplesL1[hx][vy]−predSampleL1[hx−1][vy])>>4 if hx==nCbW, (predSamplesL0[hx+1][vy]−predSampleL1[hx−1][vy])>>4 Otherwise.
gradientVL1[x][y]=(predSampleL1[hx][vy+1]−predSampleL1 [hx][vy])>>4 if vy==1, (predSampleL1[hx][vy]−predSampleL1[hx][vy−1])>>4 if vy==nCbH, (predSampleL1[hx][vy+1]−predSampleL1[hx][vy−1])>>4 otherwise.
In another example,
gradientHL0[x][y]=(predSamplesL0[hx+1][vy]−predSampleL0[hx][vy])>>3 if hx==1, (predSamplesL0[hx][vy]−predSampleL0[hx−1][vy])>>3 if hx==nCbW, (predSamplesL0[hx+1][vy]−predSampleL0[hx−1][vy])>>4 Otherwise.
gradientVL0[x][y]=(predSampleL0[hx][vy+1]−predSampleL0[hx][vy])>>3 if vy==1, (predSampleL0[hx][vy]−predSampleL0[hx][vy−1])>>3 if vy==nCbH, (predSampleL0[hx][vy+1]−predSampleL0[hx][vy−1])>>4 otherwise.
gradientHL1 [x][y]=(predSamplesL1[hx+1][vy]−predSampleL1[hx][vy])>>3 if hx==1, (predSamplesL1[hx][vy]−predSampleL1[hx−1][vy])>>3 if hx==nCbW, (predSamplesL0[hx+1][vy]−predSampleL1[hx−1][vy])>>4 Otherwise.
gradientVL1[x][y]=(predSampleL1[hx][vy+1]−predSampleL1 [hx][vy])>>3 if vy==1, (predSampleL1[hx][vy]−predSampleL1[hx][vy−1])>>3 if vy==nCbH, (predSampleL1[hx][vy+1]−predSampleL1[hx][vy−1])>>4 otherwise.
 g. In one example, before calculating gradients, the outer samples (black circles in FIG. 23) are not interpolated by padded.
  i. For example, predSampleL0[0][vy]=predSampleL0[1][vy], predSampleL0[nCbW+1][vy]=predSampleL0[nCbW][vy], predSampleL0[hx][0]=predSampleL0[hx][1], predSampleL0[hx][nCbH+1]=predSampleL0[hx][nCbH] and predSampleL1[0][vy]=predSampleL1[1][vy], predSampleL1[nCbW+1][vy]=predSampleL1[nCbW][vy], predSampleL1[hx][0]=predSampleL1[hx][1], predSampleL1[hx][nCbH+1]=predSampleL1[hx][nCbH]for all valid hx and vy.
 h. In one example, the gradients calculation method in BIO and the gradients calculation method in Adaptive Loop Filter (ALF) is the same method.
  i. In one example, the gradients calculation method for BIO in VTM-3 is also used to calculate gradients for ALF.
  ii. In one example, the gradients calculation method for ALF in VTM-3 is also used to calculate gradients for BIO.

Example 10. Following changes are proposed to the Bi-directional optical flow prediction process.
 a. Gradient values may be shifted by a different value other than 4. In one example, the variables gradientHL0[x][y], gradientVL0[x][y], gradientHL1[x][y] and gradientVL1[x][y] are derived as follows:

$$\text{gradientHL0}[x][y]=\text{SignShift}(\text{predSamplesL0}[hx+1][vy]-\text{predSampleL0}[hx-1][vy],S)$$

$$\text{gradientVL0}[x][y]=\text{SignShift}(\text{predSampleL0}[hx][vy+1]-\text{predSampleL0}[hx][vy-1],S)$$

$$\text{gradientHL1}[x][y]=\text{SignShift}(\text{predSamplesL1}[hx+1][vy]-\text{predSampleL1}[hx-1][vy],S)$$

$$\text{gradientVL1}[x][y]=\text{SignShift}(\text{predSampleL1}[hx][vy+1]-\text{predSampleL1}[hx][vy-1],S)$$

i. In one example, S is a fixed number such as 4 or 5.
  ii. In one example, S depends on the sample bit-depth. For example, S is equal to B−P where B is the sample bit-depth such as 8, 10 or 12, and P is an integer such as 6.
 b. Gradient values shall be within a range. In one example, the variables gradientHL0[x][y], gradientVL0[x][y], gradientHL1[x][y] and gradientVL1[x][y]should be guaranteed be represented by a K-bit integer, e.g. K=8 or 16.
  i. For example, after the derivation, the gradients are clipped as $$\text{gradientHL0}[x][y]=\text{Clip3}(-2^{K-1},2^{K-1}-1,\text{gradientHL0}[x][y])$$

$$\text{gradientVL0}[x][y]=\text{Clip3}(-2^{K-1},2^{K-1}-1,\text{gradientVL0}[x][y])$$

$$\text{gradientHL1}[x][y]=\text{Clip3}(-2^{K-1},2^{K-1}-1,\text{gradientHL1}[x][y])$$

$$\text{gradientVL1}[x][y]=\text{Clip3}(-2^{K-1},2^{K-1}-1,\text{gradientVL1}[x][y])$$

c. The internal variables temp, tempX and tempY are derived as follows:

$$\text{temp}[x][y]=\text{SignShift}(\text{predSamplesL0}[hx][vy]-\text{predSamplesL1}[hx][vy],S1)$$

$$\text{tempX}[x][y]=\text{SignShift}(\text{gradientHL0}[x][y]+\text{gradientHL1}[x][y],S2)$$

tempY[x][y]=SignShift(gradientVL0[x][y]+gradientVL1[x][y],S3)

i. In one example, S1, S2 and S3 are fixed numbers such as S1=6, S2=S3=3.
  ii. In one example, S1, S2 and S3 depend on the sample bit-depth. For example, S1=B−P1, S2=B−P2 and S3=B−P3 where B is the sample bit-depth such as 8, 10 or 12, and P1, P2 and P3 are integers, e.g. P1=4, P2=P3=7.
d. The internal variables temp, tempX and tempY should be guaranteed be represented by a K1-bit integer, a K2-bit integer and a K3-bit integer, e.g. K1=8 or 16, K2=8 or 16, K3=8 or 16.
  i. For example, the internal variables are clipped after being derived as temp[x][y]=Clip3($-2^{K1-1}, 2^{K1-1}-1$,gradientHL0[x][y])

tempX[x][y]=Clip3($-2^{K2-1}, 2^{K2-1}-1$,gradientVL0[x][y])

tempY[x][y]=Clip3($-2^{K3-1}, 2^{K3-1}-1$,gradientHL1[x][y])

e. The internal variables sGx2, sGy2, sGxGy, sGxdI and sGydI should be shall be within a range. In one example, these variables shall be guaranteed be represented by a K1-bit integer, a K2-bit integer, a K3-bit integer, a K4-bit integer and a K5-bit integer, e.g. K1=8 or 16, K2=8 or 16, K3=8 or 16.
  i. For example, the internal variables are right shifted after being derived as $sGx2$=Shift($sGx2,S1$)

$sGy2$=Shift($sGy2,S2$)

sGxGy=SignShift(sGxGy,S3)

sGxdI=SignShift(sGxdI,S4)

sGydI=SignShift(sGydI,S5)

In one example, S1, S2, S3, S4 and S5 are fixed numbers such as 4 or 5.
Alternatively, S1, S2, S3, S4 and S5 depends on the sample bit-depth. For example, S1=B−P1, S2=B−P2, S3=B−P3, S4=B−P4 and S5=B−P5 where B is the sample bit-depth such as 8, 10 or 12, and P1, P2, P3, P4 and P5 are integers.
  ii. For example, the internal variables are clipped after being derived as $sGx2$=Clip3($0, 2^{K1}-1, sGx2$)

$sGy2$=Clip3($0, 2^{K2}-1, sGy2$)

sGxGy=Clip3($-2^{K3-1}, 2^{K3-1}-1$,sGxGy)

sGxdI=Clip3($-2^{K4-1}, 2^{K4-1}-1$,sGxdI)

sGydI=Clip3($-2^{K5-1}, 2^{K5-1}-1$,sGydI)

f. The variables gradientHL0[x][y], gradientVL0[x][y], gradientHL1[x][y] and gradientVL1[x][y] are derived only for selected positions.
  i. In one example, they are only calculated for samples at position (x, y) with x % Q==0. For example, Q=2
  ii. In one example, they are only calculated for samples at position (x, y) with x % Q==1. For example, Q=2
  iii. In one example, they are only calculated for samples at position (x, y) with y % Q==0. For example, Q=2
  iv. In one example, they are only calculated for samples at position (x, y) with y % Q==1. For example, Q=2
  v. In one example, they are only calculated for samples at position (x, y) with y % Q==0 or y % Q==3. For example, Q=4;
g. The internal variables temp[x][y], tempX[x][y] and tempY[x][y] are only derived for selected positions:
  i. In one example, they are only calculated for samples at position (x, y) with x % Q==0. For example, Q=2
  ii. In one example, they are only calculated for samples at position (x, y) with x % Q==1. For example, Q=2
  iii. In one example, they are only calculated for samples at position (x, y) with y % Q==0. For example, Q=2
  iv. In one example, they are only calculated for samples at position (x, y) with y % Q==1. For example, Q=2
  v. In one example, they are only calculated for samples at position (x, y) with y % Q==0 or y % Q==3. For example, Q=4;
  vi. In one example, temp[x][y], tempX[x][y], tempY[x][y] and gradientHL0[x][y], gradientVL0[x][y], gradientHL1[x][y], gradientVL1[x][y] are calculated for samples at the same positions, for example, positions in Examples g.i~g.v.
h. The internal variables sGx2, sGy2, sGxGy, sGxdI and sGydI are calculated only with accumulation of samples on selected positions. In a formulation way $sGx2=\Sigma_x\Sigma_y$(tempX[$xSb+x$][$ySb+y$]*tempX[$xSb+x$][$ySb+y$]) with $x,y\in S$ $sGy2=\Sigma_x\Sigma_y$(tempY[$xSb+x$][$ySb+y$]*tempY[$xSb+x$][$ySb+y$]) with $x,y\in S$ $sGxGy=\Sigma_x\Sigma_y$(tempX[$xSb+x$][$ySb+y$]*tempY[$xSb+x$][$ySb+y$]) with $x,y\in S$ $sGxdI=\Sigma_x\Sigma_y$(−tempX[$xSb+x$][$ySb+y$]*temp[$xSb+x$][$ySb+y$]) with $x,y\in S$ $sGydI=\Sigma_x\Sigma_y$(−tempY[$xSb+x$][$ySb+y$]*temp[$xSb+x$][$ySb+y$]) with $x,y\in S$ where S is the set of selected positions.
  i. In one example, the selected positions are x=0, 1, 2, 3 and y=0, 1, 2, 3;
  ii. In one example, the selected positions are x=0, 2 and y=0, 1, 2, 3;
  iii. In one example, the selected positions are x=1, 2 and y=0, 1, 2, 3;
  iv. In one example, the selected positions are x=1, 3 and y=0, 1, 2, 3;
  v. In one example, the selected positions are x=2, 3 and y=0, 1, 2, 3;
  vi. In one example, the selected positions are x=0, 3 and y=0, 1, 2, 3;
  vii. In one example, the selected positions are y=0, 2 and x=0, 1, 2, 3;
  viii. In one example, the selected positions are y=1, 2 and x=0, 1, 2, 3;
  ix. In one example, the selected positions are y=1, 3 and x=0, 1, 2, 3;
  x. In one example, the selected positions are y=2, 3 and x=0, 1, 2, 3;
  xi. In one example, the selected positions are y=0, 3 and x=0, 1, 2, 3;
  xii. In one example, the selected positions are x=−1, 4 and y=−1, 0, 1, 2, 3, 4;
  xiii. In one example, the selected positions are x=0 and y=−1, 0, 1, 2, 3, 4;

xiv. In one example, the selected positions are x=1, 2 and y=−1, 0, 1, 2, 3, 4;
xv. In one example, the selected positions are x=−1, 1, 3 and y=−1, 0, 1, 2, 3, 4;
xvi. In one example, the selected positions are x=0, 2, 4 and y=−1, 0, 1, 2, 3, 4;
xvii. In one example, the selected positions are x=−1, 1, 2, 4 and y=−1, 0, 1, 2, 3, 4;
xviii. In one example, the selected positions are x=0, 1, 2, 3 and y=−1, 0, 1, 2, 3, 4;
xix. In one example, the selected positions are y=−1, 4 and x=−1, 0, 1, 2, 3, 4;
xx. In one example, the selected positions are y=0, 3 and x=−1, 0, 1, 2, 3, 4;
xxi. In one example, the selected positions are y=1, 2 and x=−1, 0, 1, 2, 3, 4;
xxii. In one example, the selected positions are y=−1, 1, 3 and x=−1, 0, 1, 2, 3, 4;
xxiii. In one example, the selected positions are y=0, 2, 4 and x=−1, 0, 1, 2, 3, 4;
xxiv. In one example, the selected positions are y=−1, 1, 2, 4 and x=−1, 0, 1, 2, 3, 4;
xxv. In one example, the selected positions are y=0, 1, 2, 3 and x=−1, 0, 1, 2, 3, 4;

i. The division operation used to derive $v_x$ and $v_y$ is replaced in a more sophisticated way.
  i. In one example, vx=sGx2>0 ? Clip3(−mvRefineThres, mvRefineThres, −(sGxdI<<3)>>M): 0. M can be Floor(Log 2(sGx2)) or Ceiling(Log 2(sGx2)), depending on the value of sGx2. For example, M is Ceiling (Log 2(sGx2)) if 3*sGx2 is larger than $2^{Floor(Log\ 2(sGx2))+2}$, otherwise, M is Floor(Log 2(sGx2)). In another example, M is Ceiling (Log 2(sGx2)) if sGx2 is larger than T, otherwise, M is Floor(Log 2(sGx2)). E.g. T=(Floor(Log 2(sGx2))+Ceiling (Log 2(sGx2)))/2. In another example, M is Ceiling (Log 2(sGx2)) if sGx2*sGx2 is larger than $2^{2*Floor(Log\ 2(sGx2))+1}$, otherwise, M is Floor(Log 2(sGx2)).
    1. Alternatively, vx=sGx2>0 ? Clip3(−mvRefineThres, mvRefineThres, −((sGxdI<<3)+Offset)>>M): 0. Offset is an integer, such as 1<<(M−1).
      a. Offset can depend on sGx2.
  ii. In one example, vy=sGy2>0 ? Clip3(−mvRefineThres, mvRefineThres, ((sGydI<<3)−((vx*sGxGym)<<12+vx*sGxGys)>>1)>>M: 0. M can be Floor (Log 2(sGy2)) or Ceiling(Log 2(sGy2)), depending on the value of sGy2. For example, M is Ceiling (Log 2(sGy2)) if 3*sGy2 is larger than $2^{Floor(Log\ 2(sGy2))+2}$, otherwise, M is Floor(Log 2(sGy2)). In another example, M is Ceiling (Log 2(sGy2)) if sGy2 is larger than T, otherwise, M is Floor(Log 2(sGy2)). E.g. T=(Floor(Log 2(sGy2))+Ceiling (Log 2(sGy2)))/2. In another example, M is Ceiling (Log 2(sGy2)) if sGy2*sGy2 is larger than $2^{2*Floor(Log\ 2(sGy2))+1}$ otherwise, M is Floor(Log 2(sGy2)).
    1. Alternatively, vy=sGy2>0 ? Clip3(−mvRefineThres, mvRefineThres, (((sGydI<<3)−((vx*sGxGym)<<12+vx*sGxGys)>>1)+Offset)>>M: 0. Offset is an integer such as 1<<(M−1).
      a. Offset can depend on sGy2.
  iii. sGxGym and sGxGys are calculated depending on the sign of sGxGy. Suppose sign(x)=1 if x>=0 and sign(x)=−1 if x<0, then sGxGym=sign(sGxGy)*|sGxGy|>>W; sGxGys=sign(sGxGy)*(|sGxGy|&((1<<W)−1)).
    1. W can be a fixed number such as 12. Or it may depend on the sample bit-depth.
  iv. The division operation in the BIO procedure is calculated by a look-up table.
    (i) The same look-up table is also used in CCLM to replace the division operation.

Example 11. The decision of BIO on/off based on whole-block and sub-block SAD calculations may be simplified by just calculating the sub-block SAD calculation. Alternatively, the SAD calculation may be replaced by other rules, such as MR-SAD.

Example 12. The SAD calculation in BIO is only done with samples on selected positions.
  a. subCuLevelSumAbsoluteDiff[xSbIdx][SbIdx]=$\Sigma_i\Sigma_j$ Abs(predSamplesL0L[(xSbIdx<<2)+1+i][(ySbIdx<<2)+1+j]−predSamplesL1L[(xSbIdx<<2)+1+i][(ySbIdx<<2)+1+j]) with i, j∈S where S is the set of selected positions.
    i. In one example, the selected positions are i=0, 2 and j=0, 1, 2, 3;
    ii. In one example, the selected positions are i=1, 2 and j=0, 1, 2, 3;
    iii. In one example, the selected positions are i=1, 3 and j=0, 1, 2, 3;
    iv. In one example, the selected positions are i=2, 3 and j=0, 1, 2, 3;
    v. In one example, the selected positions are i=0, 3 and j=0, 1, 2, 3;
    vi. In one example, the selected positions are j=0, 2 and i=0, 1, 2, 3;
    vii. In one example, the selected positions are j=1, 2 and i=0, 1, 2, 3;
    viii. In one example, the selected positions are j=1, 3 and i=0, 1, 2, 3;
    ix. In one example, the selected positions are j=2, 3 and i=0, 1, 2, 3;
    x. In one example, the selected positions are j=0, 3 and i=0, 1, 2, 3;
    xi. In one example, the selected positions are i=0, 3 and j=0, 3;
    xii. In one example, the selected positions are i=1, 2 and j=1, 2;
  b. Alternatively, subCuLevelSumAbsoluteDiff[xSbIdx][ySbIdx]=$\max_{i,j}$ Abs(predSamplesL0L[(xSbIdx<<2)+1+i][(ySbIdx<<2)+1+j]−predSamplesL1L[(xSbIdx<<2)+1+i][(ySbIdx<<2)+1+j]) with i, j∈S where S is the set of selected positions.
  c. Alternatively, subCuLevelSumAbsoluteDiff[xSbIdx][ySbIdx]=$\min_{i,j}$ Abs(predSamplesL0L[(xSbIdx<<2)+1+i][(ySbIdx<<2)+1+j]−predSamplesL1L[(xSbIdx<<2)+1+i][(ySbIdx<<2)+1+j]) with i, j∈S where S is the set of selected positions.
  d. The threshold value subCuLevelAbsDiffThres may be adaptive.
    i. It may depend on coding information such as QP and POC distance
    ii. It may be signaled from the encoder to the decoder in VPS/SPS/PPS/slice header/tile group header/tile/CTU/CU.

Example 13. The SAD calculation in BIO is only done with samples on selected sub-blocks.
  a. Alternatively, furthermore, the SAD calculation for each sub-block may only involve partial of samples within one sub-block.
  b. cuLevelSumAbsoluteDiff=$\Sigma_{xSbIdx}\Sigma_{ySbIdx}$ subCuLevelSumAbsoluteDiff[xSbIdx][ySbIdx] with xSbIdx, ySbIdx∈S where S is the set of selected sub-blocks.
  i. In one example, the selected positions are xSbIdx % 2==0;
  ii. In one example, the selected positions are xSbIdx % 2==1;
  iii. In one example, the selected positions are xSbIdx % 4==0;
  iv. In one example, the selected positions are xSbIdx==0 or xSbIdx==(cbWidth>>2)−1;
  v. In one example, the selected positions are xSbIdy % 2==0;
  vi. In one example, the selected positions are xSbIdy % 2==1;
  vii. In one example, the selected positions are xSbIdy % 4==0;
  viii. In one example, the selected positions are xSbIdy==0 or xSbIdy==(cbHeight>>2)−1;
  ix. In one example, the selected positions are (xSbIdy==0 or xSbIdy==(cbHeight>>2)−1), and (xSbIdy==0 or xSbIdy==(cbHeight>>2)−1);
c. cuLevelSumAbsoluteDiff=Max$_{xSbIdx, ySbIdx}$ subCuLevelSumAbsoluteDiff[xSbIdx][ySbIdx] with xSbIdx, ySbIdx ∈ S
d. cuLevelSumAbsoluteDiff=Min$_{xSbIdx, ySbIdx}$ subCuLevelSumAbsoluteDiff[xSbIdx][ySbIdx] with xSbIdx, ySbIdx ∈ S
e. The threshold value cuLevelAbsDiffThres may be adaptive.
  i. It may depend on coding information such as QP and POC distance
  ii. It may depend on the coding mode like AMVP mode, merge mode or MMVD (merge with MV difference) mode.
  iii. It may be signaled from the encoder to the decoder in VPS/SPS/PPS/slice header/tile group header/tile/CTU/CU.

Example 14. For Examples 12 and 13, the proposed methods may also be applicable to other cases when SAD is replaced by other rules. That is, only partial of samples within one sub-block, and/or partial of sub-blocks may be considered to decide the usage of BIO.

Example 15. How to derive the variables in BIO procedure may be different when GBi is applied or not.
a. Alternatively, furthermore, the derivation may be different for GBi with different weighting values.
b. Suppose the weighting values are W0 and W1 for Ref0 and Ref1 in the GBi process, then prediction blocks are firstly weighted before deriving the variables used in BIO procedure, such as SAD calculation, gradient calculation.
  i. Denoted the two prediction blocks by predSamplesL0[x][y] and predSamplesL1[x][y]. W0*predSamplesL0[x][y] and predSamplesL1[x][y] and W1*predSamplesL1[x][y] are used as the inputs for BIO.
c. Alternatively, predSamplesL0[x][y] is pre-calculated as Shift(W0* predSamplesL0[x][y], S0) and predSamplesL1[x][y] is pre-calculated as Shift (W1*predSamplesL1[x][y], S1) before deriving the variables used in BIO procedure.
  i. S0 and S1 may depend on the sample bit-depth.
  ii. S0 and S1 may depend on W0 and W1.
  iii. S0 and S1 may be fixed numbers such as 2.
d. Alternatively, the values of the correction item may also be weighted when generating the final prediction block of one block.
  i. When deriving parameters used in the BIO procedure, the two prediction blocks without being weighted are used as inputs to BIO as prior art. However, the final prediction blocks are generated by weighted values of prediction blocks and weighted values of correction item.
  ii. The weights applied to correction item may be the same as that used for prediction blocks. Alternatively, different weights may be applied to correction item.

Example 16. It is proposed the correction item value should be in a specific range.
(a) For example, correction item is clipped to [minCorrection, maxCorrection].
  i. minCorrection and maxCorrection may be fixed, e.g., −32 and 32;
  ii. minCorrection and maxCorrection may depend on the sample bit-depth. For example, minCorrection=−(32<<(BitDepth-8)), maxCorrection=32<<(BitDepth-8)).
  iii. minCorrection and maxCorrection may depend on block width and/or height.
  iv. minCorrection and maxCorrection may be signaled from the encoder to the decoder in VPS/SPS/PPS/slice header/tile group header/tile/CTU line/CTU/CU.
(b) For example, correction item is divided by a factor or right shifted if it is out of the range.

Example 17. It is proposed that the final prediction output in BIO should be in a specific range.
(a) For example, the final prediction output in BIO is clipped to [minPred, maxPred].
  i. minPred and maxPred may be fixed numbers such as −32 and 32;
  ii. minPred and maxPred may depend on the sample bit-depth. For example, minPred=−(32<<(BitDepth-8)), maxCorrection=32<<(BitDepth-8)).
  iii. minPred and maxPred may depend on block width and/or height.
  iv. minPred and maxPred may be signaled from the encoder to the decoder in VPS/SPS/PPS/slice header/tile group header/tile/CTU line/CTU/CU.

The examples described above may be incorporated in the context of the method described below, e.g., methods 2810, 2820, 2830, 2840, 2850 and 2860, which may be implemented at a video decoder or a video encoder.

Figure 28A:
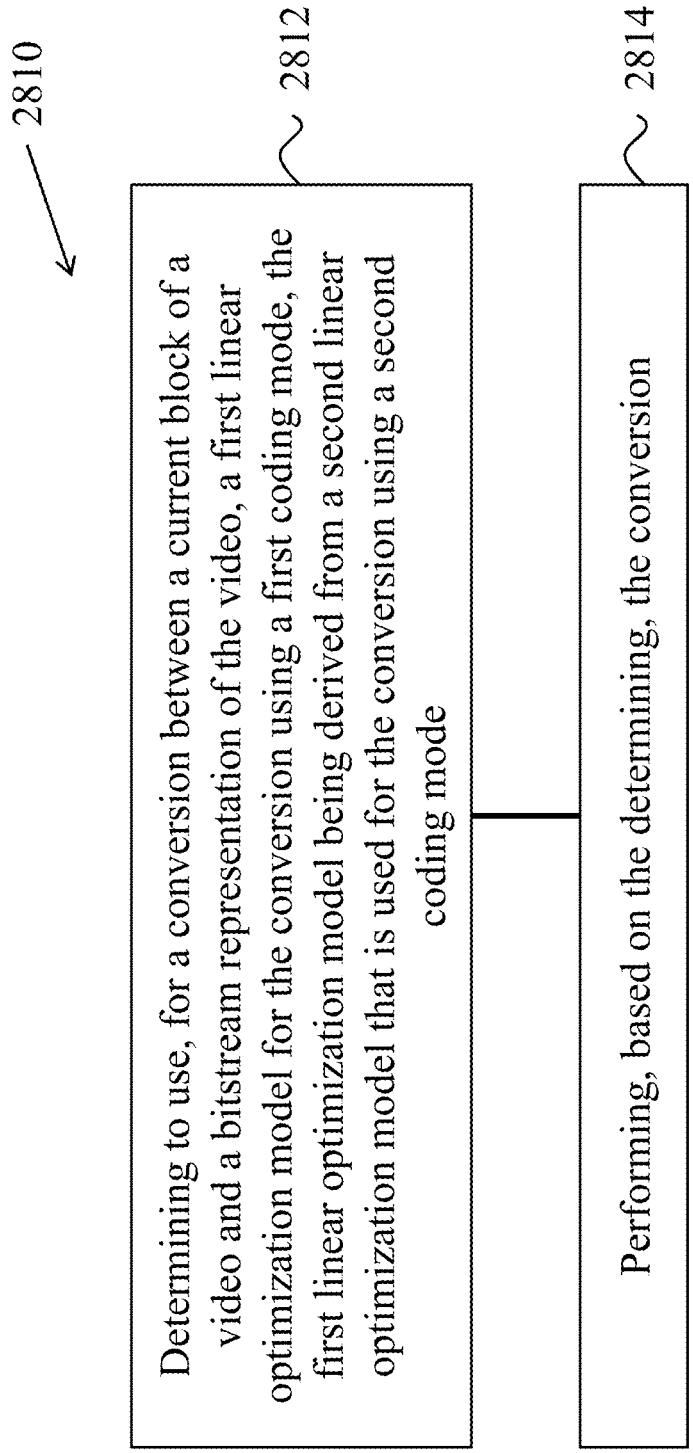
FIGS. 28A-28I show flowcharts of example methods for video processing.

FIG. 28A shows a flowchart of an exemplary method for video processing. The method 2810 includes, at step 2812, determining to use, for a conversion between a current block of a video and a bitstream representation of the video, a first linear optimization model for the conversion using a first coding mode, the first linear optimization model being derived from a second linear optimization model that is used for the conversion using a second coding mode.

The method 2810 includes, at step 2814, performing, based on the determining, the conversion.

Figure 28B:
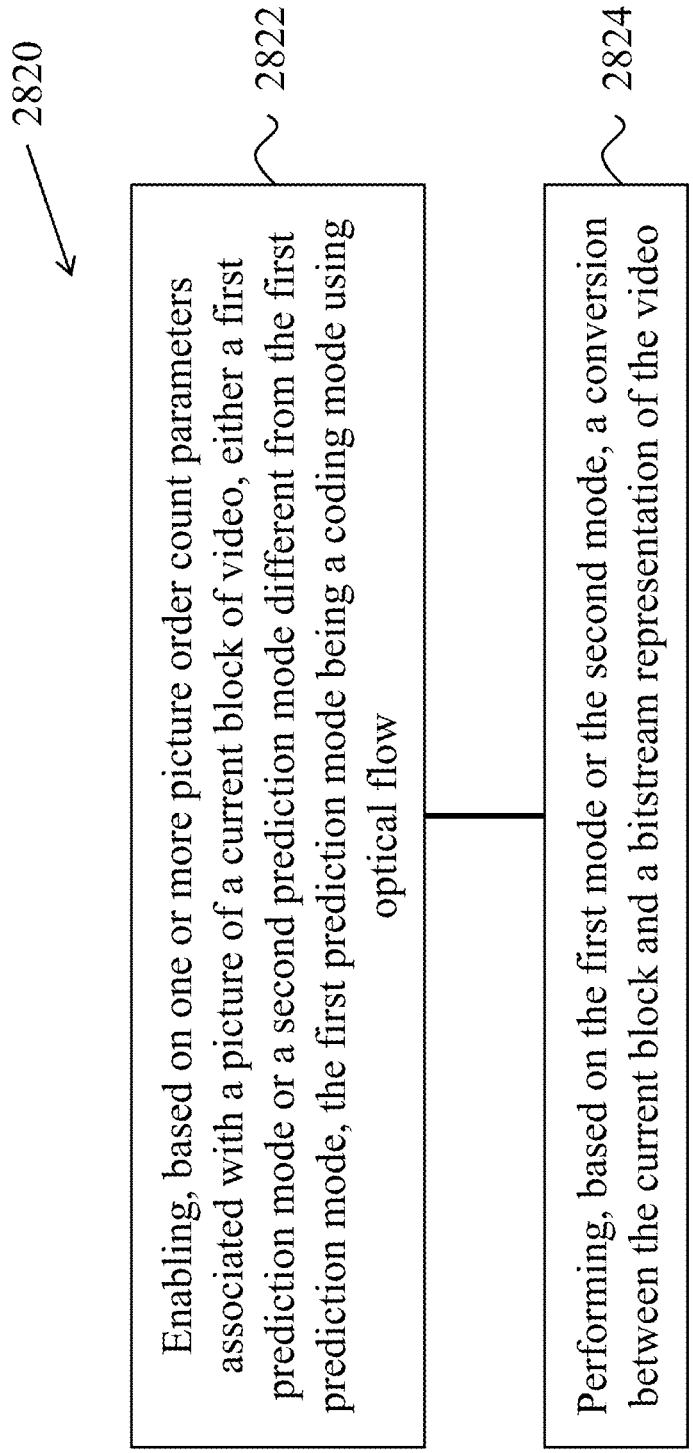

FIG. 28B shows a flowchart of an exemplary method for video processing. The method 2820 includes, at step 2822, enabling, based on one or more picture order count (POC) parameters associated with a picture of a current block of video, either a first prediction mode or a second prediction mode different from the first prediction mode, the first prediction mode being a coding mode using optical flow.

The method 2820 includes, at step 2824, performing, based on the first mode or the second mode, a conversion between the current block and a bitstream representation of the video.

Figure 28C:
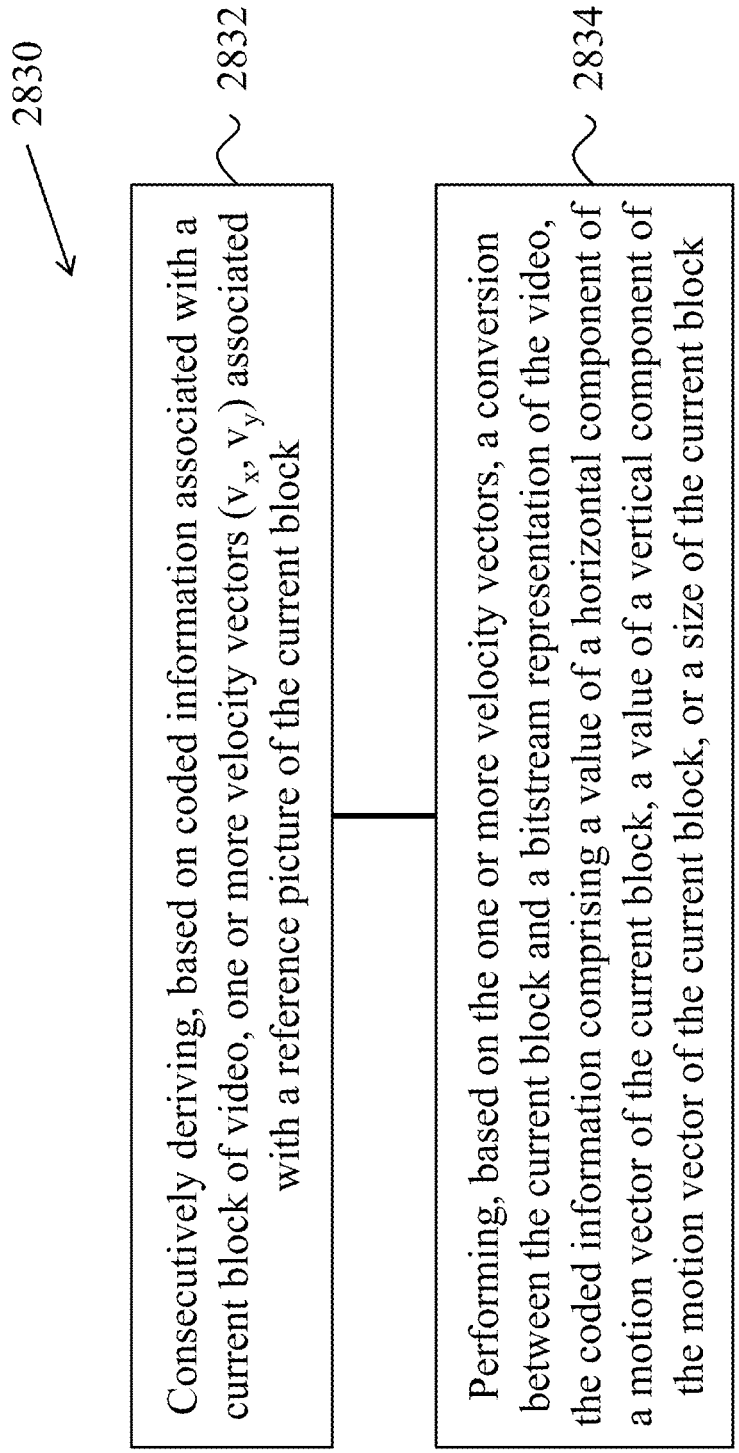

FIG. 28C shows a flowchart of an exemplary method for video processing. The method 2830 includes, at step 2832, consecutively deriving, based on coded information associated with a current block of video, one or more velocity vectors ($v_x$, $v_y$) associated with a reference picture of the current block.

The method 2830 includes, at step 2834, performing, based on the one or more velocity vectors, a conversion between the current block and a bitstream representation of the video, the coded information comprising a value of a horizontal component of a motion vector of the current block, a value of a vertical component of the motion vector of the current block, or a size of the current block.

Figure 28D:
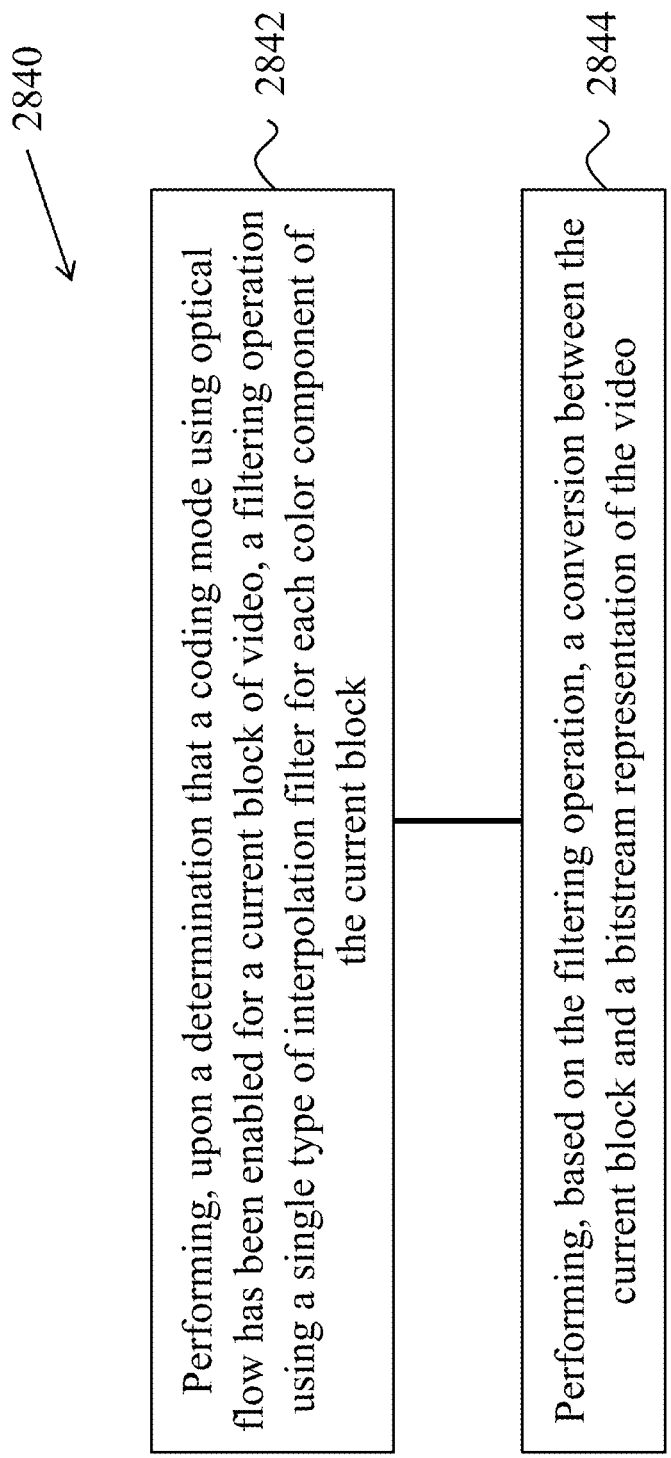

FIG. 28D shows a flowchart of an exemplary method for video processing. The method 2840 includes, at step 2842, performing, upon a determination that a coding mode using optical flow has been enabled for a current block of video, a filtering operation using a single type of interpolation filter for each color component of the current block.

The method 2840 includes, at step 2844, performing, based on the filtering operation, a conversion between the current block and a bitstream representation of the video.

Figure 28E:
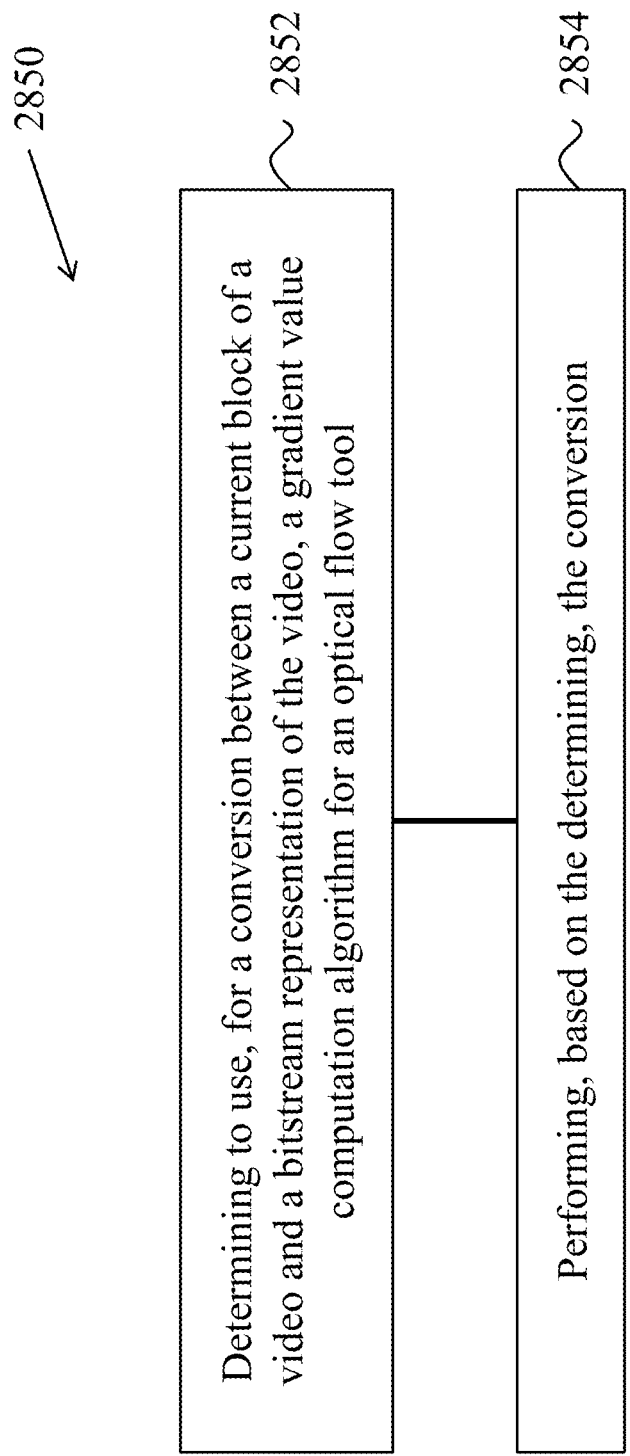

FIG. 28E shows a flowchart of an exemplary method for video processing. The method 2850 includes, at step 2852, determining to use, for a conversion between a current block of a video and a bitstream representation of the video, a gradient value computation algorithm for an optical flow tool.

The method 2850 includes, at step 2854, performing, based on the determining, the conversion.

Figure 28F:
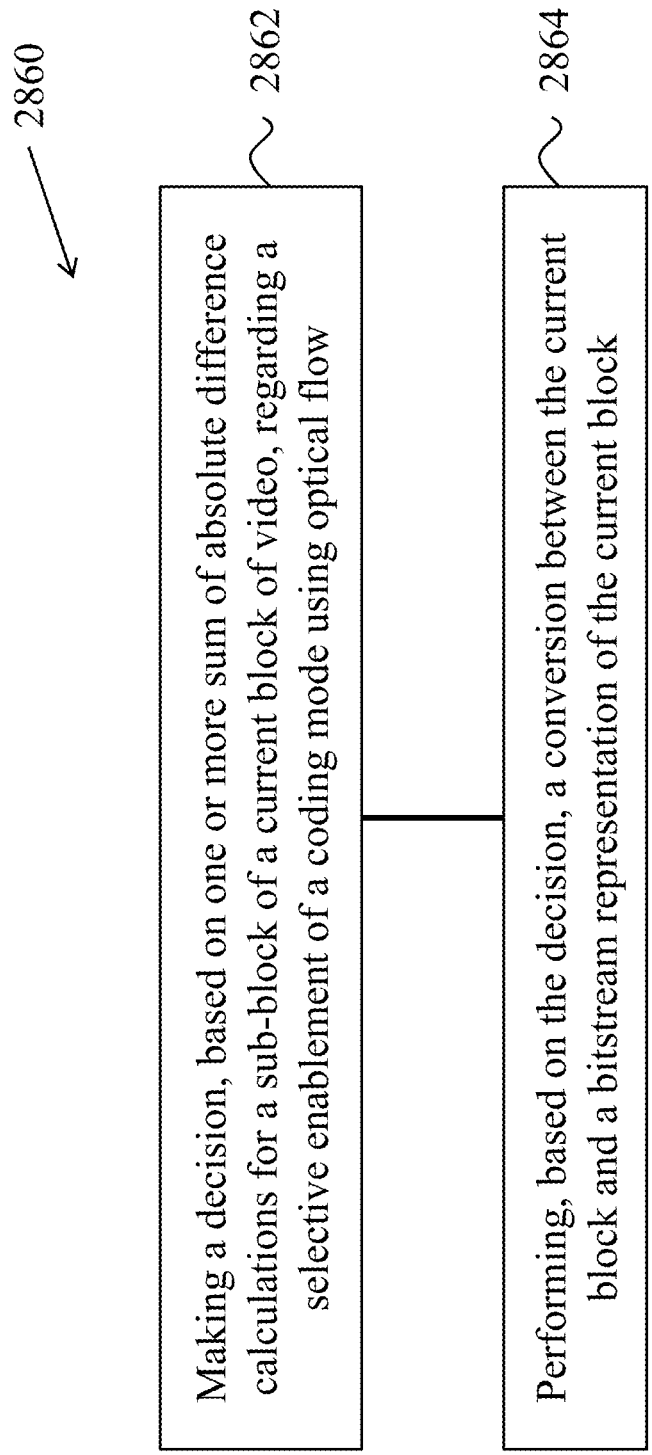

FIG. 28F shows a flowchart of an exemplary method for video processing. The method 2860 includes, at step 2862, making a decision, based on one or more sum of absolute difference (SAD) calculations for a sub-block of a current block of video, regarding a selective enablement of a coding mode using optical flow for the current block.

The method 2860 includes, at step 2864, performing, based on the decision, a conversion between the current block and a bitstream representation of the current block.

Figure 28G:
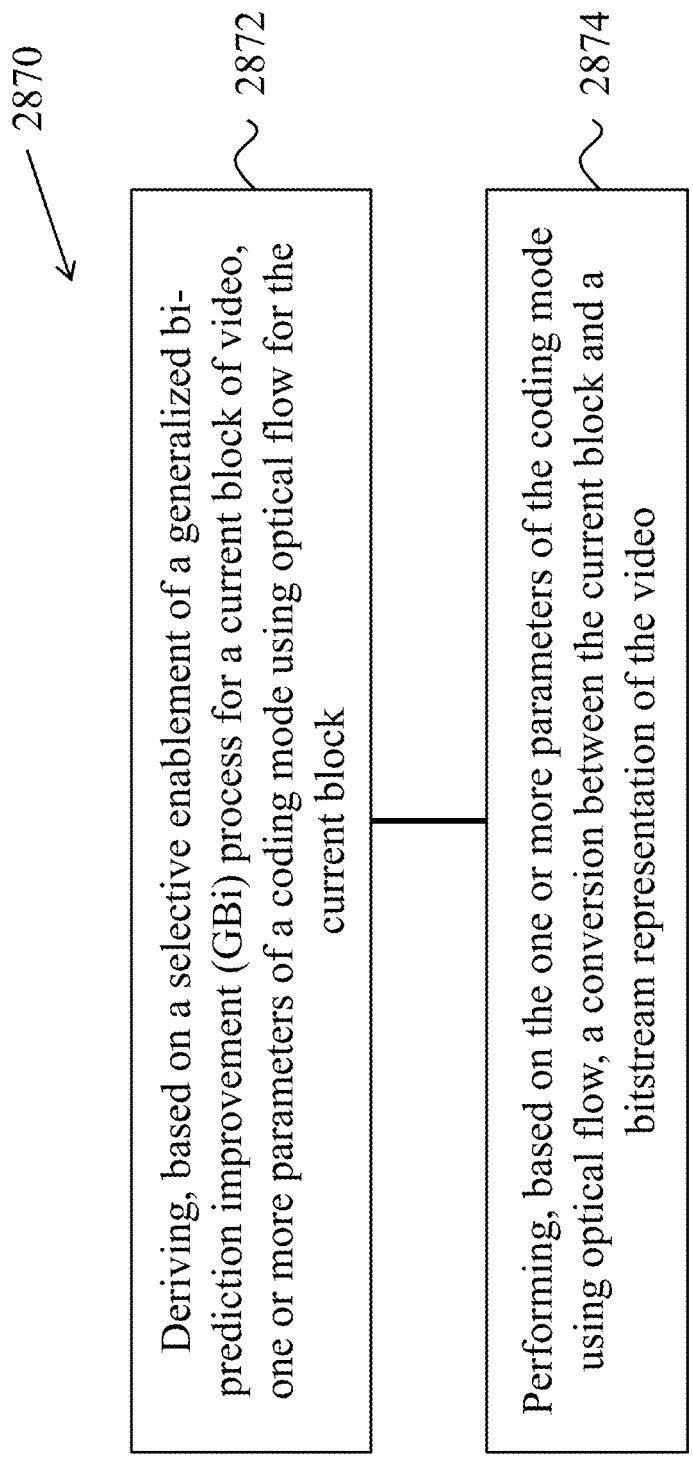

FIG. 28G shows a flowchart of an exemplary method for video processing. The method 2870 includes, at step 2872, deriving, based on a selective enablement of a generalized bi-prediction improvement (GBi) process for a current block of video, one or more parameters of a coding mode using optical flow for the current block.

The method 2870 includes, at step 2874, performing, based on the one or more parameters of the coding mode using optical flow, a conversion between the current block and a bitstream representation of the video.

Figure 28H:
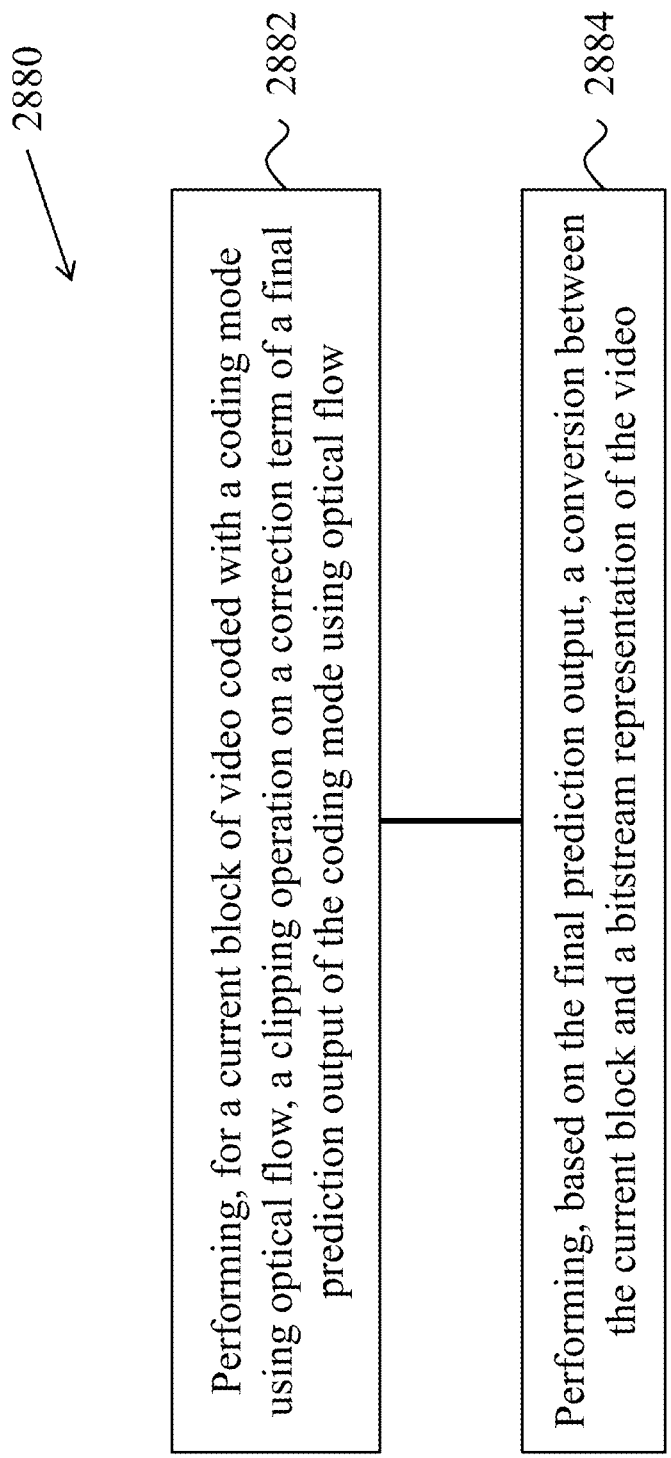

FIG. 28H shows a flowchart of an exemplary method for video processing. The method 2880 includes, at step 2882, performing, for a current block of video coded with a coding mode using optical flow, a clipping operation on a correction term of a final prediction output of the coding mode using optical flow.

The method 2880 includes, at step 2884, performing, based on the final prediction output, a conversion between the current block and a bitstream representation of the video.

Figure 28I:
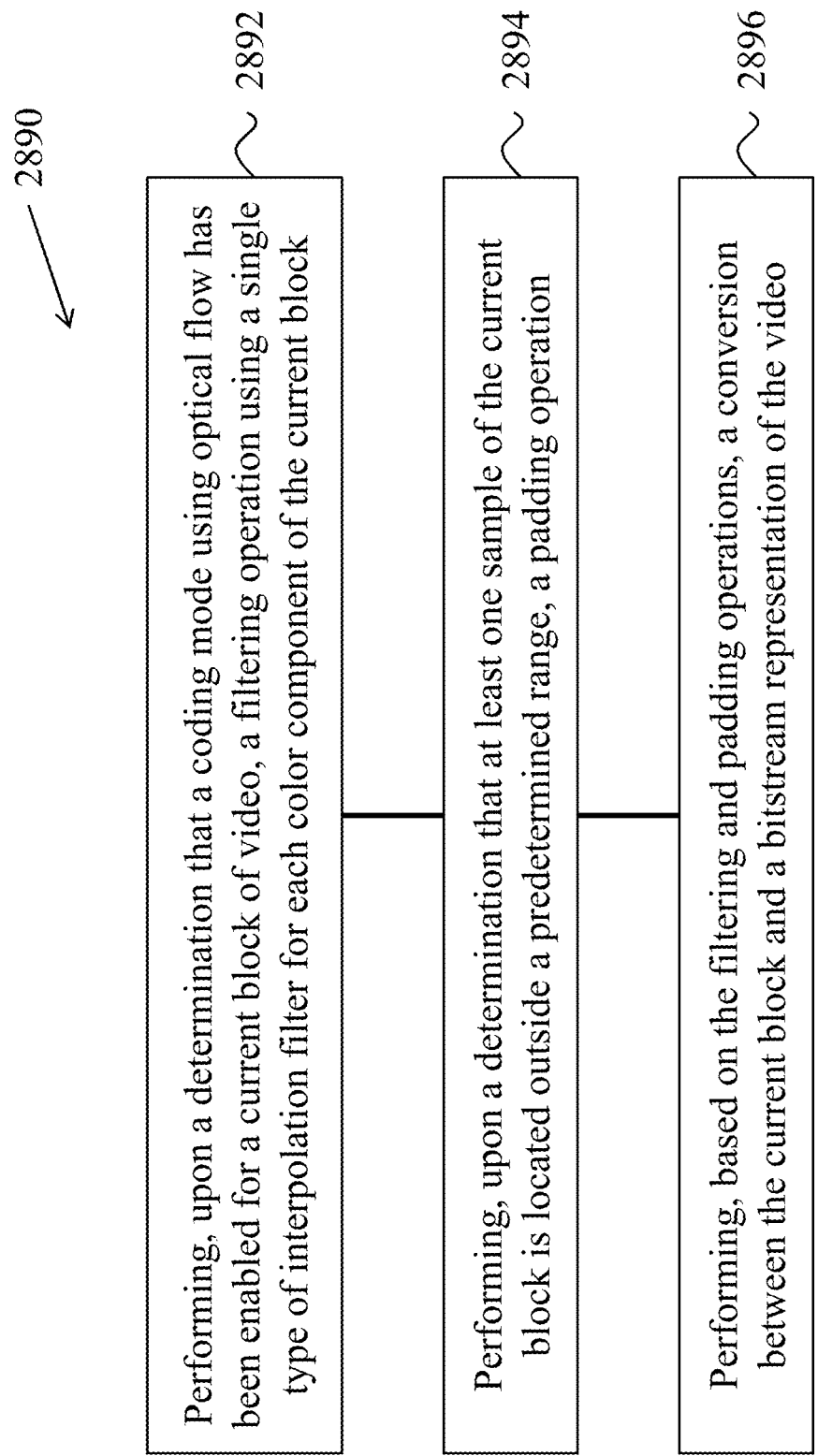

FIG. 28I shows a flowchart of an exemplary method for video processing. The method 2890 includes, at step 2892, performing, upon a determination that a coding mode using optical flow has been enabled for a current block of video, a filtering operation using a single type of interpolation filter for each color component of the current block.

The method 2890 includes, at step 2894, performing, upon a determination that at least one sample of the current block is located outside a predetermined range, a padding operation.

The method 2890 includes, at step 2896, performing, based on the filtering operation and the padding operation, a conversion between the current block and a bitstream representation of the video.

In some embodiments, the following technical solutions may be implemented:

A1. A method of video processing, comprising: determining to use, for a conversion between a current block of a video and a bitstream representation of the video, a first linear optimization model for the conversion using a first coding mode, wherein the first linear optimization model is derived from a second linear optimization model that is used for the conversion using a second coding mode; and performing, based on the determining, the conversion.

A2. The method of solution A1, wherein the second coding mode is a bi-directional optical flow (BDOF) prediction mode.

A3. The method of solution A2, wherein the second linear optimization model comprises N groups of samples ($u_k$, $v_k$, $w_k$) as an input and two output parameters, a and b, and wherein the second linear optimization model minimizes or approximately minimizes $$\sum_{k=0}^{N-1} (u_k + a \times v_k + b \times w_k)^2.$$

A4. The method of solution A3, wherein $u_k=)(I^{(0)}(x, y)-I^{(1)}(x, y))$, $v_k=(G_x^{(0)}(x, y)-G_x^{(1)}(x, y))$, $w_k=)(G_y^{(0)}(x, y)-G_y^{(1)}(x, y))$, $\alpha=v_x$, and $b=v_y$, wherein $I^{(i)}(x, y)$ represents a luma sample at pixel location (x, y) in reference frame i, and wherein $G_x^{(i)}(x, y)$ and $G_y^{(i)}(x, y)$ represent a horizontal gradient and a vertical gradient of the luma sample, respectively.

A5. The method of solution A3, wherein $u_k=-C(n)$, $v_k=L(n)$, $w_k=1$, $\alpha=\alpha$, and $b=\beta$, wherein C(n) represents a top and a left neighboring reconstructed chroma sample, wherein L(n) represents a top and a left neighboring reconstructed luma sample, and wherein $\alpha$ and $\beta$ represent parameters of the second linear optimization model.

A6. The method of solution A1, wherein the second coding mode is a cross-component linear model prediction mode.

A7. A method of video processing, comprising: enabling, based on one or more picture order count (POC) parameters associated with a picture of a current block of video, either a first prediction mode or a second prediction mode different from the first prediction mode, wherein the first prediction mode is a coding mode using optical flow; and performing, based on the first mode or the second mode, a conversion between the current block and a bitstream representation of the video.

A8. The method of solution A7, further comprising: refraining from enabling the coding mode using optical flow, wherein a first reference picture ($R_0$) and a second reference picture ($R_1$) are associated with a current picture comprising the current block, wherein $\tau_0$ is a difference between a picture order count of the current picture and a picture order count of the first reference picture ($\tau_0$=POC(current)−POC($R_0$)), and wherein $\tau_1$ is a difference between a picture order count of the second reference picture and the picture order count of the current picture ($\tau_1$=POC($R_1$)−POC(current)).

A9. The method of solution A8, wherein abs($\tau_0$)≥$T_0$ or abs($\tau_1$)≥$T_1$, wherein $T_0$ and $T_1$ are integers.

A10. The method of solution A8, wherein abs($\tau_0$)≥$T_0$ and abs($\tau_1$)≥$T_1$, wherein $T_0$ and $T_1$ are integers.

A11. The method of solution A9 or A10, wherein $T_0$=$T_1$=4.

A12. The method of solution A8, wherein abs($\tau_0$)+abs($\tau_1$) ≥$T_0$, wherein $T_0$ is an integer.

A13. The method of solution A12, wherein $T_0$=8.

A14. The method of solution A8, wherein abs(abs($\tau_0$)−abs($\tau_1$))≥$T_0$, wherein $T_0$ is an integer.

A15. The method of solution A14, wherein $T_0$=0.

A16. The method of solution A8, abs($\tau_0$)≥abs($\tau_1$)×$T_0$ and abs($\tau_1$)≥abs($\tau_0$)×$T_0$, wherein $T_0$ is an integer.

A17. The method of solution A16, wherein $T_0$=8.

A18. The method of any of solutions A9 to A17, wherein $T_0$ is signaled in a video parameter set (VPS), a sequence parameter set (SPS), a picture parameter set (PPS), a slice header, a tile group header, a tile, a coding unit (CU) or a coding tree unit (CTU).

A19. The method of solution A7, wherein the coding mode using optical flow is enabled, wherein one or more velocity vectors ($v_x$, $v_y$) for a current picture comprising the current block are based on the one or more POC distances, and wherein a first reference picture ($R_0$) and a second reference picture ($R_1$) are associated with the current picture.

A20. The method of solution A19, wherein $\tau_0$ is a difference between a picture order count of the current picture and a picture order count of the first reference picture ($\tau_0$=POC(current)−POC($R_0$)), wherein x is a difference between a picture order count of the second reference picture and the picture order count of the current picture ($\tau_1$=POC($R_1$)−POC(current)), wherein $$v_x^{(1)} = v_x \frac{2|\tau_0|}{|\tau_0| + |\tau_1|}, \quad v_x^{(0)} = -v_x \frac{2|\tau_1|}{|\tau_0| + |\tau_1|},$$

$$v_y^{(1)} = v_y \frac{2|\tau_0|}{|\tau_0| + |\tau_1|}, \quad v_y^{(0)} = -v_y \frac{2|\tau_1|}{|\tau_0| + |\tau_1|},$$

wherein ($v_x^{(0)}$,$v_y^{(0)}$) are velocity vectors for the first reference picture and ($v_x^{(1)}$,$v_y^{(1)}$) are velocity vectors for the second reference picture.

A21. The method of solution A19, wherein the one or more velocity vectors are derived in an iterative manner.

A22. The method of solution A19, wherein the one or more velocity vectors are based on a third prediction mode, and wherein the third prediction mode is DMVR or bilateral matching.

A23. The method of solution A22, wherein MV0 and MV1 are motion vectors for the first and second reference pictures, respectively, and wherein MV0' and MV1' are initial motion vectors for the third prediction mode.

A24. The method of solution A23, wherein MV0'=MV0+ ($v_x$, $v_y$) and MV1'=MV1−($v_x$, $v_y$).

A25. The method of solution A23, wherein MV0'=MV0− ($v_x$, $v_y$) and MV1'=MV1+($v_x$, $v_y$).

A26. The method of solution A7, wherein the coding mode using optical flow is enabled and applied to a subset of samples of the current block, wherein the subset of samples excludes all samples of the current block.

A27. The method of solution A26, wherein the subset of samples excludes samples in a first row, last row, first column or last column of the current block.

A28. The method of solution A7, wherein the coding mode using optical flow is enabled and applied to a subset of samples of a sub-block of the current block, wherein the subset of samples is not equivalent to all samples of the sub-block of the current block.

A29. The method of solution A28, wherein the subset of samples excludes samples in a first row, last row, first column or last column of the sub-block of the current block.

A30. The method of any of solutions A1 to A29, wherein the coding mode using optical flow is a bi-directional optical flow (BDOF) prediction mode.

A31. A method of video processing, comprising: consecutively deriving, based on coded information associated with a current block of video, one or more velocity vectors ($v_x$, $v_y$) associated with a reference picture of the current block; and performing, based on the one or more velocity vectors, a conversion between the current block and a bitstream representation of the video, wherein the coded information comprises a value of a horizontal component of a motion vector of the current block, a value of a vertical component of the motion vector of the current block, or a size of the current block.

A32. The method of A31, wherein $v_y$ is derived first, and wherein $v_x$ is derived based on a value of $v_y$.

A33. The method of solution A31, further comprising: refining, based on the one or more velocity vectors, at least one prediction or at least one gradient of the reference picture; and deriving, subsequent to the refining, the one or more velocity vectors based on the reference picture.

A34. The method of solution A33, wherein the refining and deriving are performed multiple times until a difference between consecutive values of one of the one or more velocity vectors is less than a predetermined threshold.

A35. The method of any of solutions A1 to A34, wherein the conversion generates the current block from the bitstream representation.

A36. The method of any of solutions A1 to A34, wherein the conversion generates the bitstream representation from the current block.

A37. An apparatus in a video system comprising a processor and a non-transitory memory with instructions thereon, wherein the instructions upon execution by the processor, cause the processor to implement the method in any one of solutions A1 to A36.

A38. A computer program product stored on a non-transitory computer readable media, the computer program product including program code for carrying out the method in any one of solutions A1 to A36.

In some embodiments, the following technical solutions may be implemented:

B1. A method of video processing, comprising: performing, upon a determination that a coding mode using optical flow has been enabled for a current block of video, a filtering operation using a single type of interpolation filter for each color component of the current block; and performing, based on the filtering operation, a conversion between the current block and a bitstream representation of the video.

B2. The method of solution B1, wherein the color component comprises a luma component and the single type of interpolation filter comprises an 8-tap interpolation filter.

B3. The method of solution B1, wherein a first number of samples of the current block used in the filtering operation is fewer than a second number of samples required by the single type of interpolation filter, thereby reducing a memory bandwidth of the filtering operation.

B4. The method of solution B3, wherein the second number of samples is equal to a number of samples of the current block used in the filtering operation when the coding mode using optical flow is not applied.

B5. The method of solution B1, wherein a number of samples of the current block are used in the filtering operation, and wherein the method further comprises: performing a padding operation upon a determination that the coding mode using optical flow is applied.

B6. The method of solution B1, wherein a size of the current block is M×N, wherein a first number of samples required by a gradient calculation is (M+G)×(N+G), wherein the single type of interpolation filter comprises L taps, wherein a second number of samples required by the filtering operation is (M+G+L−1)×(N+G+L−1), wherein a third number of samples used in the filtering operation is (M+L−1+k)×(N+L−1+k), wherein M, N, G, and L are positive integers, wherein k is an integer less than G, and wherein a fourth number of samples that comprise a difference between the second number of samples and the third number of samples are padded.

B7. The method of solution B6, wherein M=N=8, L=8 and G=2.

B8. The method of solution B6 or B7, wherein k=0 or k=1.

B9. The method of solution B 1, wherein a coordinate of a top-left pixel of the current block is (0,0), and wherein the method further comprises: refraining from calculating a gradient value and applying the coding mode using optical flow to a pixel in a predetermined position.

B10. The method of solution B9, wherein an x-coordinate of the predetermined position is −1 or W, wherein W is a width of the current block, and wherein W is a positive integer.

B11. The method of solution B9, wherein an y-coordinate of the predetermined position is −1 or H, wherein H is a height of the current block, and wherein H is a positive integer.

B12. The method of solution B1, wherein a coordinate of a top-left pixel of the current block is (0,0), and wherein the method further comprises: modifying a calculation of a gradient value for a pixel in a predetermined position.

B13. The method of solution B12, wherein an x-coordinate of the predetermined position is −1 or W, wherein W is a width of the current block, and wherein W is a positive integer.

B14. The method of solution B12, wherein an y-coordinate of the predetermined position is −1 or H, wherein H is a height of the current block, and wherein H is a positive integer.

B15. The method of solution B13 or B14, wherein the calculation of the gradient value comprises:

$$gradientHL0[x][y] = \begin{cases} (predSampleL0\,[hx+1][vy] - \\ predSampleL0\,[hx]\,[vy]) >> 4 & \text{if } hx = 1 \\ (predSampleL0\,[hx][vy] - \\ predSampleL0\,[hx-1]\,[vy]) >> 4 & \text{if } hx = W \\ (predSampleL0\,[hx+1][vy] - \\ predSampleL0\,[hx-1]\,[vy]) >> 4 & \text{Otherwise} \end{cases}$$

wherein W is a width of the current block, wherein predSampleL0 is an array comprising luma prediction samples for the current block from reference list L0, wherein gradientHL0 is a horizontal component of the gradient value derived from the reference list L0, and wherein hx and vy are integer coordinate indexes.

B16. The method of solution B13 or B14, wherein the calculation of the gradient value comprises:

$$gradientVL0[x][y] = \begin{cases} (predSampleL0\,[hx][vy+1] - \\ predSampleL0\,[hx]\,[vy]) >> 3 & \text{if } vy = 1 \\ (predSampleL0\,[hx][vy] - \\ predSampleL0\,[hx]\,[vy-1]) >> 3 & \text{if } vy = H \\ (predSampleL0\,[hx][vy+1] - \\ predSampleL0\,[hx]\,[vy-1]) >> 4 & \text{Otherwise} \end{cases}$$

wherein W is a width of the current block, wherein predSampleL0 is an array comprising luma prediction samples from the current block, wherein gradientVL0 is a vertical component of the gradient value derived from reference list L0, and wherein hx and vy are integer coordinate indexes.

B17. The method of solution B1, further comprising: padding, prior to the calculation of the gradient value, one or more outer samples of the current block instead of interpolating the one or more outer samples.

B18. The method of solution B1, wherein one or more gradient calculations used in the coding mode with optical flow are identical to those used in an adaptive loop filter (ALF).

B19. A method of video processing, comprising: performing, upon a determination that a coding mode using optical flow has been enabled for a current block of video, a filtering operation using a single type of interpolation filter for each color component of the current block; performing, upon a determination that at least one sample of the current block is located outside a predetermined range, a padding operation; and performing, based on the filtering operation and the padding operation, a conversion between the current block and a bitstream representation of the video.

B20. The method of solution B19, wherein the padding operation is performed prior to performing a gradient calculation.

B21. The method of solution B19, wherein the predetermined range is based on a height or a width of the current block.

B22. The method of any of solutions B1 to B21, wherein the coding mode using optical flow comprises a bi-directional optical flow (BDOF) prediction mode.

B23. The method of any of solutions B1 to B22, wherein the conversion generates the current block from the bitstream representation.

B24. The method of any of solutions B1 to B22, wherein the conversion generates the bitstream representation from the current block.

B25. An apparatus in a video system comprising a processor and a non-transitory memory with instructions thereon, wherein the instructions upon execution by the processor, cause the processor to implement the method in any one of solutions B1 to B24.

B26. A computer program product stored on a non-transitory computer readable media, the computer program product including program code for carrying out the method in any one of solutions B1 to B24.

In some embodiments, the following technical solutions may be implemented:

C1. A method of video processing. comprising: determining to use, for a conversion between a current block of a video and a bitstream representation of the video, a gradient value computation algorithm for an optical flow tool; and performing, based on the determining, the conversion, wherein the gradient value computation algorithm differs from a legacy gradient value computation algorithm that comprises:

gradientHL0[x][y]=(predSampleL0[hx+1][vy]−predSampleL0[hx−1][vy])>>4, gradientVL0[x][y]=(predSampleL0[hx][vy+1]−predSampleL0[hx][vy−1])>>4, gradientHL1[x][y]=(predSampleL1[hx+1][vy]−predSampleL1[hx−1][vy])>>4, and gradientVL1[x][y]=(predSampleL1[hx][vy+1]−predSampleL1[hx][vy−1])>>4, wherein gradientHL0 is a horizontal component of the gradient value derived from reference list L0, wherein gradientVL0 is a vertical component of the gradient value derived from reference list L0, wherein gradientHL1 is a horizontal component of the gradient value derived from reference list L1, wherein gradientVL1 is a vertical component of the gradient value derived from reference list L1, wherein predSampleL0 is an array comprising luma prediction samples for the current block from reference list L0, wherein predSampleL1 is an array comprising luma prediction samples for the current block from reference list L1, and wherein hx and vy are integer coordinate indexes.

C2. The method of solution C1, wherein modifying the gradient value computation comprises shifting a gradient value by a predetermined positive integer (S), and wherein S≠4.

C3. The method of solution C2, wherein S=6.

C4. The method of solution C2, wherein S=B−P, wherein B is a bit-depth of a sample of the current block, and wherein P is a positive integer.

C5. The method of solution C4, wherein P=6, and wherein B=8 or 12.

C6. The method of solution C1, wherein modifying the gradient value computation comprises clipping a gradient value such that the gradient value is representable as a K-bit integer, and wherein K is a positive integer.

C7. The method of solution C6, wherein K=8 or 16.

C8. The method of solution C1, wherein the gradient value computation algorithm for the optical flow tool comprises a computation of a first internal variable (temp), a second interval variable (tempX) and a third internal variable (tempY), and wherein the computation is defined as:

temp[x][y]=SignShift(predSampleL0[hx][vy]−predSampleL1[hx][vy],S1), tempX[x][y]=SignShift(gradientHL0[x][y]+gradientHL1[x][y],S2), and tempY[x][y]=SignShift(gradientVL0[x][y]+gradientVL1[x][y],S3), wherein S1, S2 and S3 are integers, and wherein SignShift (x, s) is defined as:

$$SignShift(x, s) = \begin{cases} (x + \text{off}) >> s & x \geq 0 \\ -((-x + \text{off}) >> s) & x < 0 \end{cases},$$

and
wherein off is an integer.

C9. The method of solution C8, wherein S1=6 and S2=S3=3.

C10. The method of solution C8, wherein S1, S2 and S3 are based on a bit-depth of a sample of the current block (B).

C11. The method of solution C10, wherein S1=B−P1, S2=B−P2 and S3=B−P3, wherein P1, P2 and P3 are integers.

C12. The method of solution C11, wherein B=8, 10 or 12, and wherein P1=4 and P2=P3=7.

C13. The method of solution C1, wherein the gradient value computation algorithm for the optical flow tool comprises a computation of a first internal variable (temp), a second interval variable (tempX) and a third internal variable (tempY) are representable by a K1-bit integer, a K2-bit integer and a K3-bit integer, respectively, and wherein K1, K2 and K3 are positive integers.

C14. The method of solution C13, wherein K1=8 or 16, K2=8 or 16 and K3=8 or 16.

C15. The method of solution C13 or C14, wherein the computation of temp, tempX and tempY is followed by a clipping operation defined as:

temp[x][y]=Clip3(−2^{K1−1},2^{K1−1}−1,gradientHL0[x][y]), tempX[x][y]=Clip3(−2^{K2−1},2^{K2−1}−1,gradientVL0[x][y]), and tempY[x][y]=Clip3(−2^{K3−1},2^{K3−1}−1,gradientHL1[x][y]), wherein Clip3(x, min, max) is defined as:

$$Clip3(x, \min, \max) = \begin{cases} \min & x < \min \\ x & \min \leq x \leq \max \\ \max & x > \max \end{cases}.$$

C16. The method of solution C1, wherein the gradient value computation algorithm for the optical flow tool comprises a computation of a plurality of internal variables comprising sGx2, sGy2, sGxGy, sGxdI and sGydI that are representable by a K1-bit integer, a K2-bit integer, a K3-bit integer, a K4-bit integer and a K5-bit integer, respectively, and wherein K1, K2, K3, K4 and K5 are positive integers.

C17. The method of solution C16, wherein K1=8 or 16, K2=8 or 16, K3=8 or 16, K4=8 or 16 and K5=8 or 16.

C18. The method of solution C16 and C17, wherein the computation of sGx2, sGy2, sGxGy, sGxdI and sGydI is followed by a shifting operation defined as:

sGx2=Shift(sGx2,S1), sGy2=Shift(sGy2,S2), sGxGy=SignShift(sGxGy,S3), sGxdI=SignShift(sGxdI,S4), and sGydI=SignShift(sGydI,S5), wherein S1, S2, S3, S4 and S5 are positive integers, wherein Shift(x, s)=(x+off)>>s, and wherein SignShift(x, s) is defined as:

$$SignShift(x, s) = \begin{cases} (x + \text{off}) >> s & x \geq 0 \\ -((-x + \text{off}) >> s) & x < 0 \end{cases},$$

and
wherein off is an integer.

C19. The method of solution C18, wherein S1, S2, S3, S4 and S5 are equal to 4 or 5.

C20. The method of solution C18, wherein S1, S2, S3, S4 and S5 are based on a bit-depth of a sample of the current block (B).

C21. The method of solution C8, wherein S1=B−P1, S2=B−P2, S3=B−P3, S4=B−P4 and S5=B−P5, wherein P1, P2, P3, P4 and P5 are integers.

C22. The method of solution C21, wherein B=8, 10 or 12.

C23. The method of solution C16 and C17, wherein the computation of sGx2, sGy2, sGxGy, sGxdI and sGydI is followed by a clipping operation defined as:

$$sGx2 = Clip3(0, 2^{K1}-1, sGx2),$$

$$sGy2 = Clip3(0, 2^{K2}-1, sGy2),$$

$$sGxGy = Clip3(-2^{K3-1}, 2^{K3-1}-1, sGxGy),$$

$$sGxdI = Clip3(-2^{K4-1}, 2^{K4-1}-1, sGxdI), \text{ and}$$

$$sGydI = Clip3(-2^{K5-1}, 2^{K5-1}-1, sGydI),$$

wherein Clip3(x, min, max) is defined as:

$$Clip3(x, \min, \max) = \begin{cases} \min & x < \min \\ x & \min \le x \le \max \\ \max & x > \max \end{cases}$$

C24. The method of any of solutions C1 to C23, wherein the optical flow tool comprises a bi-directional optical flow (BDOF) tool.

C25. A method of video processing, comprising: making a decision, based on one or more sum of absolute difference (SAD) calculations for a sub-block of a current block of video, regarding a selective enablement of a coding mode using optical flow for the current block; and performing, based on the decision, a conversion between the current block and a bitstream representation of the current block.

C26. The method of solution C25, wherein the SAD calculations comprise a mean-removed sum of absolute difference (MR-SAD) calculation.

C27. The method of solution C25 or C26, wherein the SAD calculations are performed on samples in predetermined locations in the current block.

C28. The method of solution C25 or C26, wherein the SAD calculations are performed on samples in predetermined locations in the sub-block of the current block.

C29. A method of video processing, comprising: deriving, based on a selective enablement of a generalized bi-prediction improvement (GBi) process for a current block of video, one or more parameters of a coding mode using optical flow for the current block; and performing, based on the one or more parameters of the BDOF prediction mode, a conversion between the current block and a bitstream representation of the video.

C30. A method of video processing, comprising: performing, for a current block of video coded with a coding mode using optical flow, a clipping operation on a correction term of a final prediction output of the coding mode using optical flow; and performing, based on the final prediction output, a conversion between the current block and a bitstream representation of the video.

C31. The method of claim C30, wherein the correction term is clipped to a range [minCorrection, maxCorrection], wherein minCorrection and maxCorrection are integers.

C32. The method of solution C31, wherein minCorrection=−32 and maxCorrection=32.

C33. The method of solution C31, wherein minCorrection and maxCorrection are based on a sample bit-depth.

C34. The method of solution C31, wherein minCorrection and maxCorrection are based on a height or a width of the current video block.

C35. The method of solution C31, wherein minCorrection and maxCorrection are signaled in a video parameter set (VPS), a sequence parameter set (SPS), a picture parameter set (PPS), a slice header, a tile group header, a tile, a coding unit (CU) or a coding tree unit (CTU).

C36. The method of solution C30, wherein the final prediction output is clipped to a range [minPred, maxPred], wherein minPred and maxPred are integers.

C37. The method of solution C36, wherein minPred=−32 and maxPred=32.

C38. The method of solution C36, wherein midPred and maxPred are based on a sample bit-depth.

C39. The method of solution C36, wherein midPred and maxPred are based on a height or a width of the current video block.

C40. The method of solution C36, wherein midPred and maxPred are signaled in a video parameter set (VPS), a sequence parameter set (SPS), a picture parameter set (PPS), a slice header, a tile group header, a tile, a coding unit (CU) or a coding tree unit (CTU).

C41. The method of any of solutions C30 to C40, wherein the correction term comprises a derived prediction offset for a sample based on the coding mode using optical flow.

C42. The method of any of solutions C25 to C41, wherein the coding mode using optical flow comprises a bi-directional optical flow (BDOF) prediction mode.

C43. The method of any of solutions C1 to C42, wherein the conversion generates the current block from the bitstream representation.

C44. The method of any of solutions C1 to C42, wherein the conversion generates the bitstream representation from the current block.

C45. An apparatus in a video system comprising a processor and a non-transitory memory with instructions thereon, wherein the instructions upon execution by the processor, cause the processor to implement the method in any one of solutions C1 to C44.

C46. A computer program product stored on a non-transitory computer readable media, the computer program product including program code for carrying out the method in any one of solutions C1 to C44.

6. Example Implementations of the Disclosed Technology

Figure 29:
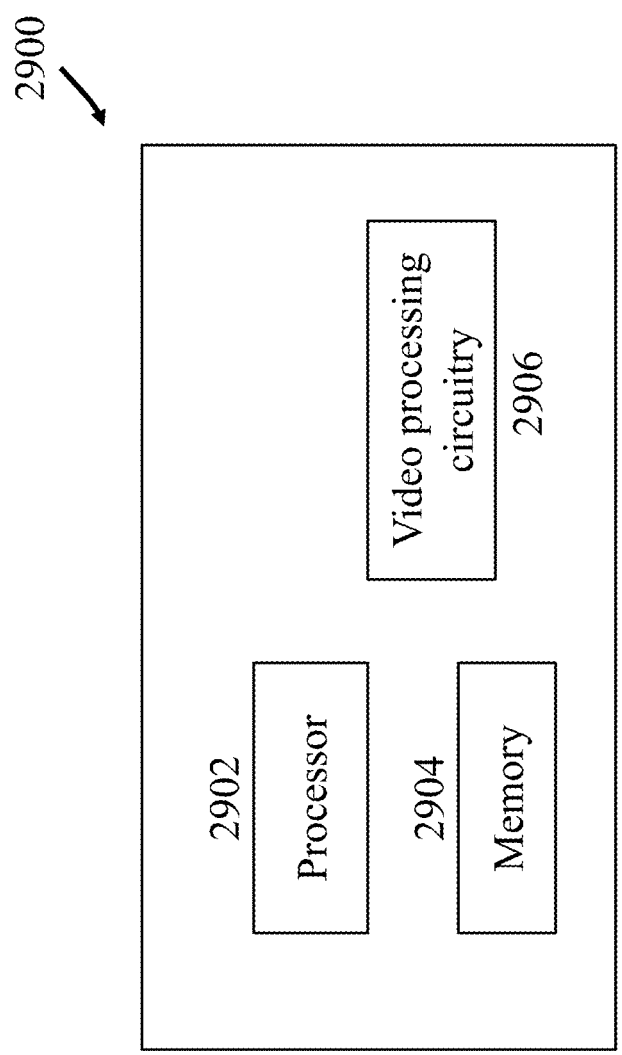
FIG. 29 is a block diagram of an example of a hardware platform for implementing a visual media decoding or a visual media encoding technique described in the present document.

FIG. 29 is a block diagram of a video processing apparatus 2900. The apparatus 2900 may be used to implement one or more of the methods described herein. The apparatus 2900 may be embodied in a smartphone, tablet, computer, Internet of Things (IoT) receiver, and so on. The apparatus 2900 may include one or more processors 2902, one or more memories 2904 and video processing hardware 2906. The processor(s) 2902 may be configured to implement one or more methods (including, but not limited to, method 2800) described in the present document. The memory (memories) 2904 may be used for storing data and code used for implementing the methods and techniques described herein. The video processing hardware 2906 may be used to implement, in hardware circuitry, some techniques described in the present document.

In some embodiments, the video coding methods may be implemented using an apparatus that is implemented on a hardware platform as described with respect to FIG. 29.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 30:
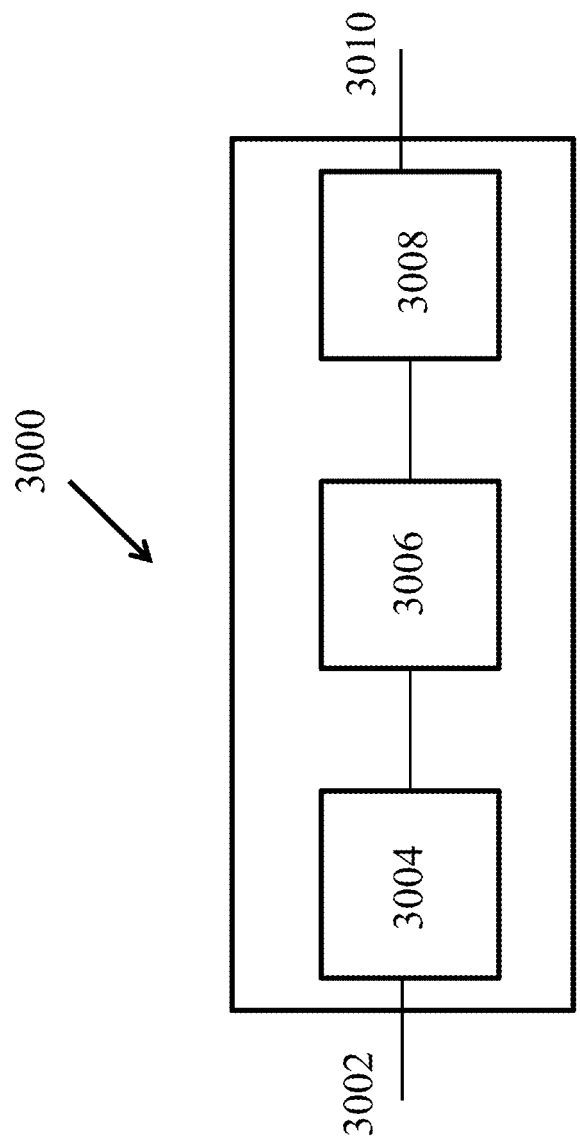
FIG. 30 is a block diagram of an example video processing system in which disclosed techniques may be implemented.

FIG. 30 is a block diagram showing an example video processing system 3000 in which various techniques disclosed herein may be implemented. Various implementations may include some or all of the components of the system 3000. The system 3000 may include input 3002 for receiving video content. The video content may be received in a raw or uncompressed format, e.g., 8 or 10 bit multi-component pixel values, or may be in a compressed or encoded format. The input 3002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3000 may include a coding component 3004 that may implement the various coding or encoding methods described in the present document. The coding component 3004 may reduce the average bitrate of video from the input 3002 to the output of the coding component 3004 to produce a coded representation of the video. The coding techniques are therefore sometimes called video compression or video transcoding techniques. The output of the coding component 3004 may be either stored, or transmitted via a communication connected, as represented by the component 3006. The stored or communicated bitstream (or coded) representation of the video received at the input 3002 may be used by the component 3008 for generating pixel values or displayable video that is sent to a display interface 3010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining that a coding mode using optical flow is enabled for a current video block of a video;
   deriving, with a padding operation instead of a first interpolating filtering operation, one or more outer samples for the current video block;
   performing, a second interpolation filtering operation for the current video block; and
   performing, based on the padding operation and the second interpolation filtering operation, a conversion between the current video block and a bitstream of the video,
   wherein a size of the current video block is M×N, wherein a first number of samples required by a gradient calculation is (M+G)×(N+G), and an interpolation filter used in the second interpolation filtering operation for a luma component of the current video block comprises L taps, and
   wherein a third number of samples required by the second interpolation filtering operation with enabling the coding mode using optical flow is (M+k+L−1)×(N+k+L−1), wherein M, N, G, and L are positive integers, and wherein k is an integer less than G.

2. The method of claim 1, wherein a bi-linear filter is used in the first interpolation filtering operation.

3. The method of claim 1, wherein only an 8-tap interpolation filter is used in the second interpolation filtering operation for a luma component of the current video block.

4. The method of claim 1, wherein a second number of samples required by the second interpolation filtering operation without enabling the coding mode using optical flow is (M+L−1)×(N+L−1).

5. The method of claim 4, wherein a fourth number of samples that comprise a difference between the second number of samples and the third number of samples are padded in the padding operation.

6. The method of claim 4, wherein L=8 and G=2.

7. The method of claim 4, wherein k=0.

8. The method of claim 4, wherein M is equal to 8 or 16, and N is equal to 8 or 16.

9. The method of claim 1, wherein the coding mode using optical flow comprises a bi-directional optical flow (BDOF) prediction mode.

10. The method of claim 1, wherein the conversion includes decoding the current video block from the bitstream.

11. The method of claim 1, wherein the conversion includes encoding the current video block into the bitstream.

12. The method of claim 1, wherein the one or more outer samples include a top and a bottom row, a left and a right column of a prediction sample region corresponding to the current video block, and wherein the prediction sample region has a size (M+G)×(N+G).

13. An apparatus for processing video data comprising a processor and a non-transitory memory with instructions thereon, wherein the instructions upon execution by the processor, cause the processor to:
   determine that a coding mode using optical flow is enabled for a current video block of a video;
   derive, with a padding operation instead of a first interpolating filtering operation, one or more outer samples for the current video block;
   perform, a second interpolation filtering operation for the current video block; and
   perform, based on the padding operation and the second interpolation filtering operation, a conversion between the current video block and a bitstream of the video,
   wherein a size of the current video block is M×N, wherein a first number of samples required by a gradient calculation is (M+G)×(N+G), and an interpolation filter used in the second interpolation filtering operation for a luma component of the current video block comprises L taps, and
   wherein a third number of samples required by the second interpolation filtering operation with enabling the coding mode using optical flow is (M+k+L−1)×(N+k+L−1), wherein M, N, G, and L are positive integers, and wherein k is an integer less than G.

14. The apparatus of claim 13, wherein a bi-linear filter is used in the first interpolation filtering operation.

15. The apparatus of claim 13, wherein only an 8-tap interpolation filter is used in the second interpolation filtering operation for a luma component of the current video block.

16. The apparatus of claim 13, wherein a second number of samples required by the second interpolation filtering operation without enabling the coding mode using optical flow is (M+L−1)×(N+L−1).

17. The apparatus of claim 16, wherein a fourth number of samples that comprise a difference between the second number of samples and the third number of samples are padded in the padding operation.

18. The apparatus of claim 16, wherein L=8, k=0 and G=2.

19. The apparatus of claim 13, wherein the coding mode using optical flow comprises a bi-directional optical flow (BDOF) prediction mode.

20. A non-transitory computer-readable storage medium storing instructions that cause a processor to:
  determine that a coding mode using optical flow is enabled for a current video block of a video;
  derive, with a padding operation instead of a first interpolating filtering operation, one or more outer samples for the current video block;
  perform, a second interpolation filtering operation for the current video block; and
  perform, based on the padding operation and the second interpolation filtering operation, a conversion between the current video block and a bitstream of the video,
  wherein a size of the current video block is M×N, wherein a first number of samples required by a gradient calculation is (M+G)×(N+G), and an interpolation filter used in the second interpolation filtering operation for a luma component of the current video block comprises L taps, and
  wherein a third number of samples required by the second interpolation filtering operation with enabling the coding mode using optical flow is (M+k+L−1)×(N+k+L−1), wherein M, N, G, and L are positive integers, and wherein k is an integer less than G.

21. A non-transitory computer-readable recording medium storing a bitstream which is generated by a method performed by a video processing apparatus, wherein the method comprises:
  determining that a coding mode using optical flow is enabled for a current video block of a video;
  deriving, with a padding operation instead of a first interpolating filtering operation, one or more outer samples for the current video block;
  performing, a second interpolation filtering operation for the current video block; and
  generating the bitstream from the current video block based on the padding operation and the second interpolation filtering operation,
  wherein a size of the current video block is M×N, wherein a first number of samples required by a gradient calculation is (M+G)×(N+G), and an interpolation filter used in the second interpolation filtering operation for a luma component of the current video block comprises L taps, and
  wherein a third number of samples required by the second interpolation filtering operation with enabling the coding mode using optical flow is (M+k+L−1)×(N+k+L−1), wherein M, N, G, and L are positive integers, and wherein k is an integer less than G.

* * * * *